(12) United States Patent  
Yagi et al.

(10) Patent No.: US 8,123,825 B2  
(45) Date of Patent: Feb. 28, 2012

(54) MICROREACTOR AND PRODUCTION METHOD THEREOF

(75) Inventors: Hiroshi Yagi, Tokyo (JP); Takeshi Kihara, Tokyo (JP); Koichi Suzuki, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 12/844,661

(22) Filed: Jul. 27, 2010

(65) Prior Publication Data

US 2010/0296985 A1 Nov. 25, 2010

Related U.S. Application Data

(62) Division of application No. 10/523,070, filed as application No. PCT/JP04/01208 on Feb. 5, 2004, now Pat. No. 7,803,328.

(30) Foreign Application Priority Data

| Feb. 6, 2003 | (JP) | 2003-29321 |
| Jul. 14, 2003 | (JP) | 2003-196461 |
| Sep. 5, 2003 | (JP) | 2003-313535 |
| Oct. 7, 2003 | (JP) | 2003-347963 |

(51) Int. Cl.  
*B01J 7/00* (2006.01)  
*H01M 8/06* (2006.01)  
*C01B 3/36* (2006.01)  
*C01B 6/24* (2006.01)  
*C01B 3/02* (2006.01)  
*C10J 3/46* (2006.01)

(52) U.S. Cl. ......... 48/61; 48/197 R; 423/644; 423/648.1

(58) Field of Classification Search .......... 48/61, 197 R; 423/644, 648.1, 650  
See application file for complete search history.

(56) References Cited

U.S. PATENT DOCUMENTS

| 5,139,648 | A | 8/1992 | Lambert |
| 5,811,062 | A * | 9/1998 | Wegeng et al. ............... 422/129 |
| 6,103,411 | A | 8/2000 | Matsubayashit et al. |
| 6,447,736 | B1 * | 9/2002 | Autenrieth et al. ........... 422/601 |
| 6,736,983 | B1 | 5/2004 | Thies et al. |
| 6,828,055 | B2 | 12/2004 | Kearl |
| 6,969,506 | B2 * | 11/2005 | Tonkovich et al. ........... 423/652 |
| 7,048,897 | B1 | 5/2006 | Koripella et al. |
| 7,247,276 | B2 | 7/2007 | Schuppich et al. |
| 2002/0155303 | A1 * | 10/2002 | Wielstra et al. ............... 428/447 |
| 2002/0169077 | A1 | 11/2002 | Bae et al. |
| 2003/0116503 | A1 | 6/2003 | Wang et al. |

(Continued)

FOREIGN PATENT DOCUMENTS

JP 6-111838 4/1994

(Continued)

*Primary Examiner* — Matthew Merkling  
(74) *Attorney, Agent, or Firm* — Oblon, Spivak, McClelland, Maier & Neustadt, L.L.P.

(57) ABSTRACT

A microreactor is configured to have a metal substrate having a microchannel portion on one surface thereof, a heater provided on the other surface of the metal substrate via an insulating film, a catalyst supported on the microchannel portion, and a cover member having a feed material inlet and a gas outlet and joined to the metal substrate so as to cover the microchannel portion. Since the microreactor uses the metal substrate having a high thermal conductivity and a small heat capacity, the efficiency of heat conduction from the heater to the supported catalyst becomes high, and the processing of the metal substrate is easy to facilitate the production.

10 Claims, 39 Drawing Sheets

U.S. PATENT DOCUMENTS

| | | |
|---|---|---|
| 2003/0226604 A1 | 12/2003 | Schlautmann et al. |
| 2008/0142036 A1 | 6/2008 | Sanchez |

FOREIGN PATENT DOCUMENTS

| | | |
|---|---|---|
| JP | 10-503884 | 4/1998 |
| JP | 2001-146401 | 5/2001 |
| JP | 2001-302203 | 10/2001 |
| JP | 2002-252014 | 9/2002 |
| JP | 2003-45459 | 4/2003 |
| JP | 2003-151577 | 5/2003 |
| JP | 2003-340273 | 12/2003 |
| WO | 00/73056 | 12/2000 |
| WO | 02/09866 | 2/2002 |

\* cited by examiner

MICROREACTOR AND PRODUCTION METHOD THEREOF

CROSS-REFERENCE TO RELATED APPLICATIONS

This application is a divisional of U.S. application Ser. No. 10/523,070, filed Aug. 11, 2005, the entire content of which is incorporated herein by reference. U.S. Ser. No. 10/523,070 is the National Stage of and claims the benefit of priority from International Application PCT/JP04/01208, filed Feb. 5, 2004, and pursuant to 35 U.S.C. §119, claims the benefit of priority of Japanese Application No. JP2003/29321, filed Feb. 6, 2003, Japanese Application No. JP2003/196461, filed Jul. 14, 2003, Japanese Application No. JP2003/313535, filed Sep. 5, 2003, and Japanese Application No. JP2003/347963, filed Oct. 7, 2003.

The present invention relates to a microreactor for use in a reformer for hydrogen production and, in particular, to a microreactor for obtaining hydrogen gas by reforming a feed material such as methanol, and a production method of such a microreactor.

BACKGROUND ART

In recent years, attention has been paid to using hydrogen as fuel because of no generation of global warming gas such as carbon dioxide in terms of the global environmental protection, and of the high energy efficiency. Particularly, attention has been paid to fuel cells because they can directly convert hydrogen to electric power and enable the high energy conversion efficiency in the cogeneration system utilizing generated heat. The fuel cells have been hitherto employed under the particular conditions such as in the space development and the ocean development. Recently, however, the development has advanced toward using them for automobile and household distributed power supplies, and fuel cells for portable devices have also been developed.

Among the fuel cells, the fuel cell for producing electricity by electrochemically reacting hydrogen gas obtained by reforming hydrocarbon fuel such as natural gas, gasoline, butane gas, or methanol, and oxygen in air is composed of a reformer for producing hydrogen gas by, in general, steam reforming hydrocarbon fuel, a fuel cell body for producing electricity, and so forth.

In the reformer for obtaining hydrogen gas by steam reforming methanol or the like as a feed material, a Cu—Zn catalyst is mainly used to carry out steam reforming of the feed material by an endothermic reaction. In the industrial fuel cell, since the startup and stop are not frequently carried out, a temperature fluctuation of the reformer is not liable to occur. However, in the fuel cell for automobile or portable device, since the startup and stop are carried out frequently, the reformer is required to rise up quickly (a time for reaching a steam reforming temperature of methanol is short) upon starting up from the stopped state.

On the other hand, particularly for the portable device, reduction in size of the fuel cell is essential so that reduction in size of the reformer has been studied variously. For example, there has been developed a microreactor having a silicon substrate or a ceramic substrate formed with a microchannel portion and carrying a catalyst in this microchannel portion (Laid-open Unexamined Patent Publication No. 2002-252014).

In the conventional microreactor, however, there has been a problem that the heat utilization efficiency is low so that the rising speed of the reformer is slow upon starting up from the stopped state. There has also been a problem that processing by a micromachine, etc. are required and therefore the production cost is high. Further, a space allowed for the microreactor is strictly limited in the fuel cell for portable device so that further reduction in size has been strongly demanded.

Further, the conventional microreactor has a low reaction efficiency and therefore a microreactor with a higher reaction efficiency has been demanded. Moreover, in the conventional microreactor, there has also been a problem that there is possibility of a catalyst to be deactivated by heat in the production stage, and therefore, a usable catalyst is limited and the production process management is difficult.

Furthermore, in the hydrogen production by the conventional microreactors, the microreactor is prepared for each of processes (mixing, reforming, CO removal) of the hydrogen production, and these plurality of microreactors are connected by piping, and therefore, a required space becomes large, which has seriously impeded the size reduction when a space allowed for the microreactors is strictly limited like in case of the fuel cell for portable device.

There has been a problem that when a catalyst is subjected to deactivation or degradation to lose its function in the microreactor for one process while being used, it is necessary to exchange the whole of the plurality of microreactors including the normally functioning microreactors, so that reduction in running cost is impeded.

DISCLOSURE OF THE INVENTION

Therefore, the present invention has been made for solving the foregoing problems. An object thereof is to provide a microreactor that enables a small-sized and highly-efficient reformer for hydrogen production, and a production method that can easily produce such a microreactor.

For accomplishing such an object, the present invention is configured such that a microreactor for obtaining hydrogen gas by reforming a feed material, comprises a metal substrate having a microchannel portion on one surface thereof, a heater provided on the other surface of said metal substrate via an insulating film, a catalyst supported on said microchannel portion, and a cover member having a feed material inlet and a gas outlet and joined to said metal substrate so as to cover said microchannel portion.

Further, the present invention is configured such that a production method of a microreactor for obtaining hydrogen gas by reforming a feed material, comprises a step of forming a microchannel portion on one surface of a metal substrate; a step of anodically oxidizing said metal substrate to form an insulating film in the form of a metal oxide film; a step of providing a heater on said metal oxide film on a surface, where said microchannel portion is not formed, of said metal substrate; a step of applying a catalyst to said microchannel portion; and a step of joining a cover member formed with a feed material inlet and a gas outlet to said metal substrate so as to cover said microchannel portion.

Further, the present invention is configured such that a production method of a microreactor for obtaining hydrogen gas by reforming a feed material, comprises a step of forming a microchannel portion on one surface of a metal substrate; a step of providing an insulating film on a surface, where said microchannel portion is not formed, of said metal substrate; a step of providing a heater on said insulating film; a step of applying a catalyst to said microchannel portion; and a step of joining a cover member formed with a feed material inlet and a gas outlet to said metal substrate so as to cover said microchannel portion.

Further, the present invention is configured such that a production method of a microreactor for obtaining hydrogen gas by reforming a feed material, comprises a step of forming a microchannel portion on one surface of a metal substrate; a step of anodically oxidizing said metal substrate to form an insulating film in the form of a metal oxide film; a step of applying a catalyst to said microchannel portion; a step of joining a cover member formed with a feed material inlet and a gas outlet to said metal substrate so as to cover said microchannel portion; and a step of providing a heater on said metal oxide film on a surface, where said microchannel portion is not formed, of said metal substrate.

Further, the present invention is configured such that a production method of a microreactor for obtaining hydrogen gas by reforming a feed material, comprises a step of forming a microchannel portion on one surface of a metal substrate; a step of applying a catalyst to said microchannel portion; a step of joining a cover member formed with a feed material inlet and a gas outlet to said metal substrate so as to cover said microchannel portion; a step of providing an insulating film on a surface, where said microchannel portion is not formed, of said metal substrate; and a step of providing a heater on said insulating film.

According to the foregoing present invention, since the metal substrate forming the microreactor has a higher thermal conductivity and a smaller heat capacity as compared with a silicon substrate or a ceramic substrate, heat is transmitted from the heater to the applied catalyst with a high efficiency, so that there is enabled a reformer for hydrogen production wherein the rising is fast upon starting up from the stopped state and the utilization efficiency of the input power to the heater is high. Further, the formation of the microchannel portion on the metal substrate does not require the processing by a micromachine, but can be easily implemented by a low-priced processing method such as etching to thereby enable reduction in production cost of the microreactor.

Further, the present invention is configured such that, in a microreactor for obtaining hydrogen gas by reforming a feed material, a plurality of metal substrates each having on one surface thereof a microchannel portion carrying a catalyst are stacked in multi-steps so that the surfaces where said microchannel portions are formed are oriented in the same direction, said metal substrates are provided with through holes, respectively, for communication between said microchannel portions of the metal substrates in the respective steps, at least one of said metal substrates is provided with a heater that is disposed, via an insulating film, on a surface where said microchannel portion is not formed, and a cover member having a gas outlet is joined to said metal substrate located at an outermost position of the multi-steps and exposing said microchannel portion.

Further, the present invention is configured such that a production method of a microreactor for obtaining hydrogen gas by reforming a feed material, comprises a step of forming, on one surface of each of a plurality of metal substrates, a microchannel portion and a through hole having an opening at a predetermined position of said microchannel portion; a step of anodically oxidizing said metal substrates to form insulating films each in the form of a metal oxide film; a step of providing a heater on said metal oxide film on a surface, where said microchannel portion is not formed, of at least one of said metal substrates; a step of applying catalysts to the microchannel portions of said plurality of metal substrates; a step of removing said metal oxide film at a portion subjected to joining when said plurality of metal substrates are stacked in multi-steps; and a step of joining together said plurality of metal substrates so as to be stacked in multi-steps such that the microchannel portions of said metal substrates communicate with each other via said through holes, and joining a cover member formed with a gas outlet to said metal substrate located at an outermost position of the multi-steps and exposing said microchannel portion.

Further, the present invention is configured such that a production method of a microreactor for obtaining hydrogen gas by reforming a feed material, comprises a step of forming, on one surface of each of a plurality of metal substrates, a microchannel portion and a through hole having an opening at a predetermined position of said microchannel portion; a step of providing an insulating film on a surface, where said microchannel portion is not formed, of each of said metal substrates; a step of providing a heater on said insulating film of at least one of said metal substrates; a step of applying catalysts to the microchannel portions of said plurality of metal substrates; and a step of joining together said plurality of metal substrates so as to be stacked in multi-steps such that the microchannel portions of said metal substrates communicate with each other via said through holes, and joining a cover member formed with a gas outlet to said metal substrate located at an outermost position of the multi-steps and exposing said microchannel portion.

Further, the present invention is configured such that a production method of a microreactor for obtaining hydrogen gas by reforming a feed material, comprises a step of forming, on one surface of each of a plurality of metal substrates, a microchannel portion and a through hole having an opening at a predetermined position of said microchannel portion; a step of anodically oxidizing said metal substrates to form insulating films each in the form of a metal oxide film; a step of applying catalysts to the microchannel portions of said plurality of metal substrates; a step of removing said metal oxide film at a portion subjected to joining when said plurality of metal substrates are stacked in multi-steps; a step of joining together said plurality of metal substrates so as to be stacked in multi-steps such that the microchannel portions of said metal substrates communicate with each other via said through holes, and joining a cover member formed with a gas outlet to said metal substrate located at an outermost position of the multi-steps and exposing said microchannel portion; and a step of providing a heater on at least one of said metal oxide films located at an outermost position of the multi-steps.

Further, the present invention is configured such that a production method of a microreactor for obtaining hydrogen gas by reforming a feed material, comprises a step of forming, on one surface of each of a plurality of metal substrates, a microchannel portion and a through hole having an opening at a predetermined position of said microchannel portion; a step of applying catalysts to the microchannel portions of said plurality of metal substrates; a step of joining together said plurality of metal substrates so as to be stacked in multi-steps such that the microchannel portions of said metal substrates communicate with each other via said through holes, and joining a cover member formed with a gas outlet to said metal substrate located at an outermost position of the multi-steps and exposing said microchannel portion; and a step of providing an insulating film on a surface of at least one of said metal substrates located at an outermost position of the multi-steps, and providing a heater on said insulating film.

According to the foregoing present invention, mixing of feed materials, vaporization thereof, reforming of mixture gas, and removal of impurities can be performed in the microchannel portions, carrying the catalysts, of the metal substrates stacked in multi-steps, so that high purity hydrogen gas can be obtained from the gas outlet of the cover member.

Therefore, there is enabled a reformer for hydrogen production with a higher space efficiency as compared with a case where a plurality of microreactors are connected by connecting pipes. Further, since the metal substrate forming the microreactor has a higher thermal conductivity and a smaller heat capacity as compared with a silicon substrate or a ceramic substrate, heat is transmitted from the heater to the applied catalyst with a high efficiency, so that there is enabled a reformer for hydrogen production wherein the rising is fast upon starting up from the stopped state and the utilization efficiency of the input power to the heater is high. Further, the formation of the microchannel portion on the metal substrate does not require the processing by a micromachine, but can be easily implemented by a low-priced processing method such as etching to thereby enable reduction in production cost of the microreactor.

Further, the present invention is configured such that a microreactor for obtaining hydrogen gas by reforming a feed material, comprises a joined body comprising a metal substrate provided with a microchannel portion on one surface thereof, and a metal cover member having a feed material inlet and a gas outlet and joined to said metal substrate so as to cover said microchannel portion, a flow path formed by said microchannel portion located inside said joined body and said metal cover member, and a catalyst supported on a whole inner wall surface of said flow path.

Further, the present invention is configured such that a microreactor for obtaining hydrogen gas by reforming a feed material, comprises a joined body formed by joining together a pair of metal substrates each having a microchannel portion on one surface thereof and having patterns of said microchannel portions that are in a plane symmetrical relationship to each other, such that said microchannel portions confront each other, a flow path formed by said microchannel portions confronting each other inside said joined body, a catalyst supported on a whole inner wall surface of said flow path, a feed material inlet located at one end portion of said flow path, and a gas outlet located at the other end portion of said flow path.

Further, the present invention is configured such that a production method of a microreactor for obtaining hydrogen gas by reforming a feed material, comprises a channel portion forming step of forming a microchannel portion on one surface of a metal substrate; a joining step of joining a metal cover member having a feed material inlet and a gas outlet to said metal substrate so as to cover said microchannel portion to thereby form a joined body having a flow path; a surface processing step of forming a metal oxide film on an inner wall surface of said flow path; and a catalyst applying step of applying a catalyst to the inner wall surface of said flow path via said metal oxide film.

Further, the present invention is configured such that a production method of a microreactor for obtaining hydrogen gas by reforming a feed material, comprises a channel portion forming step of forming microchannel portions with patterns that are plane-symmetrical with each other, on either surfaces of a pair of metal substrates; a joining step of joining together said pair of metal substrates so that said microchannel portions confront each other, to thereby form a joined body having a flow path; a surface processing step of forming a metal oxide film on an inner wall surface of said flow path; and a catalyst applying step of applying a catalyst to the inner wall surface of said flow path via said metal oxide film.

Further, the present invention is configured such that a production method of a microreactor for obtaining hydrogen gas by reforming a feed material, comprises a channel portion forming step of forming a microchannel portion on one surface of a metal substrate; a surface processing step of forming a metal oxide film on an inner wall surface of said microchannel portion; a joining step of joining a metal cover member having a feed material inlet and a gas outlet to said metal substrate so as to cover said microchannel portion to thereby form a joined body having a flow path; and a catalyst applying step of applying a catalyst to an inner wall surface of said flow path via said metal oxide film.

Further, the present invention is configured such that a production method of a microreactor for obtaining hydrogen gas by reforming a feed material, comprises a channel portion forming step of forming microchannel portions with patterns that are plane-symmetrical with each other, on either surfaces of a pair of metal substrates; a surface processing step of forming a metal oxide film on an inner wall surface of each microchannel portion; a joining step of joining together said pair of metal substrates so that said microchannel portions confront each other, to thereby form a joined body having a flow path; and a catalyst applying step of applying a catalyst to an inner wall surface of said flow path via said metal oxide film.

According to the foregoing present invention, since the catalyst is supported on the whole inner wall surface of the flow path, the reaction area is increased to thereby improve a reaction efficiency so that effective utilization of a space is made possible. Further, since the metal substrate forming the microreactor has a higher thermal conductivity and a smaller heat capacity as compared with a silicon substrate or a ceramic substrate, heat is transmitted from the heater to the applied catalyst with a high efficiency, so that there is enabled a reformer for hydrogen production wherein the rising is fast upon starting up from the stopped state and the utilization efficiency of the input power to the heater is high.

Further, since the catalyst is applied after the joined body having the flow path therein is formed in the joining process, there is no possibility of deactivation of the catalyst due to heat in the joining process so that the selection width of the catalyst is broadened. Further, by preparing a plurality of joined bodies through completion up to the joining process and applying desired catalysts to these joined bodies, it is possible to produce microreactors to be used in different reactions, for example, microreactors for reforming methanol and for oxidation of carbon monoxide depending on uses, and therefore, simplification of the production processes is made possible. Further, the formation of the microchannel portion on the metal substrate does not require the processing by a micromachine, but can be easily implemented by a low-priced processing method such as etching, and further, the polishing process is also unnecessary, so that reduction in production cost of the microreactor can be achieved. Further, if it is configured such that no angular portion exists on the inner wall surface of the flow path, dispersion of the applying amount in the catalyst applying process is suppressed so that the catalyst can be uniformly applied.

Further, the present invention is configured such that a microreactor for obtaining hydrogen gas by reforming a feed material, comprises at least a plurality of unit flow path members each having a flow path inside, said flow path having one end portion serving as an inlet and the other end portion serving as an outlet, and a coupling member retaining said unit flow path members in a multi-step state, wherein said coupling member comprises a plurality of coupling portions for tightly retaining the unit flow path members at positions where the inlets of the unit flow path members are located and at positions where the outlets thereof are located, a feed material inlet, and a gas outlet, wherein at least one of said unit flow path members is a unit microreactor carrying a catalyst in said flow path, and wherein a feed material is introduced from the feed material inlet of said coupling member, and a predetermined reaction is carried out in said unit microreactor in said plurality of unit flow path members to thereby obtain desired produced gas from the gas outlet of said coupling member.

According to the foregoing present invention, in the unit flow path members coupled and retained together in the multi-step state, the desired unit flow path member is selected to be the unit microreactor applying the catalyst to the flow path. Therefore, the space utilization efficiency is improved and, depending on selection of the number of steps of unit microreactors and kinds of catalysts to be applied to the unit microreactors, there is enabled a microreactor for hydrogen production having desired performance and property. Further, by making each unit flow path member detachable, it is possible to maintain the function of the microreactor as a whole by exchanging only such a unit microreactor suffering deactivation or degradation of a catalyst. Further, by allowing a catalyst to be applied after formation of a joined body to constitute a unit microreactor, it becomes possible to use unit flow path members (joined bodies) of the same structure and incorporate a unit microreactor carrying a catalyst satisfying a required function, which enables reduction in production cost and running cost of the microreactor. Further, by providing a heater in a desired unit microreactor, or interposing a gap for thermal insulation or a heat insulating material between unit flow path members, an optimum temperature can be ensured per unit microreactor so that improvement in reaction efficiency and effective utilization of heat are made possible.

BRIEF DESCRIPTION OF THE DRAWINGS

FIG. 25 is a sectional view of the coupling member shown in FIG. 24, wherein FIG. 25A is a sectional view taken along line II-II and FIG. 25B is a sectional view taken along line III-III.

BEST MODE FOR CARRYING OUT THE INVENTION

Hereinbelow, embodiments of the present invention will be described with reference to the drawings.

[Microreactor]

First, a microreactor of the present invention will be described.

First Embodiment of Microreactor

Figure 1:
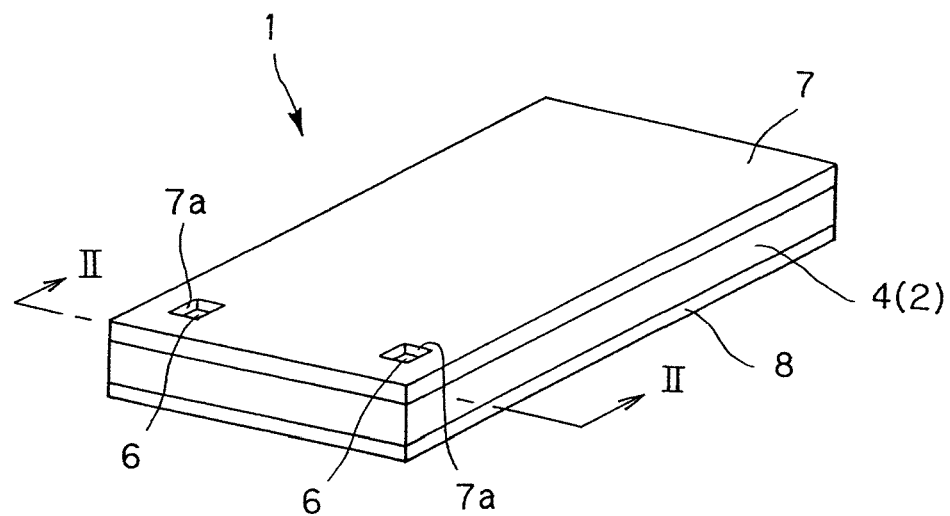
FIG. 1 is a perspective view showing one embodiment of a microreactor of the present invention.
Figure 2:
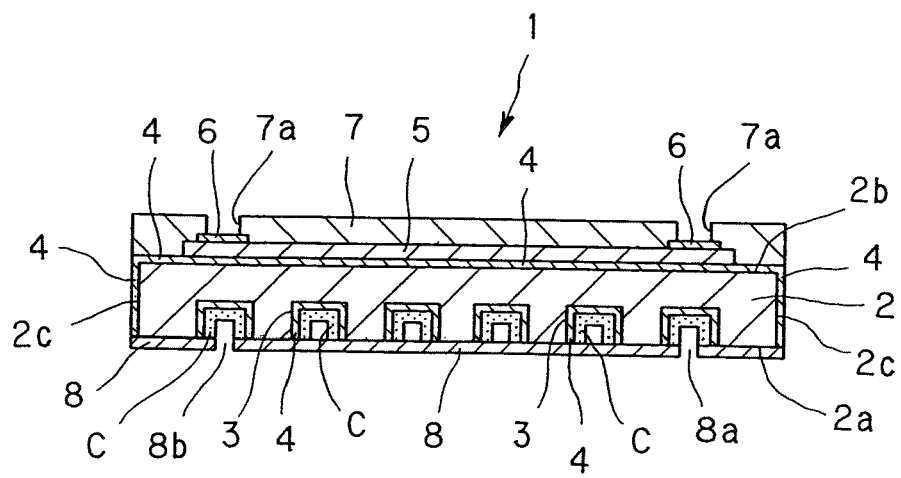
FIG. 2 is an enlarged longitudinal sectional view of the microreactor shown in FIG. 1, taken along line II-II.

FIG. 1 is a perspective view showing one embodiment of the microreactor of the present invention, and FIG. 2 is an enlarged longitudinal sectional view of the microreactor shown in FIG. 1, taken along line II-II. In FIGS. 1 and 2, the microreactor 1 of the present invention comprises a metal substrate 2, a microchannel portion 3 formed on one surface 2a of the metal substrate 2, an insulating film 4 in the form of a metal oxide film formed on the inside of the microchannel portion 3 and on both surfaces 2a and 2b and side surfaces 2c of the metal substrate 2, a heater 5 provided on the surface 2b of the metal substrate 2 via the insulating film 4, a catalyst C supported on the microchannel portion 3, and a cover member 8 joined to the metal substrate 2 so as to cover the foregoing microchannel portion 3. The heater 5 is formed with electrodes 6 and 6, and a heater protective layer 7 having electrode opening portions 7a and 7a for exposing the electrodes 6 and 6 is provided so as to cover the heater 5. Further, the foregoing cover member 8 is provided with a feed material inlet 8a and a gas outlet 8b.

Figure 3:
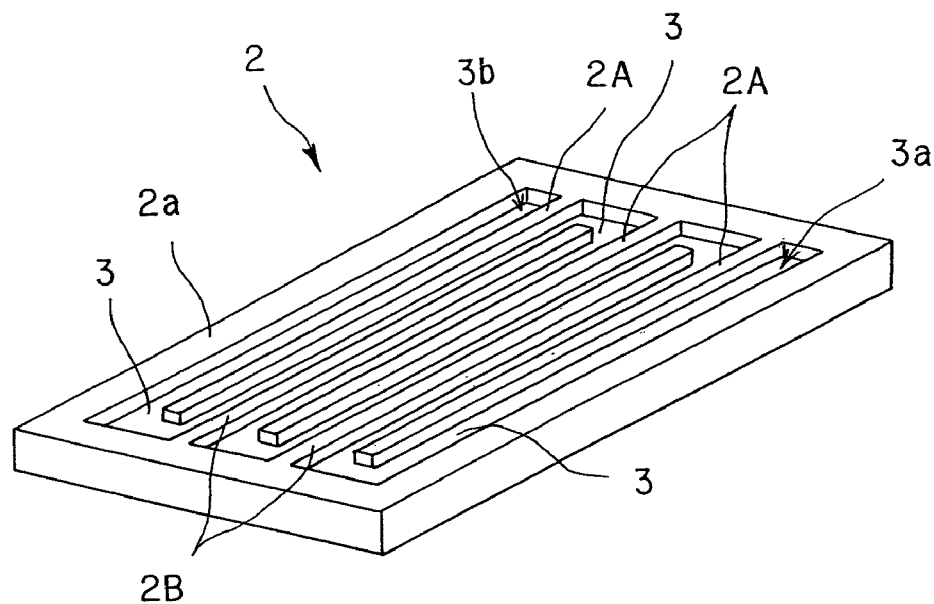
FIG. 3 is a perspective view showing the side, where a microchannel portion is formed, of a metal substrate of the microreactor shown in FIG. 1.

FIG. 3 is a perspective view showing the side, where the microchannel portion 3 is formed, of the metal substrate 2 of the microreactor 1 shown in FIG. 1. As shown in FIG. 3, the microchannel portion 3 is formed so as to leave comb-shaped ribs 2A and 2B and has a shape that is continuous from an end portion 3a to an end portion 3b. By locating the feed material inlet 8a of the cover member 8 at the end portion 3a and the gas outlet 8b at the end portion 3b, there is formed a flow path that is continuous from the feed material inlet 8a to the gas outlet 8b.

For the metal substrate 2 forming the microreactor 1 of the present invention, there can be used such metal that can form the metal oxide film (insulating film 4) by anodic oxidation. As such metal, there can be cited, for example, Al, Si, Ta, Nb, V, Bi, Y, W, Mo, Zr, Hf, or the like. Among these metals, particularly Al is preferably used in terms of processing suitability, properties such as a heat capacity and a thermal conductivity, and a unit price. The thickness of the metal substrate 2 can be suitably set taking into account the size of the microreactor 1, properties such as a heat capacity and a thermal conductivity of metal to be used, the size of the microchannel portion 3 to be formed, and so forth. For example, it can be set within a range of about 50 to 2000 μm.

The formation of the metal oxide film (insulating film 4) by anodic oxidation on the metal substrate 2 can be implemented by, in the state where the metal substrate 2 is connected to an anode as an external electrode, immersing the metal substrate 2 in an anode oxidizing solution so as to confront a cathode and energizing it. The thickness of the metal oxide film (insulating film 4) can be set within a range of, for example, about 5 to 154 μm.

The microchannel portion 3 formed on the metal substrate 2 is not limited to the shape as shown in FIG. 3, but can be formed into a desirable shape like one wherein an amount of the catalyst C supported on the microchannel portion 3 increases and the flow path length in which a feed material contacts with the catalyst C is prolonged. Normally, the depth of the microchannel portion 3 can be set within a range of about 100 to 1000 μm, the width thereof can be set within a range of about 100 to 1000 μm, and the flow path length thereof can fall within a range of about 30 to 300 mm.

In the present invention, since the insulating film 4 in the form of the metal oxide film is formed also on the inside of the microchannel portion 3, a applying amount of the catalyst C is increased to enable stable catalyst applying due to a surface structure of the metal oxide film having microholes.

As the catalyst C, it is possible to use a known catalyst that has conventionally been employed for steam reforming.

The heater 5 forming the microreactor 1 of the present invention is for supplying heat required for steam heating of the feed material, which is an endothermic reaction, and it is possible to use therefor a material such as carbon paste, nichrome (Ni—Cr alloy), W (tungsten), or Mo (molybdenum). The heater 5 can have a shape like one that is obtained by, for example, drawing a fine line having a width of about 10 to 200 μm over the whole of a region on the metal substrate surface 2b (insulating film 4) corresponding to a region where the microchannel portion 3 is formed.

Such a heater 5 is formed with the electrodes 6 and 6 for energization. The electrodes 6 and 6 for energization can be formed using a conductive material such as Au, Ag, Pd, or Pd—Ag.

The heater protective layer 7 has the electrode opening portions 7a and 7b for exposing the foregoing electrodes 6 and 6 and is disposed so as to cover the heater 5. The heater protective layer 7 can be formed of, for example, photosensitive polyimide, polyimide varnish, or the like. The thickness of the heater protective layer 7 can be suitably set taking into account a material to be used and so forth. For example, it can be set within a range of about 2 to 25 μm.

For the cover member 8 forming the microreactor 1 of the present invention, an Al alloy, a Cu alloy, a stainless material, or the like can be used. The thickness of the cover member 8 can be suitably set taking into account a material to be used and so forth. For example, it can be set within a range of about 20 to 200 µm. The feed material inlet 8a and the gas outlet 8b of the cover member 8 are provided so as to be located at both end portions 3a and 3b of the flow path of the microchannel portion 3 formed on the metal substrate 2.

Second Embodiment of Microreactor

Figure 4:
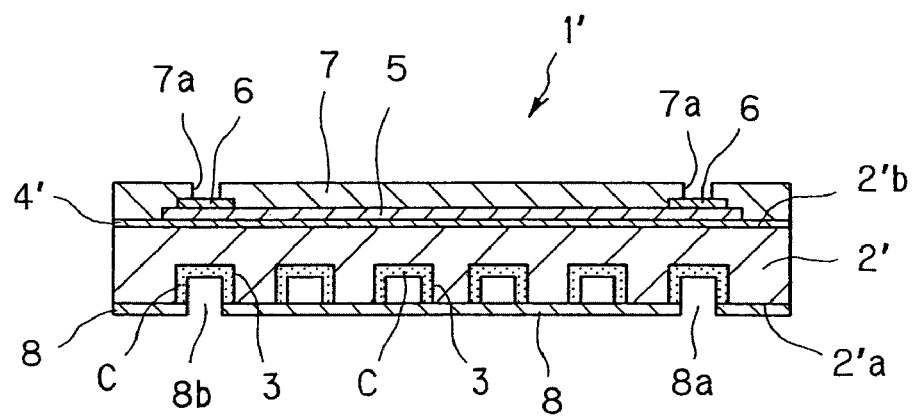
FIG. 4 is a longitudinal sectional view, corresponding to FIG. 2, showing another embodiment of a microreactor of the present invention.

FIG. 4 is a longitudinal sectional view, corresponding to FIG. 2, showing another embodiment of the microreactor of the present invention. In FIG. 4, the microreactor 1' of the present invention comprises a metal substrate 2', a microchannel portion 3 formed on one surface 2'a of the metal substrate 2', an insulating film 4' formed on the other surface 2'b of the metal substrate 2', a heater 5 provided on the surface 2'b of the metal substrate 2' via the insulating film 4', a catalyst C supported on the microchannel portion 3, and a cover member 8 joined to the metal substrate 2' so as to cover the foregoing microchannel portion 3. The heater 5 is formed with electrodes 6 and 6, and a heater protective layer 7 having electrode opening portions 7a and 7a for exposing the electrodes 6 and 6 is provided so as to cover the heater 5. Further, the foregoing cover member 8 is provided with a feed material inlet 8a and a gas outlet 8b.

Such a microreactor 1' is the same as the foregoing microreactor 1 except that the metal member 2' and the insulating layer 4' are different and that the metal oxide film (insulating layer 4) is not formed in the microchannel portion 3, and therefore, the same constituent members are assigned the same member numerals to omit description thereof.

As the metal substrate 2' forming the microreactor 1' of the present invention, use can be made of any of an Al substrate, a Cu substrate, a stainless substrate, and so forth. The thickness of the metal substrate 2' can be suitably set taking into account the size of the microreactor 1', properties such as a heat capacity and a thermal conductivity of metal to be used, the size of the microchannel portion 3 to be formed, and so forth. For example, it can be set within a range of about 50 to 2000 µm.

The insulating film 4' formed on the surface 2'b of the metal substrate 2' can be formed of, for example, polyimide, ceramic ($Al_2O_3$, $SiO_2$), or the like. The thickness of such an insulating film 4' can be suitably set taking into account properties of a material to be used and so forth. For example, it can be set within a range of about 1 to 30 µm.

The microreactor 1, 1' of the present invention as described above uses the metal substrate 2, 2' having a higher thermal conductivity and a smaller heat capacity as compared with a silicon substrate or a ceramic substrate, and therefore, heat is transmitted from the heater 5 to the applied catalyst C with a high efficiency, so that there is enabled a reformer for hydrogen production wherein the rising is fast upon starting up from the stopped state and the utilization efficiency of the input power to the heater is high.

Third Embodiment of Microreactor

Figure 5:
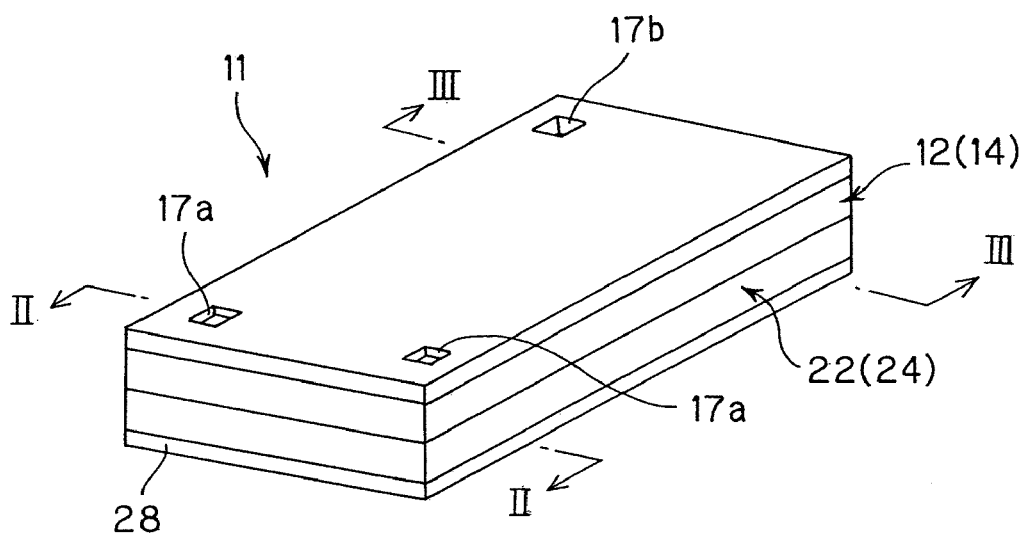
FIG. 5 is a perspective view showing one embodiment of a microreactor of the present invention.
Figure 6:
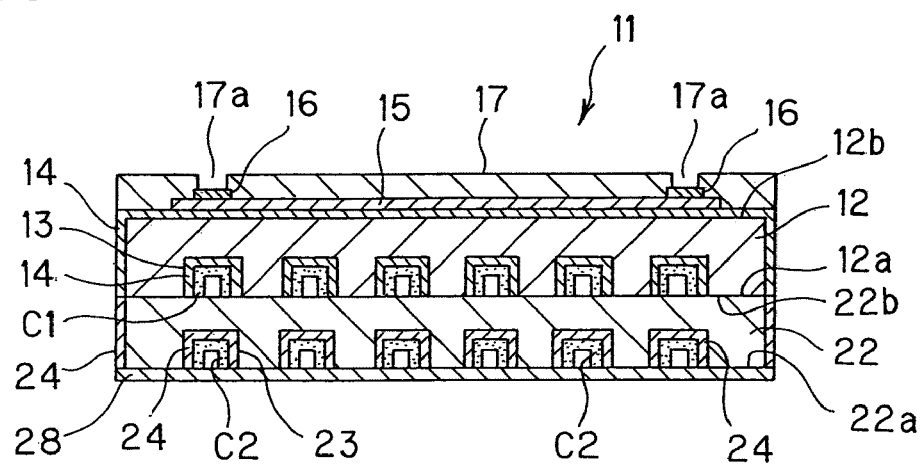
FIG. 6 is an enlarged longitudinal sectional view of the microreactor shown in FIG. 5, taken along line II-II.
Figure 7:
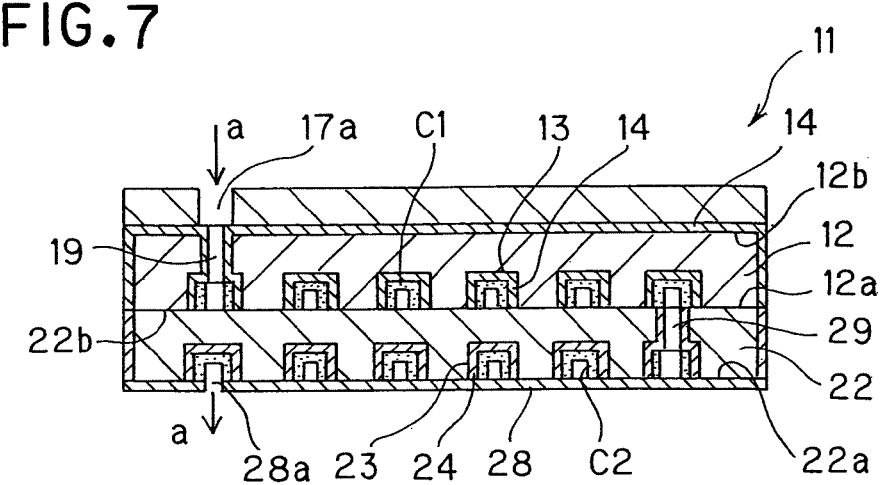
FIG. 7 is an enlarged longitudinal sectional view of the microreactor shown in FIG. 5, taken along line III-III.

FIG. 5 is a perspective view showing one embodiment of the microreactor of the present invention, FIG. 6 is an enlarged longitudinal sectional view of the microreactor shown in FIG. 5, taken along line II-II, and FIG. 7 is an enlarged longitudinal sectional view of the microreactor shown in FIG. 5, taken along line III-III.

In FIGS. 5 to 7, the microreactor 11 of the present invention has a two-step structure in which a metal substrate 12 and a metal substrate 22 are joined together. The first-step metal substrate 12 comprises a microchannel portion 13 formed on one surface 12a thereof, a through hole 19 having an opening at a predetermined portion of the microchannel portion 13, an insulating film 14 in the form of a metal oxide film formed on the inside of the through hole 19, on the inside of the microchannel portion 13, and on the other surface 12b and side surfaces 12c of the metal substrate 12, a heater 15 provided on the surface 12b of the metal substrate 12 via the insulating film 14, and a catalyst C1 supported on the microchannel portion 13. Further, the heater 15 is formed with electrodes 16 and 16, and a heater protective layer 17 having electrode opening portions 17a and 17a for exposing the electrodes 16 and 16 and an opening portion 17b for exposing the opening of the foregoing through hole 19 is provided so as to cover the heater 15.

On the other hand, the second-step metal substrate 22 comprises a microchannel portion 23 formed on one surface 22a thereof, a through hole 29 having an opening at a predetermined portion of the microchannel portion 23, an insulating film 24 in the form of a metal oxide film formed on the inside of the through hole 29, on the inside of the microchannel portion 23, and on side surfaces 22c of the metal substrate 22, a catalyst C2 supported on the microchannel portion 23, and a cover member 28 joined to the surface 22a so as to cover the microchannel portion 23. The cover member 28 is provided with a gas outlet 28a.

Figure 8:
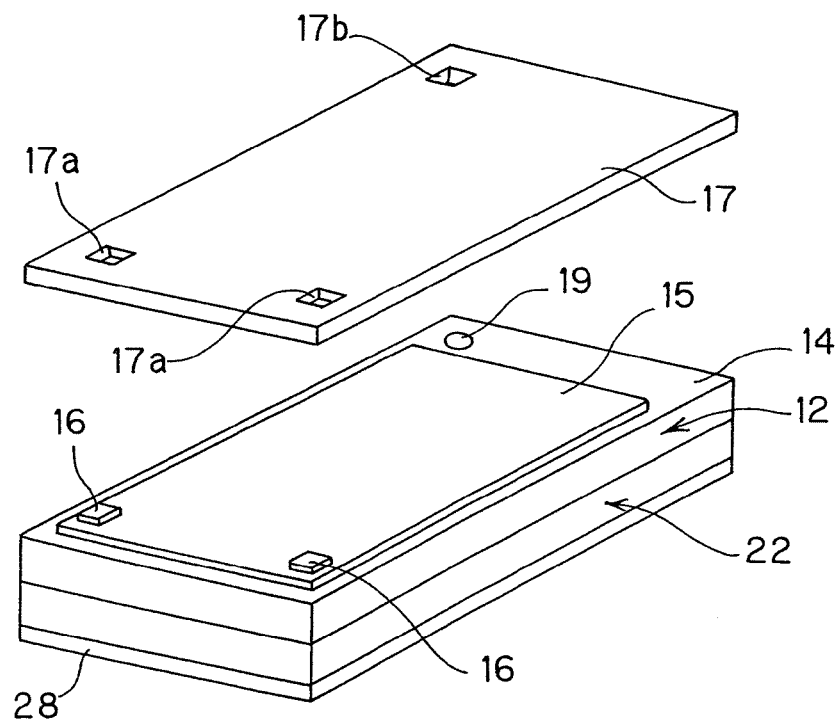
FIG. 8 is a perspective view showing the state where a heater protective layer 7 is peeled off in the microreactor 1 shown in FIG. 5.

FIG. 8 is a perspective view showing the state where the heater protective layer 17 is peeled off in the microreactor 11 shown in FIG. 5. As shown in FIG. 8, the heater 15 is provided on the surface 12b of the metal substrate 12 via the insulating layer 14. The opening portion 17b of the heater protective layer 17 serves as a feed material inlet. Incidentally, the heater 15 may be provided so as to further surround the through hole 19.

Figure 9:
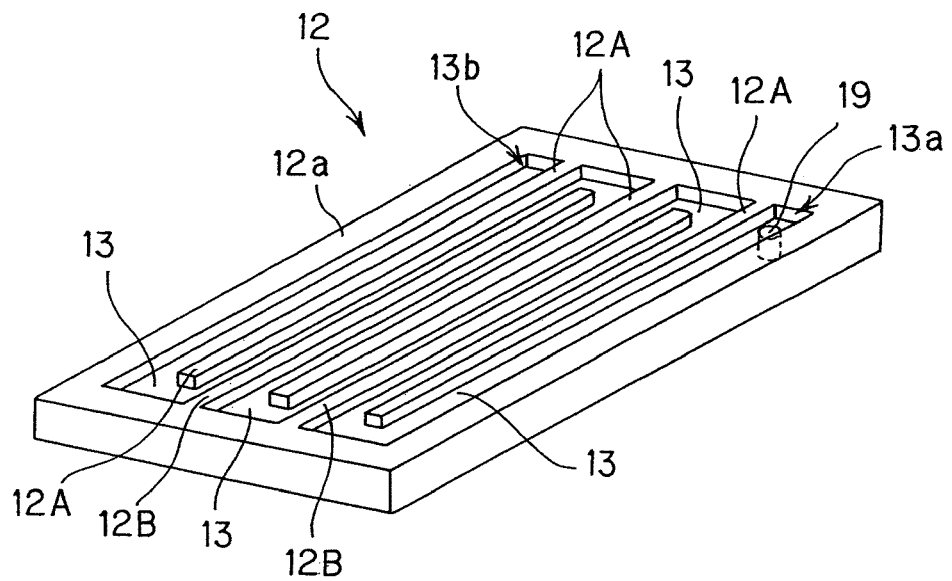
FIG. 9 is a perspective view showing the side, where a microchannel portion is formed, of a first-step metal substrate of the microreactor shown in FIG. 5.

FIG. 9 is a perspective view showing the side, where the microchannel portion 13 is formed, of the first-step metal substrate 12 forming the microreactor 11 shown in FIG. 5. As shown in FIG. 9, the microchannel portion 13 is formed so as to leave comb-shaped ribs 12A and 12B and has a shape that is continuous from an end portion 13a to an end portion 13b. The opening of the through hole 19 is exposed at the end portion 13a of the microchannel portion 13.

Figure 10:
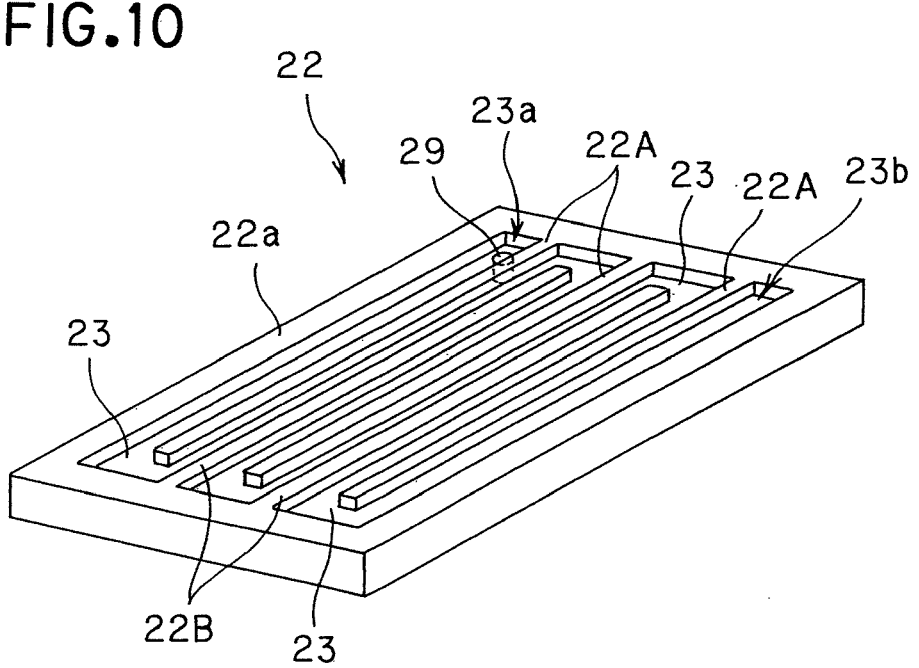
FIG. 10 is a perspective view showing the side, where a microchannel portion is formed, of a second-step metal substrate of the microreactor shown in FIG. 5.

FIG. 10 is a perspective view showing the side, where the microchannel portion 23 is formed, of the second-step metal substrate 22 forming the microreactor 11 shown in FIG. 5. As shown in FIG. 10, the microchannel portion 23 is formed so as to leave comb-shaped ribs 22A and 22B and has a shape that is continuous from an end portion 23a to an end portion 23b. The opening of the through hole 29 is exposed at the end portion 23a of the microchannel portion 23, and the other opening of the through hole 29 is located at the end portion 13b of the microchannel portion 13 of the foregoing metal substrate 12 in the two-step stacked structure. Further, in the microreactor 11, the gas outlet 28a of the cover member 28 is located at the end portion 23b of the microchannel portion 23. Thereby, as shown by arrows a in FIG. 7, there is formed a continuous flow path running from the opening portion 17b, serving as the feed material inlet, of the heater protective layer 17, through the through hole 19 of the first-step metal substrate 12, and in the microchannel portion 13 from the end portion 13a, then running from the end portion 13b, through the through hole 29 of the second-step metal substrate 22, and in the microchannel portion 23 from the end portion 23a, then passing through the gas outlet 28a from the end portion 23b to reach the outside.

For the metal substrate 12, 22 forming the microreactor 11 of the present invention, there can be used such metal that can form the metal oxide film (insulating film 14, 24) by anodic oxidation. As such metal, there can be cited, for example, Al, Si, Ta, Nb, V, Bi, Y, W, Mo, Zr, Hf, or the like. Among these metals, particularly Al is preferably used in terms of processing suitability, properties such as a heat capacity and a thermal conductivity, and a unit price. The thickness of the metal substrate 12, 22 can be suitably set taking into account the size of the microreactor 11, properties such as a heat capacity and a thermal conductivity of metal to be used, the size of the microchannel portion 13, 23 to be formed, and so forth. For example, it can be set within a range of about 50 to 2000 µm.

The formation of the metal oxide film (insulating film 14, 24) by anodic oxidation on the metal substrate 12, 22 can be implemented by, in the state where the metal substrate 12, 22 is connected to an anode as an external electrode, immersing the metal substrate 12, 22 in an anode oxidizing solution so as to confront a cathode and energizing it. The thickness of the metal oxide film (insulating film 14, 24) can be set within a range of, for example, about 5 to 154 µm.

The microchannel portion 13, 23 formed on the metal substrate 12, 22 is not limited to the shape as shown in FIG. 9 or FIG. 10, but can be formed into a desirable shape like one wherein an amount of the catalyst C1, C2 supported on the microchannel portion 13, 23 increases and the flow path length in which a feed material contacts with the catalyst C1, C2 is prolonged. Normally, the depth of the microchannel portion 13, 23 can be set within a range of about 50 to 1000 µm, the width thereof can be set within a range of about 50 to 1000 µm, and the flow path length thereof can fall within a range of about 30 to 400 mm.

In the present invention, since the insulating film 14, 24 in the form of the metal oxide film is formed also on the inside of the microchannel portion 13, 23, a applying amount of the catalyst C1, C2 is increased to enable stable catalyst applying due to a surface structure of the metal oxide film having microholes.

As the catalysts C1 and C2, it is possible to use known catalysts that have conventionally been employed for steam reforming. For example, when mixing of feed materials, vaporization of the mixed feed material, and reforming of mixture gas are carried out in the microchannel portion 13 of the first-step metal substrate 12 and removal of impurities from reformed gas is carried out in the microchannel portion 23 of the second-step metal substrate 22, it is possible to use $Cu-ZnO/Al_2O_3$ or the like as the catalyst C1, and $Pt/Al_2O_3$ or the like as the catalyst C2.

The heater 15 forming the microreactor 11 of the present invention is for supplying heat required for steam heating of the feed material, which is an endothermic reaction, and it is possible to use therefor a material such as carbon paste, nichrome (Ni—Cr alloy), W (tungsten), or Mo (molybdenum). The heater 15 can have a shape that is obtained by, for example, drawing around a fine line having a width of about 10 to 200 µm over the whole of a region on the metal substrate surface 12b (insulating film 14) corresponding to a region where the microchannel portion 13 is formed, but not closing the through hole 19. Incidentally, when the heater is provided on only one metal substrate like in this embodiment, it is preferable to provide it on the metal substrate that carries out reforming of the mixture gas.

Such a heater 15 is formed with the electrodes 16 and 16 for energization. The electrodes 16 and 16 for energization can be formed using a conductive material such as Au, Ag, Pd, or Pd—Ag.

The heater protective layer 17 has the electrode opening portions 17a and 17b for exposing the foregoing electrodes 16 and 16 and the opening portion 17b for exposing the opening of the foregoing through hole 19, and is disposed so as to cover the heater 15. The heater protective layer 17 can be formed of, for example, photosensitive polyimide, polyimide varnish, or the like. The thickness of the heater protective layer 17 can be suitably set taking into account a material to be used and so forth. For example, it can be set within a range of about 2 to 25 µm.

For the cover member 28 forming the microreactor 11 of the present invention, an Al alloy, a Cu alloy, a stainless material, or the like can be used. The thickness of the cover member 28 can be suitably set taking into account a material to be used and so forth. For example, it can be set within a range of about 20 to 400 µm. The gas outlet 28a of the cover member 28 is provided so as to be located at the end portion 23b of the flow path of the microchannel portion 23 formed on the metal substrate 22.

Fourth Embodiment of Microreactor

Figure 11:
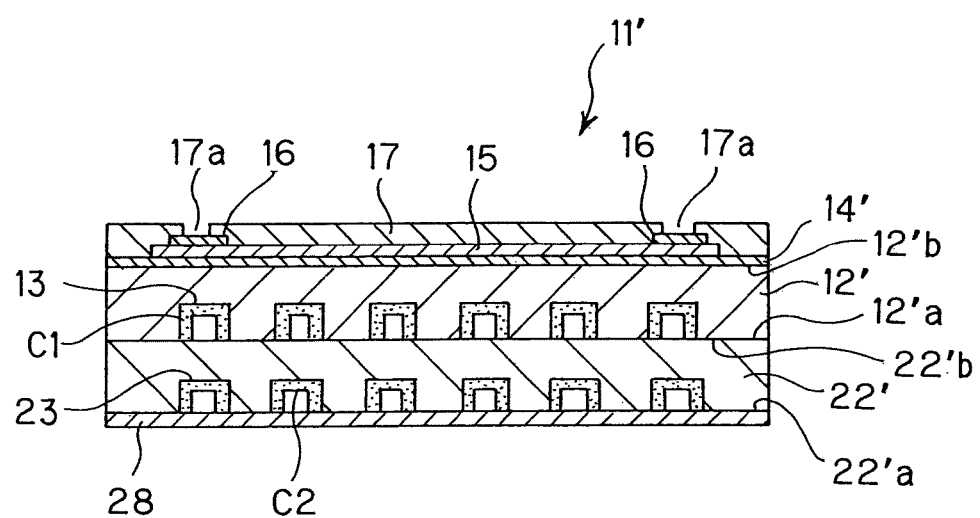
FIG. 11 is a longitudinal sectional view, corresponding to FIG. 6, showing another embodiment of a microreactor of the present invention.

FIG. 11 is a longitudinal sectional view, corresponding to FIG. 6, showing another embodiment of the microreactor of the present invention. In FIG. 11, the microreactor 11' of the present invention has a two-step structure in which a metal substrate 12' and a metal substrate 22' are joined together. The first-step metal substrate 12' comprises a microchannel portion 13 formed on one surface 12'a thereof, a through hole 19 (not illustrated) having an opening at a predetermined portion of the microchannel portion 13, an insulating film 14' formed on the other surface 12'b of the metal substrate 12', a heater 15 provided on the surface 12'b of the metal substrate 12' via the insulating film 14', and a catalyst C1 supported on the microchannel portion 13. Further, the heater 15 is formed with electrodes 16 and 16, and a heater protective layer 17 having electrode opening portions 17a and 17a for exposing the electrodes 16 and 16 and an opening portion 17b (not illustrated) for exposing the opening of the foregoing through hole 19 is provided so as to cover the heater 15.

On the other hand, the second-step metal substrate 22' comprises a microchannel portion 23 formed on one surface 22'a thereof, a through hole 29 (not illustrated) having an opening at a predetermined portion of the microchannel portion 23, a catalyst C2 supported on the microchannel portion 23, and a cover member 28 joined to the surface 22'a so as to cover the microchannel portion 23. The cover member 28 is provided with a gas outlet 28a.

Such a microreactor 11' is the same as the foregoing microreactor 11 except that the metal member 12', 22' and the insulating layer 14', 24' are different and that the metal oxide film (insulating layer 14, 24) is not formed in the microchannel portion 13, 23 or the through hole 19, 29, and therefore, the same constituent members are assigned the same member numerals to omit description thereof.

As the metal substrate 12', 22' forming the microreactor 11' of the present invention, use can be made of any of an Al substrate, a Cu substrate, a stainless substrate, and so forth. The thickness of the metal substrate 12', 22' can be suitably set taking into account the size of the microreactor 11', properties such as a heat capacity and a thermal conductivity of metal to be used, the size of the microchannel portion 13 to be formed, and so forth. For example, it can be set within a range of about 50 to 2000 µm.

The insulating film 14' formed on the surface 12'b of the metal substrate 12' can be formed of, for example, polyimide, ceramic ($Al_2O_3$, $SiO_2$), or the like. The thickness of such an insulating film 14' can be suitably set taking into account properties of a material to be used and so forth. For example, it can be set within a range of about 1 to 30 µm.

In the microreactor 11, 11' of the present invention as described above, a series of the operations, i.e. mixing of the feed materials, vaporization thereof, reforming of the mixture gas, and removal of the impurities, can be performed in the microchannel portions 13 and 23, carrying the catalysts, of the metal substrates 12 and 22, 12' and 22' stacked in two steps, so that high purity hydrogen gas can be obtained from the gas outlet 28a of the cover member 28. Therefore, the space efficiency is largely improved as compared with a case where a plurality of microreactors are connected by connecting pipes. Further, use is made of the metal substrates 12, 12', 22, 22' having a higher thermal conductivity and a smaller heat capacity as compared with a silicon substrate or a ceramic substrate, and therefore, heat is transmitted from the heater 15 to the applied catalysts C1 and C2 with a high efficiency, so that there is enabled a reformer for hydrogen production wherein the rising is fast upon starting up from the stopped state and the utilization efficiency of the input power to the heater is high.

The foregoing embodiments of the microreactors are only examples. For example, a multi-step structure with three or more steps may be employed and, in this case, it is preferable to provide the heater at least on the metal substrate that carries out reforming of the mixture gas.

Fifth Embodiment of Microreactor

Figure 12:
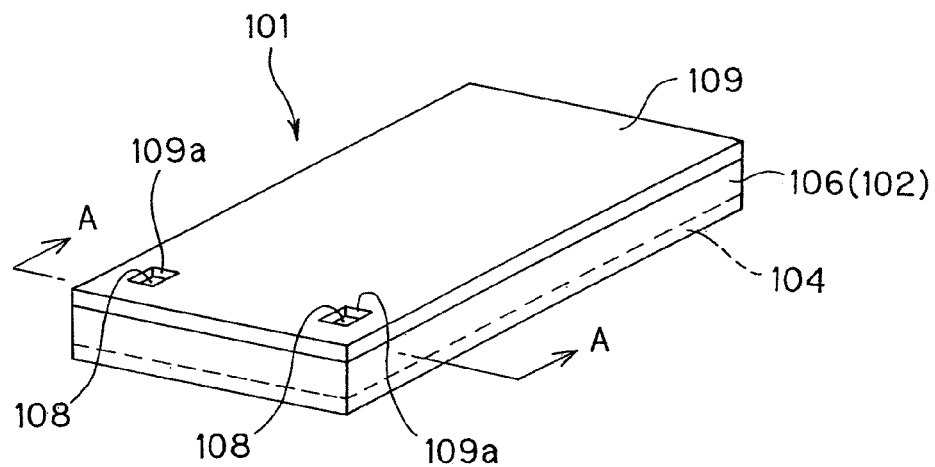
FIG. 12 is a perspective view showing one embodiment of a microreactor of the present invention.
Figure 13:
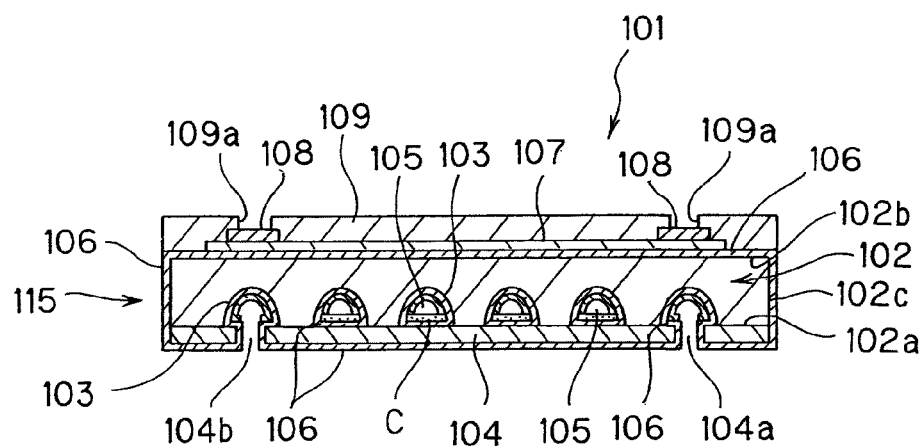
FIG. 13 is an enlarged longitudinal sectional view of the microreactor shown in FIG. 12, taken along line A-A.

FIG. 12 is a perspective view showing one embodiment of the microreactor of the present invention, and FIG. 13 is an enlarged longitudinal sectional view of the microreactor shown in FIG. 12, taken along line A-A. In FIGS. 12 and 13, the microreactor 101 of the present invention has a joined body 115 comprising a metal substrate 102 formed with a microchannel portion 103 on one surface 102a thereof, and a metal cover member 104 joined to the surface 102a of the metal substrate 102 so as to cover the microchannel portion 103. Inside the joined body 115, there is formed a flow path 105 composed of the microchannel portion 103 and the metal cover member 104, and a catalyst C is supported on the whole inner wall surface of the flow path 105 via a metal oxide film 106. Further, the foregoing metal cover member 104 is provided with a feed material inlet 104a and a gas outlet 104b which are located at respective end portions of the flow path 105. The foregoing metal oxide film 106 is an insulating film and is also formed on the surfaces of the joined body 115 (a surface 102b and side surfaces 102c of the metal substrate 102 and the surface of the metal cover member 104) apart from the inner wall surface of the flow path 105. Further, a heater 107 is provided on the surface 102b of the metal substrate 102 via the metal oxide film 106 and formed with electrodes 108 and 108, and a heater protective layer 109 having electrode opening portions 109a and 109a for exposing the electrodes 108 and 108 is provided so as to cover the heater 107.

Figure 14:
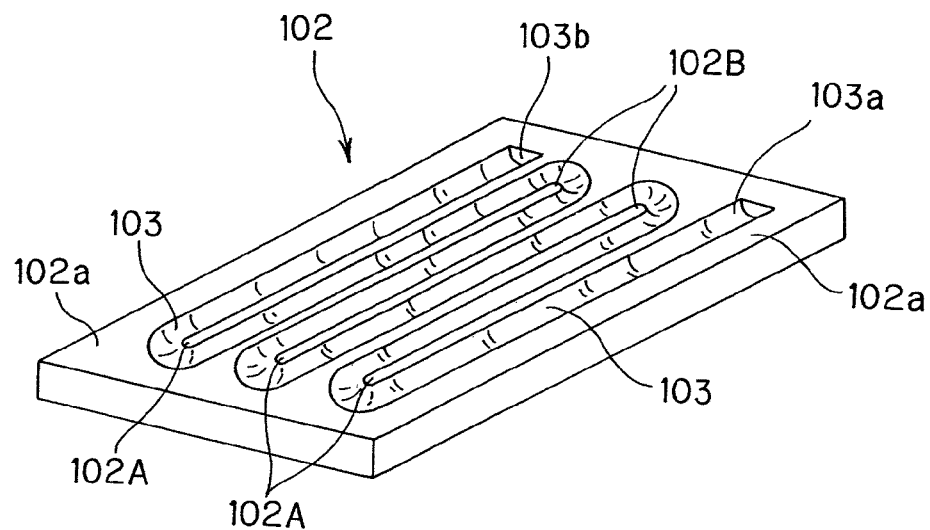
FIG. 14 is a perspective view showing the side, where a microchannel portion is formed, of a metal substrate forming the microreactor shown in FIG. 12.

FIG. 14 is a perspective view showing the side, where the microchannel portion 103 is formed, of the metal substrate 102 of the microreactor 101 shown in FIG. 12. As shown in FIG. 14, the microchannel portion 103 is formed so as to turn back by 180 degrees at respective tip portions of comb-shaped ribs 102A and 102B and has a shape that is continuous from an end portion 103a to an end portion 103b while meandering. The shape of an inner wall surface of the microchannel portion 103 in a section perpendicular to a fluid flow direction of the flow path 105 is generally semicircular. Further, the turnback of the flow path at each of the tip portions of the comb-shaped ribs 102A and 102B is rounded with no angular portion. The feed material inlet 104a of the metal cover member 104 is located at the end portion 103a of the microchannel portion 103, and the gas outlet 104b is located at the end portion 103b of the microchannel portion 103.

For the metal substrate 102 forming the microreactor 101, there can be used such metal that can form the metal oxide film (insulating film) 105 by anodic oxidation. As such metal, there can be cited, for example, Al, Si, Ta, Nb, V, Bi, Y, W, Mo, Zr, Hf, or the like. Among these metals, particularly Al is preferably used in terms of processing suitability, properties such as a heat capacity and a thermal conductivity, and a unit price. The thickness of the metal substrate 102 can be suitably set taking into account the size of the microreactor 101, properties such as a heat capacity and a thermal conductivity of metal to be used, the size of the microchannel portion 103 to be formed, and so forth. For example, it can be set within a range of about 50 to 2000 µm.

The microchannel portion 103 formed on the metal substrate 102 is not limited to the shape as shown in FIG. 14, but can be formed into a desirable shape like one wherein an amount of the catalyst C supported on the microchannel portion 103 increases and the flow path length in which a feed material contacts with the catalyst C is prolonged. Particularly, such a shape of the microchannel portion 103 is preferable wherein an angular portion (e.g. a portion of the internal wall surface that is angularly bent at a position where the direction of the flow path changes) does not exist on the internal wall surface along the fluid flow direction of the flow path 105. Further, the shape of the inner wall surface of the microchannel portion 103 in the section perpendicular to the fluid flow direction of the flow path 105 is preferably a circular arc shape, a semicircular shape, or a U-shape. For example, the depth of such a microchannel portion 103 can be set within a range of about 100 to 1000 µm, the width thereof can be set within a range of about 100 to 1000 µm, and the flow path length thereof can fall within a range of about 30 to 300 mm.

In this embodiment, since the metal oxide film 106 is formed on the inner wall surface of the flow path 105, a applying amount of the catalyst C is increased to enable stable catalyst applying due to a surface structure of the metal oxide film having microholes.

As the catalyst C, it is possible to use a known catalyst that has conventionally been employed for steam reforming.

For the metal cover member 104 forming the microreactor 101, there can be used such metal that can form the metal oxide film (insulating film) 106 by anodic oxidation. As such metal, there can be cited, for example, Al, Si, Ta, Nb, V, Bi, Y, W, Mo, Zr, Hf, or the like. Among these metals, particularly Al is preferably used in terms of processing suitability, properties such as a heat capacity and a thermal conductivity, and a unit price. The thickness of the metal cover member 104 can be suitably set taking into account a material to be used and so forth. For example, it can be set within a range of about 20 to 200 µm. The feed material inlet 104a and the gas outlet 104b of the metal cover member 104 are provided so as to be located at both end portions 103a and 103b of the microchannel portion 103 formed on the metal substrate 102.

The formation of the metal oxide film (insulating film) 106 by anodic oxidation on the joined body 115 formed by joining together the metal substrate 102 and the metal cover member 104 can be implemented by, in the state where the joined body 115 is connected to an anode as an external electrode, immersing the joined body 115 in an anode oxidizing solution so as to confront a cathode and energizing it. The thickness of the metal oxide film (insulating film) 106 can be set within a range of, for example, about 5 to 150 μm.

The heater 107 forming the microreactor 101 is for supplying heat required for steam heating of the feed material, which is an endothermic reaction, and it is possible to use therefor a material such as carbon paste, nichrome (Ni—Cr alloy), W (tungsten), or Mo (molybdenum). The heater 107 can have a shape like one that is obtained by, for example, drawing around a fine line having a width of about 10 to 200 μm over the whole of a region on the metal substrate surface 102b (metal oxide film 106) corresponding to a region where the microchannel portion 103 is formed.

Such a heater 107 is formed with the electrodes 108 and 108 for energization. The electrodes 108 and 108 for energization can be formed using a conductive material such as Au, Ag, Pd, or Pd—Ag.

The heater protective layer 109 has the electrode opening portions 109a and 109a for exposing the foregoing electrodes 108 and 108 and is disposed so as to cover the heater 107. The heater protective layer 109 can be formed of, for example, photosensitive polyimide, polyimide varnish, or the like. The thickness of the heater protective layer 109 can be suitably set taking into account a material to be used and so forth. For example, it can be set within a range of about 2 to 25 μm.

Sixth Embodiment of Microreactor

Figure 15:
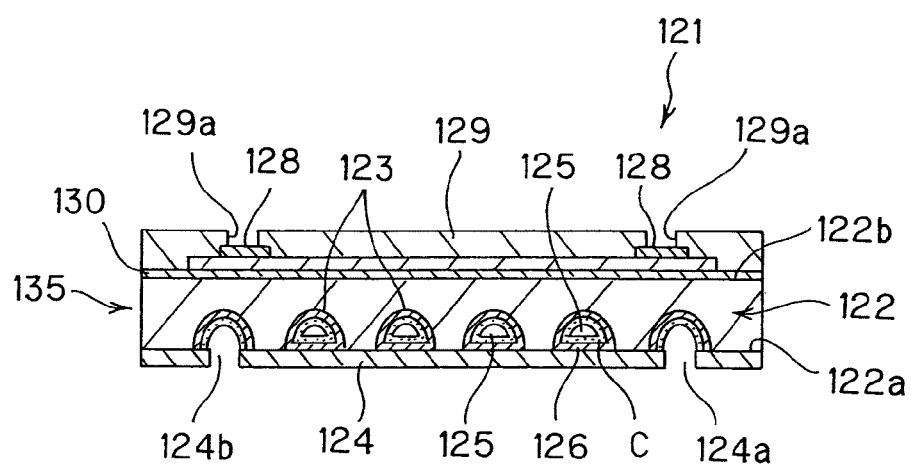
FIG. 15 is a longitudinal sectional view, corresponding to FIG. 13, showing another embodiment of a microreactor of the present invention.

FIG. 15 is a longitudinal sectional view, corresponding to FIG. 13, showing another embodiment of the microreactor of the present invention. In FIG. 15, the microreactor 121 of the present invention has a joined body 135 comprising a metal substrate 122 formed with a microchannel portion 123 on one surface 122a thereof, and a metal cover member 124 joined to the surface 122a of the metal substrate 122 so as to cover the microchannel portion 123. Inside the joined body 135, there is formed a flow path 125 composed of the microchannel portion 123 and the metal cover member 124, and a catalyst C is supported on the whole inner wall surface of the flow path 125 via a metal oxide film 126. The foregoing metal cover member 124 is provided with a feed material inlet 124a and a gas outlet 124b which are located at respective end portions of the flow path 125. Further, an insulating film 130 is formed on the surface of the joined body 135 (a surface 122b of the metal substrate 122), and a heater 127 is provided on the insulating film 130. The heater 127 is formed with electrodes 128 and 128, and a heater protective layer 129 having electrode opening portions 129a and 129a for exposing the electrodes 128 and 128 is provided so as to cover the heater 127.

For the metal substrate 122 forming such a microreactor 121, it is possible to use a material that can form a metal oxide film through a boehmite treatment of Cu, stainless, Fe, Al, or the like. The thickness of the metal substrate 122 can be suitably set taking into account the size of the microreactor 121, properties such as a heat capacity and a thermal conductivity of metal to be used, the size of the microchannel portion 123 to be formed, and so forth. For example, it can be set within a range of about 50 to 2000 μm.

The microchannel portion 123 of the metal substrate 122 can be the same as the microchannel portion 103 of the foregoing embodiment.

For the metal cover member 124 forming the microreactor 121, it is possible to use a material that can form a metal oxide film through a boehmite treatment of Cu, stainless, Fe, Al, or the like. The thickness of the metal cover member 124 can be suitably set taking into account a material to be used and so forth. For example, it can be set within a range of about 20 to 200 μm. The feed material inlet 124a and the gas outlet 124b of the metal cover member 124 are provided so as to be located at both end portions of the microchannel portion 123 formed on the metal substrate 122.

The formation of the metal oxide film 126 by the boehmite treatment in the flow path 125 of the joined body 135 formed by joining together the metal substrate 122 and the metal cover member 124 can be implemented by, for example, using a suspension with boehmite alumina such as alumina sol being dispersed therein, and pouring the suspension with a fully lowered viscosity into the flow path 125, thereafter, drying it to fix a boehmite coating on the inner surface of the flow path (washcoat process). The metal oxide film 126 formed by such a boehmite treatment is an aluminum oxide thin film, and the thickness thereof can be set within a range of, for example, about 0.5 to 5.0 μm.

The insulating film 130 formed on the surface 122b of the metal substrate 122 can be formed of, for example, polyimide, ceramic ($Al_2O_3$, $SiO_2$), or the like. The thickness of such an insulating film 130 can be suitably set taking into account properties of a material to be used and so forth. For example, it can be set within a range of about 1 to 30 μm.

The catalyst C, the heater 127, the electrodes 128 and 128, and the heater protective layer 129 forming the microreactor 121 can be the same as the catalyst C, the heater 107, the electrodes 108 and 108, and the heater protective layer 109 forming the microreactor 101, respectively, and therefore, description thereof is omitted herein.

In the microreactor 101, 121 of the present invention as described above, since the catalyst C is supported on the whole inner wall surface of the flow path 105, 125, the reaction area is increased to thereby obtain a high reaction efficiency. Further, use is made of the metal substrate 102, 122 and the metal cover member 104, 124 each having a higher thermal conductivity and a smaller heat capacity as compared with a silicon substrate or a ceramic substrate, and therefore, heat is transmitted from the heater 107, 127 to the supported catalyst C with a high efficiency, so that there is enabled a reformer for hydrogen production wherein the rising is fast upon starting up from the stopped state and the utilization efficiency of the input power to the heater is high.

Seventh Embodiment of Microreactor

Figure 16:
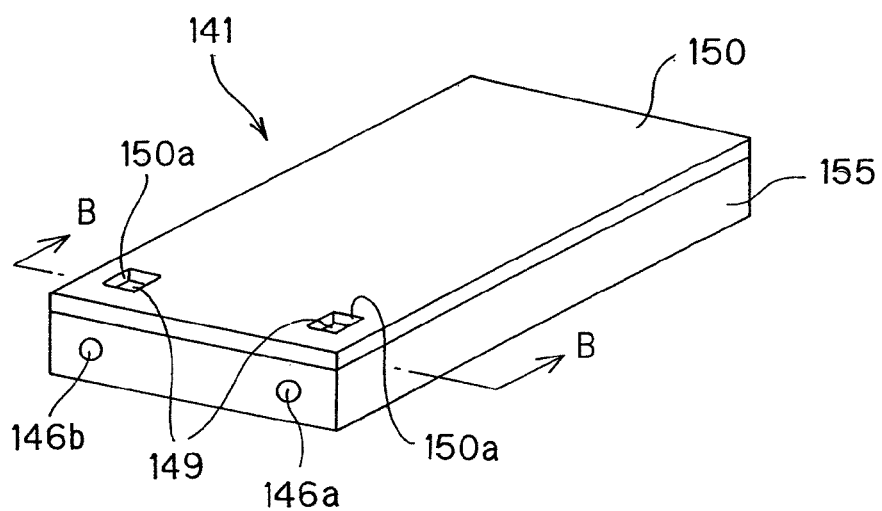
FIG. 16 is a perspective view showing another embodiment of a microreactor of the present invention.
Figure 17:
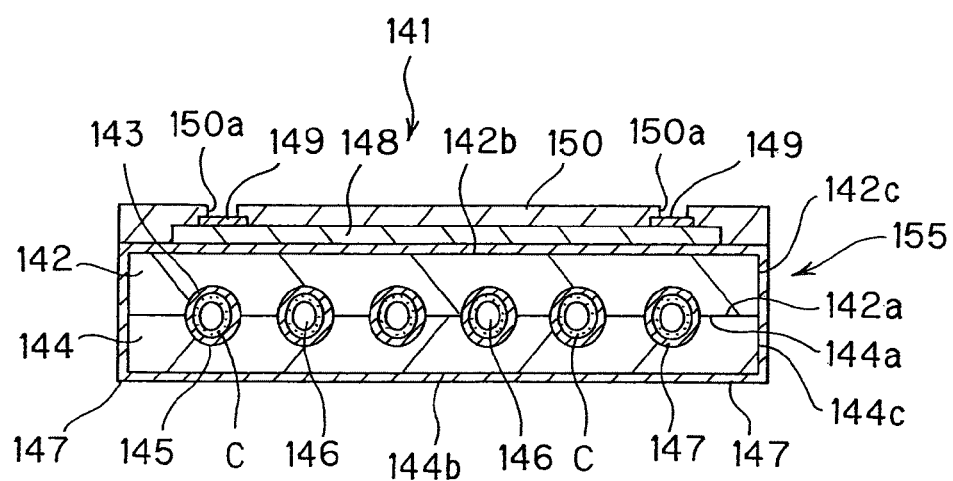
FIG. 17 is an enlarged longitudinal sectional view of the microreactor shown in FIG. 16, taken along line B-B.

FIG. 16 is a perspective view showing another embodiment of the microreactor of the present invention, and FIG. 17 is an enlarged longitudinal sectional view of the microreactor shown in FIG. 16, taken along line B-B. In FIGS. 16 and 17, the microreactor 141 of the present invention has a joined body 155 in which a metal substrate 142 formed with a microchannel portion 143 on one surface 142a thereof, and a metal substrate 144 formed with a microchannel portion 145 on one surface 144a thereof are joined together such that the microchannel portion 143 and the microchannel portion 145 confront each other. Inside the joined body 155, there is formed a flow path 146 composed of the confronting microchannel portions 143 and 145, and a catalyst C is supported on the whole inner wall surface of the flow path 146 via a metal oxide film 147. Further, both end portions of the flow path 146 are exposed at one end surface of the foregoing joined body 155 to form a feed material inlet 146a and a gas outlet 146b, respectively. The foregoing metal oxide film 147 is an insulating film and is also formed on the surfaces of the joined body 155 (a surface 142b and side surfaces 142c of the metal substrate 142, and a surface 144b and side surfaces 144c of the metal substrate 144) apart from the inner wall surface of the flow path 146. Further, a heater 148 is provided on the surface 142b of the metal substrate 142 via the metal oxide film 147 and formed with electrodes 149 and 149, and a heater protective layer 150 having electrode opening portions 150a and 150a for exposing the electrodes 149 and 149 is provided so as to cover the heater 148.

Figure 18:
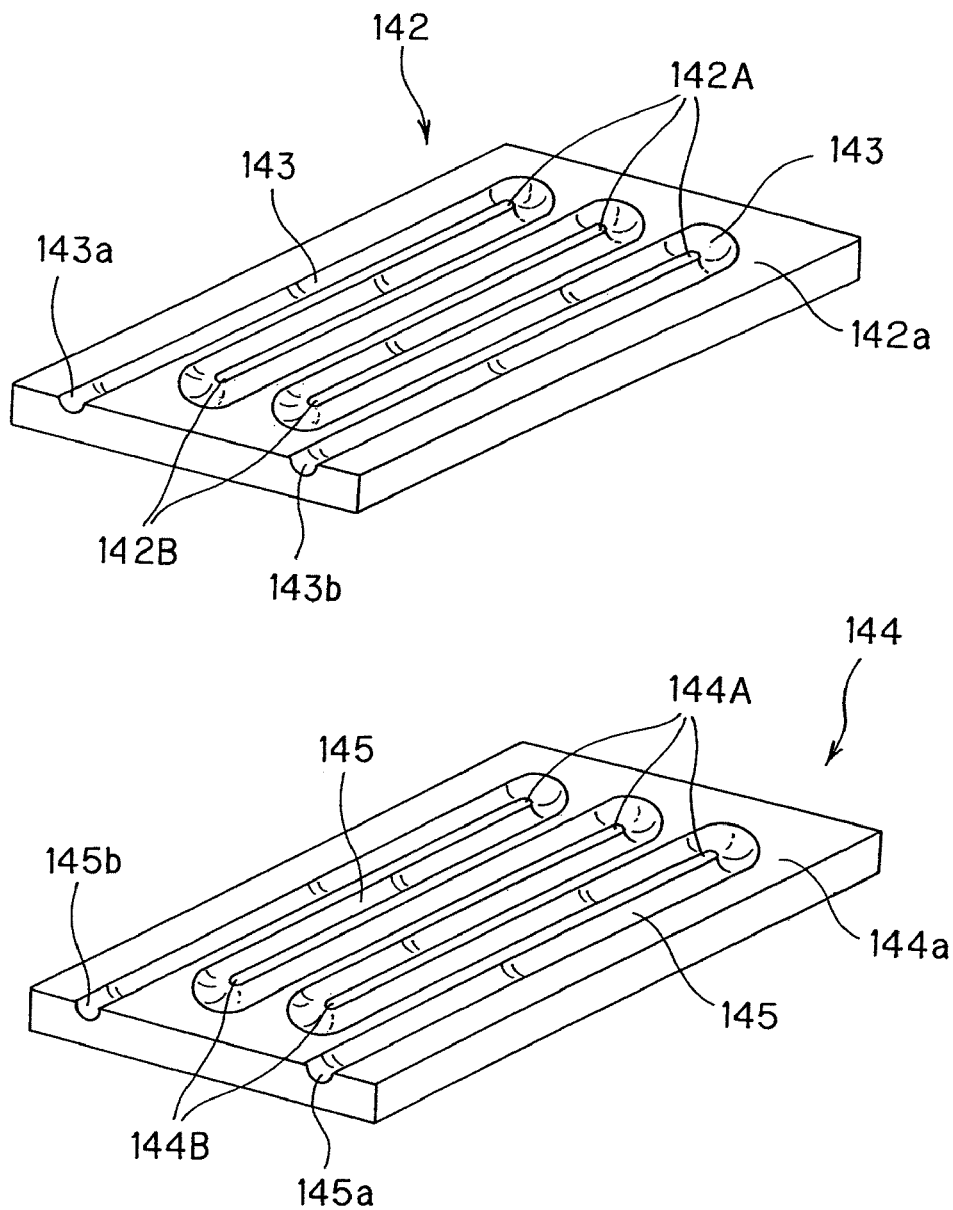
FIG. 18 is a perspective view showing the side, where a microchannel portion is formed, of each of metal substrates forming the microreactor shown in FIG. 16.

FIG. 18 is a perspective view showing the side, where the microchannel portion 143 is formed, of the metal substrate 142 and the side, where the microchannel portion 145 is formed, of the metal substrate 144, of the microreactor 141 shown in FIG. 16. As shown in FIG. 18, the microchannel portion 143 is formed so as to turn back by 180 degrees at respective tip portions of comb-shaped ribs 142A and 142B and has a shape that is continuous from an end portion 143a to an end portion 143b while meandering. The microchannel portion 145 is formed so as to turn back by 180 degrees at respective tip portions of comb-shaped ribs 144A and 144B and has a shape that is continuous from an end portion 145a to an end portion 145b while meandering. Further, the microchannel portion 143 and the microchannel portion 145 have pattern shapes that are in a symmetrical relationship with respect to a joining plane between the metal substrates 142 and 144. Therefore, by joining together the metal substrates 142 and 144, the end portion 143a of the microchannel portion 143 is located on the end portion 145a of the microchannel portion 145, and the end portion 143b of the microchannel portion 143 is located on the end portion 145b of the microchannel portion 145, so that the microchannel portion 143 and the microchannel portion 145 completely confront each other. The shape of the inner wall surface of the flow path 146 formed by such microchannel portions 143 and 145 is generally circular in a section perpendicular to a fluid flow direction of the flow path 146. Further, the turnback of the flow path 146 at each of the tip portions of the comb-shaped ribs 142A and 142B or the comb-shaped ribs 144A and 144B is rounded with no angular portion. The end portion 143a of the microchannel portion 143 and the end portion 145a of the microchannel portion 145 form the feed material inlet 146a, while the end portion 143b of the microchannel portion 143 and the end portion 145b of the microchannel portion 145 form the gas outlet 146b.

For the metal substrate 142, 144 forming the microreactor 141, there can be used such metal that can form the metal oxide film (insulating film) 147 by anodic oxidation. As such metal, it is possible to use the same one for the metal substrate 102 in the foregoing embodiment. Further, the thickness of the metal substrate 142, 144 can be suitably set taking into account the size of the microreactor 141, properties such as a heat capacity and a thermal conductivity of metal to be used, the size of the microchannel portion 143, 145 to be formed, and so forth. For example, it can be set within a range of about 400 to 1000 μm.

The microchannel portion 143, 145 formed on the metal substrate 142, 144 is not limited to the shape as shown in FIG. 18, but can be formed into a desirable shape like one wherein an amount of the catalyst C supported on the microchannel portion 143, 145 increases and the flow path length in which a feed material contacts with the catalyst C is prolonged. Particularly, such a shape of the microchannel portion 143, 145 is preferable wherein an angular portion (e.g. a portion of the internal wall surface that is angularly bent at a position where the direction of the flow path changes) does not exist on the internal wall surface along the fluid flow direction of the flow path 146. Further, the shape of the inner wall surface of the microchannel portion 143, 145 in the section perpendicular to the fluid flow direction is preferably a circular arc shape, a semicircular shape, or a U-shape. Thereby, the shape of the inner wall surface, in the section perpendicular to the fluid flow direction, of the fluid path 146 formed by the microchannel portions 143 and 145 becomes generally circular. For example, the depth of such a microchannel portion 143, 145 can be set within a range of about 100 to 100 μm, the width thereof can be set within a range of about 100 to 1000 μm, and the flow path length thereof can fall within a range of about 30 to 300 mm.

In this embodiment, since the metal oxide film 147 is formed on the inner wall surface of the flow path 146, a applying amount of the catalyst C is increased to enable stable catalyst applying due to a surface structure of the metal oxide film having microholes.

As the catalyst C, it is possible to use a known catalyst that has conventionally been employed for steam reforming.

The formation of the metal oxide film (insulating film) 147 by anodic oxidation on the joined body 155 formed by joining together the metal substrates 142 and 144 can be implemented by, in the state where the joined body 155 is connected to an anode as an external electrode, immersing the joined body 155 in an anode oxidizing solution so as to confront a cathode and energizing it. The thickness of the metal oxide film (insulating film) 147 can be set within a range of, for example, about 5 to 150 μm.

The catalyst C, the heater 148, the electrodes 149 and 149, and the heater protective layer 150 forming the microreactor 141 can be the same as the catalyst C, the heater 107, the electrodes 108 and 108, and the heater protective layer 109 forming the microreactor 101, respectively, and therefore, description thereof is omitted herein.

Eighth Embodiment of Microreactor

Figure 19:
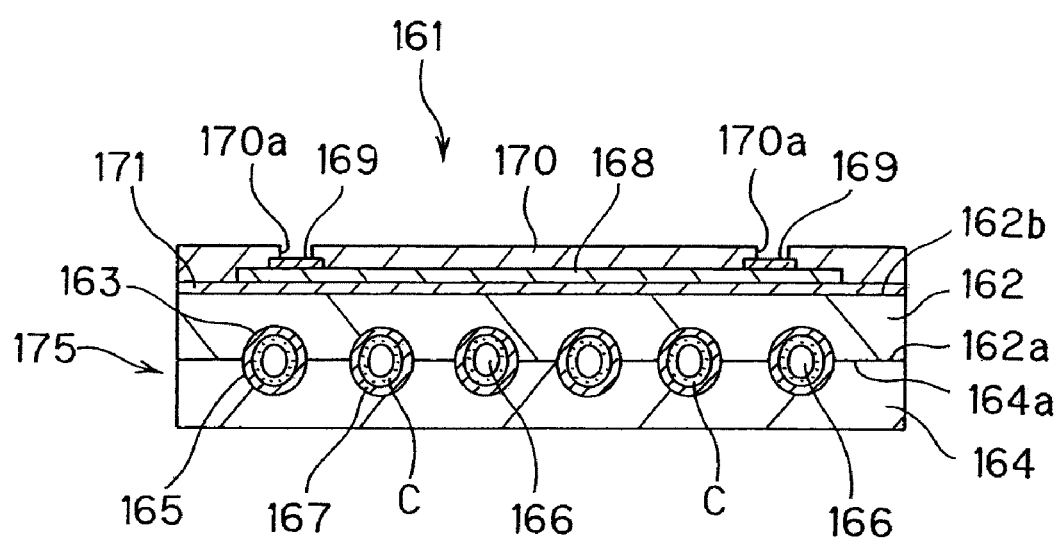
FIG. 19 is a longitudinal sectional view, corresponding to FIG. 17, showing another embodiment of a microreactor of the present invention.

FIG. 19 is a longitudinal sectional view, corresponding to FIG. 17, showing another embodiment of the microreactor of the present invention. In FIG. 19, the microreactor 161 of the present invention has a joined body 175 in which a metal substrate 162 formed with a microchannel portion 163 on one surface 162a thereof, and a metal substrate 164 formed with a microchannel portion 165 on one surface 164a thereof are joined together such that the microchannel portion 163 and the microchannel portion 165 confront each other. Inside the joined body 175, there is formed a flow path 166 composed of the confronting microchannel portions 163 and 165, and a catalyst C is supported on the whole inner wall surface of the flow path 166 via a metal oxide film 167. Further, both end portions of the flow path 166 are exposed at one end surface of the foregoing joined body 175 to form a feed material inlet (not illustrated) and a gas outlet (not illustrated), respectively. Further, an insulating film 171 is formed on the surface of the joined body 175 (a surface 162b of the metal substrate 162), and a heater 168 is provided on the insulating film 171. The heater 168 is formed with electrodes 169 and 169, and a heater protective layer 170 having electrode opening portions 170a and 170a for exposing the electrodes 169 and 169 is provided so as to cover the heater 168.

For the metal substrate 162, 164 forming such a microreactor 161, it is possible to use a material that can form a metal oxide film through a boehmite treatment of Cu, stainless, Fe, Al, or the like. The thickness of the metal substrate 162, 164 can be suitably set taking into account the size of the microreactor 161, properties such as a heat capacity and a thermal conductivity of metal to be used, the size of the microchannel portion 163, 165 to be formed, and so forth. For example, it can be set within a range of about 400 to 1000 μm.

The microchannel portion 163, 165 of the metal substrate 162, 164 can be the same as the microchannel portion 143, 145 of the foregoing third embodiment.

The formation of the metal oxide film 167 by the boehmite treatment in the flow path 166 of the joined body 175 formed by joining together the metal substrates 162 and 164 can be carried out according to the boehmite treatment for the joined body 135 in the foregoing second embodiment. The metal oxide film 167 formed by the boehmite treatment is an aluminum oxide thin film, and the thickness thereof can be set within a range of, for example, about 0.5 to 5.0 μm.

The insulating film 171 formed on the surface 162b of the metal substrate 162 can be the same as the insulating film 130 in the foregoing second embodiment.

Further, the catalyst C, the heater 168, the electrodes 169 and 169, and the heater protective layer 170 forming the microreactor 161 can be the same as the catalyst C, the heater 107, the electrodes 108 and 108, and the heater protective layer 109 forming the microreactor 101 in the foregoing first embodiment, respectively, and therefore, description thereof is omitted herein.

In the microreactor 141, 161 of the present invention as described above, since the catalyst C is supported on the whole inner wall surface of the flow path 146, 166, the reaction area is increased to thereby obtain a high reaction efficiency. Further, use is made of the metal substrates 142 and 144, 162 and 164 each having a higher thermal conductivity and a smaller heat capacity as compared with a silicon substrate or a ceramic substrate, and therefore, heat is transmitted from the heater 148, 168 to the supported catalyst C with a high efficiency, so that there is enabled a reformer for hydrogen production wherein the rising is fast upon starting up from the stopped state and the utilization efficiency of the input power to the heater is high.

The foregoing embodiments of the microreactors are only examples. For example, the positions of the feed material inlet and the gas outlet can be set to desirable positions by changing the shapes of the microchannel portions.

Ninth Embodiment of Microreactor

Figure 20:
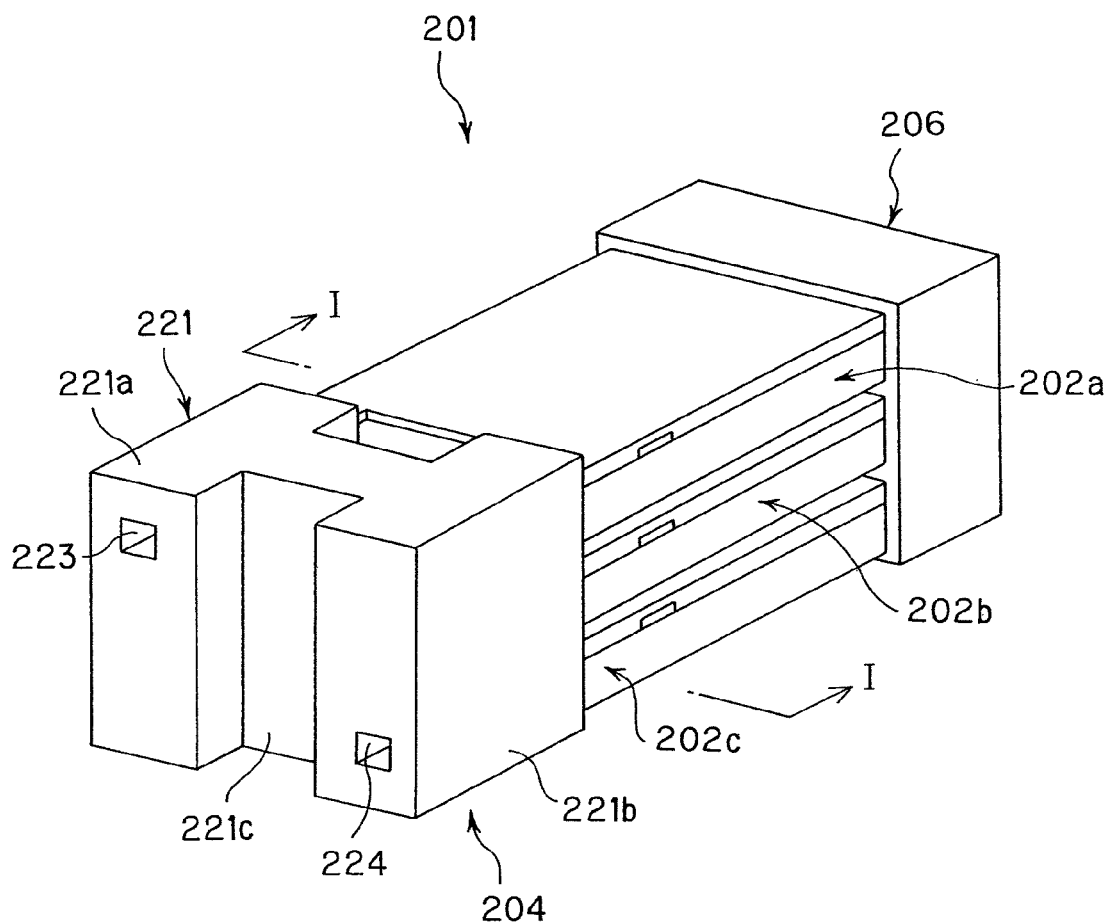
FIG. 20 is a perspective view showing one embodiment of a microreactor of the present invention.
Figure 21:
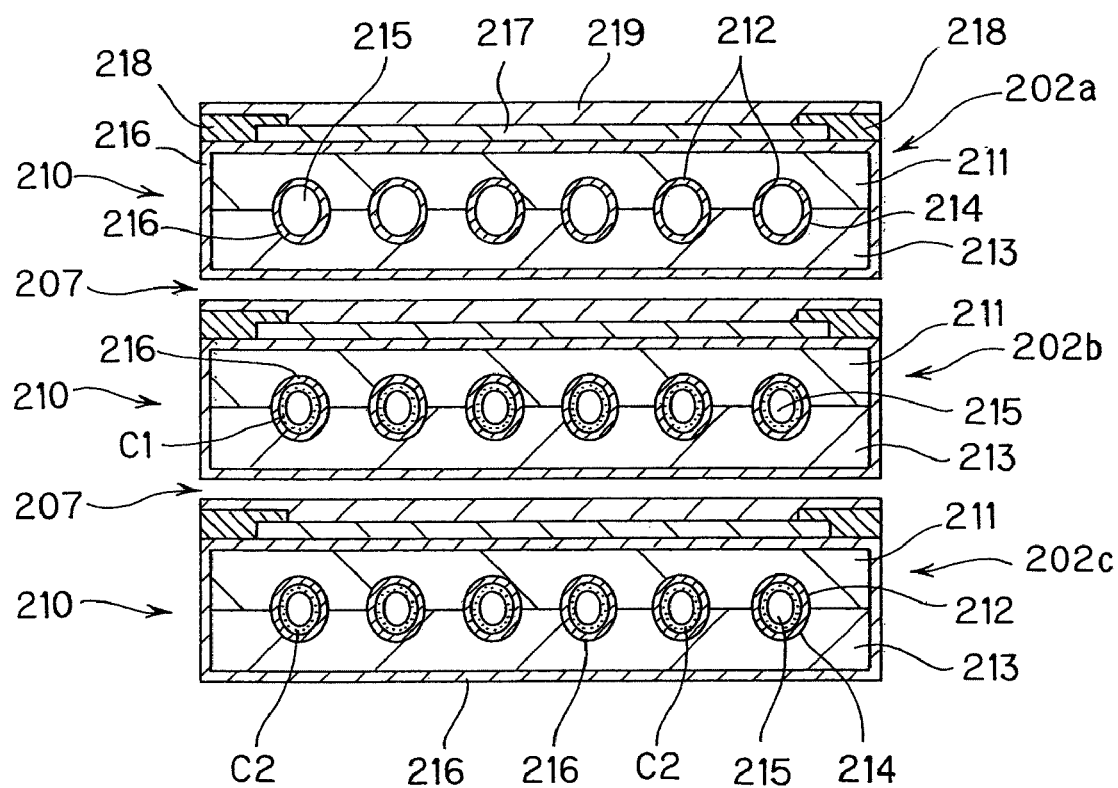
FIG. 21 is an enlarged longitudinal sectional view of the microreactor shown in FIG. 20, taken along line I-I.
Figure 22:
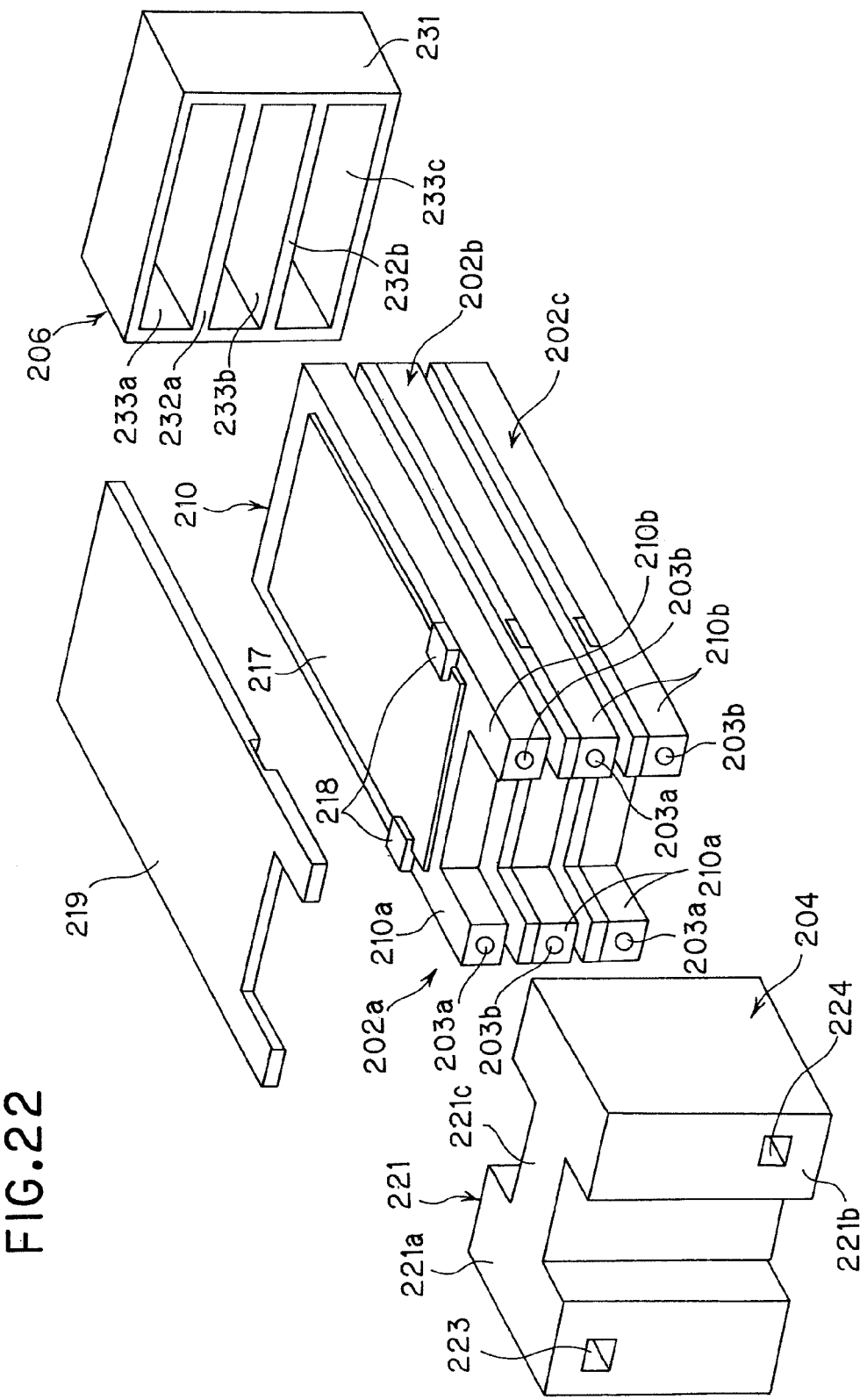
FIG. 22 is a perspective view showing the state where constituent members of the microreactor shown in FIG. 20 are separated from each other.

FIG. 20 is a perspective view showing one embodiment of the microreactor of the present invention, FIG. 21 is an enlarged longitudinal sectional view of the microreactor shown in FIG. 20, taken along line I-I, and FIG. 22 is a perspective view showing the state where constituent members of the microreactor shown in FIG. 20 are separated from each other. In FIGS. 20 to 22, the microreactor 201 of the present invention is configured such that three unit flow path members 202a, 202b, and 202c are coupled and retained together in a multi-step state with three steps by a coupling member 204 and a fixing member 206. Gaps 207 are provided between the respective unit flow path members 202a, 202b, and 202c.

The unit flow path members 202a, 202b, and 202c each have a flow path inside, and this flow path has one end portion forming an inlet and the other end portion forming an outlet. Among the three unit flow path members 202a, 202b, and 202c, the unit flow path members 202b and 202c are unit microreactors each carrying a catalyst in the flow path. Specifically, as shown in FIG. 21, each of the unit flow path members 202a, 202b, and 202c has a joined body 210 in which a metal substrate 211 formed with a microchannel portion 212 and a metal substrate 213 formed with a microchannel portion 214 are joined together such that the microchannel portion 212 and the microchannel portion 214 confront each other, and a metal oxide film (insulating layer) 216 is formed therearound. Inside the joined body 210, there is formed a flow path 215 composed of the confronting microchannel portions 212 and 214. Further, in the unit flow path members (unit microreactors) 202b and 202c, catalysts C1 and C2 are respectively supported on the whole inner wall surfaces of the flow paths 215 via the metal oxide films 216. Incidentally, in the illustrated example, the unit flow path member 202a carrying no catalyst on the inner wall surface of the flow path 215 also has the metal oxide film 216 on the inner wall surface of the flow path 215 within the joined body 210, but it may also be configured not to have this metal oxide film 216.

Figure 23:
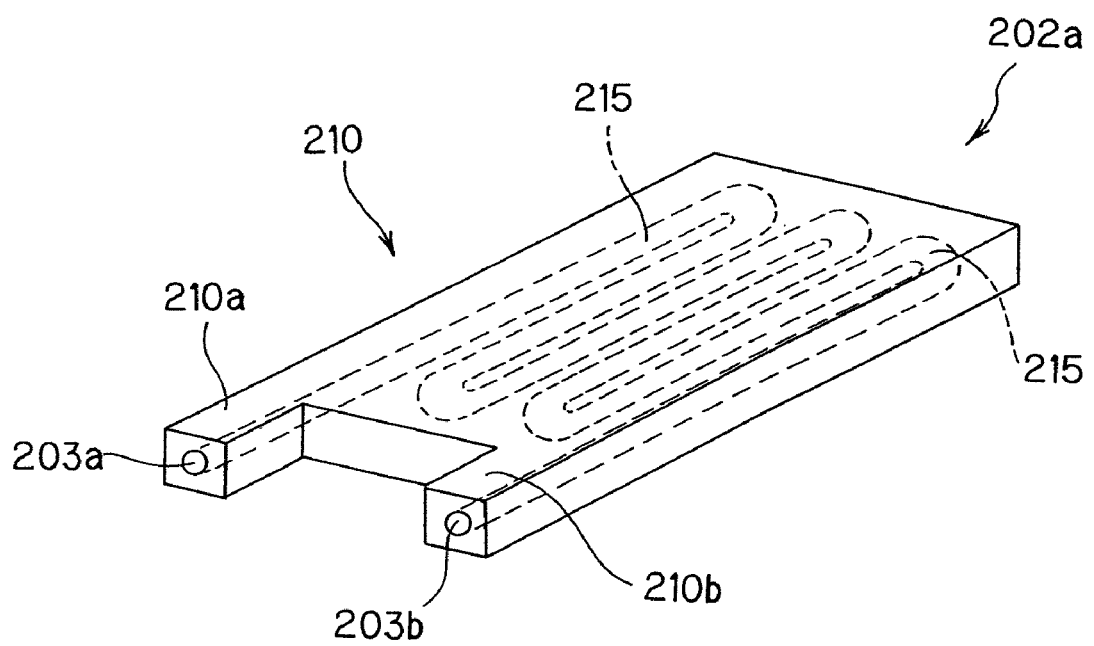
FIG. 23 is a perspective view for describing an example of a flow path within a unit flow path member forming the microreactor of the present invention.

As shown in FIG. 22, the foregoing joined body 210 forming each of the unit flow path members 202a, 202b, and 202c has a pair of projecting portions 210a and 210b in the same direction. FIG. 23 is a perspective view for describing the state of the flow path 215 using the unit flow path member 202a as an example. As shown in FIG. 23, the flow path 215 has a shape continuously meandering from an end portion located at the projecting portion 210a to an end portion located at the projecting portion 210b. The end portion of the flow path 215 located at the projecting portion 210a forms an inlet 203a, while the end portion of the flow path 215 located at the projecting portion 210b forms an outlet 203b. Specifically, in each of the unit flow path member 202a and the unit flow path member (unit microreactor) 202c, the end portion of the flow path 215 located at the projecting portion 210a forms the inlet 203a, while the end portion of the flow path 215 located at the projecting portion 210b forms the outlet 203b. On the other hand, in the unit flow path member (unit microreactor) 202b, the end portion of the flow path 215 located at the projecting portion 210a forms the outlet 203b, while the end portion of the flow path 215 located at the projecting portion 210b forms the inlet 203a. Therefore, from the first-step unit flow path member toward the third-step unit flow path member (unit microreactor), the inlet 203a, the outlet 203b, and the inlet 203a are arrayed in the order named on the side of the projecting portions 210a, while the outlet 203b, the inlet 203a, and the outlet 203b are arrayed in the order named on the side of the projecting portions 210b.

Further, a heater 217 is provided on one surface of the joined body 210 forming each of the unit flow path members 202a, 202b, and 202c. The heater 217 is formed with electrodes 218 and 218, and a heater protective layer 219 is provided so as to expose portions of the electrodes 218 and 218 and to cover the heater 217. FIG. 22 shows the state where the heater protective layer 219 of the unit flow path member 202a is separated. Incidentally, although the unit flow path member 202a not being the unit microreactor is also provided with the heater 217 and the electrodes 218 and 218 in the illustrated example, it may also be configured that only the unit flow path members being the unit microreactors are each provided with the heater 217 and the electrodes 218 and 218.

Figure 24:
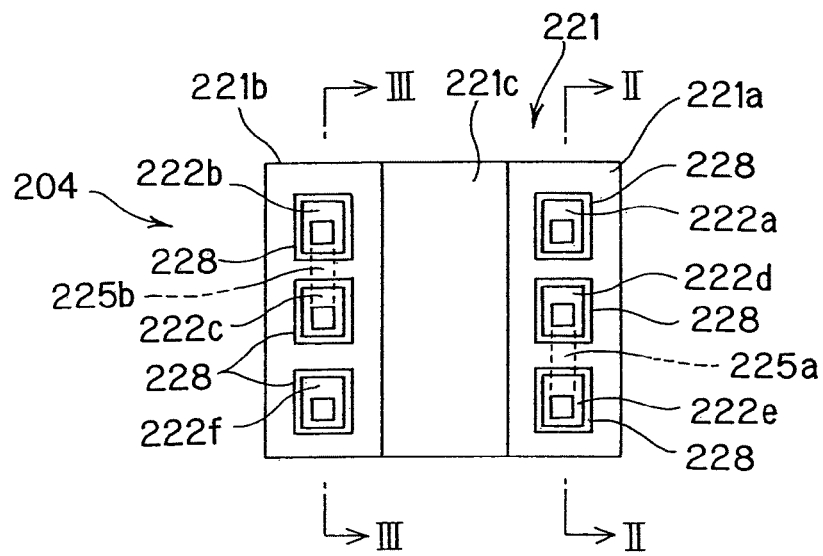
FIG. 24 is a diagram showing the side, where coupling portions are formed, of a coupling member.
Figure 25:
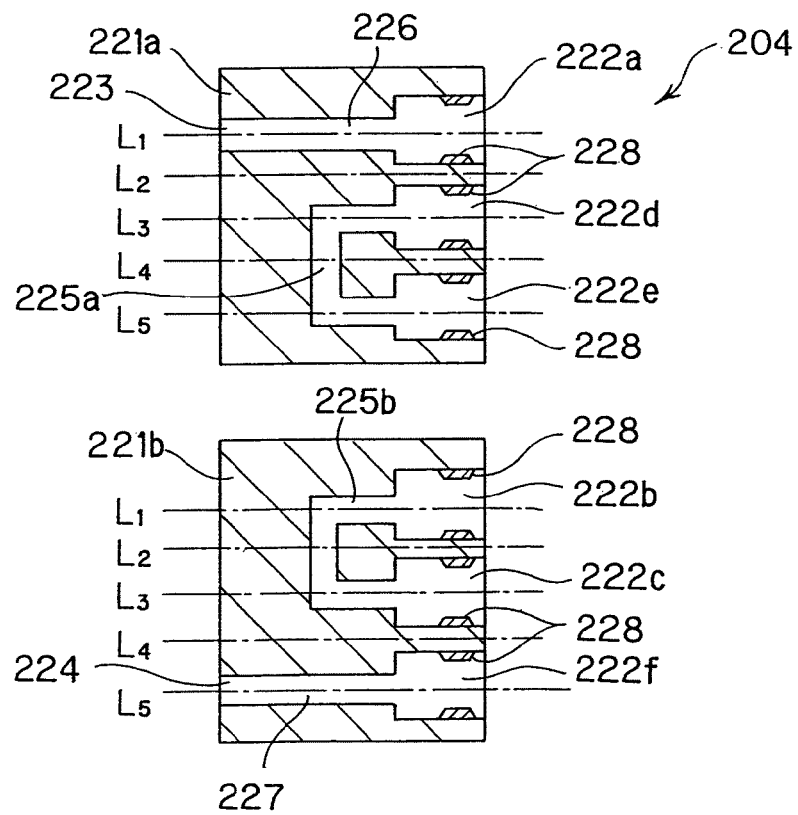

The coupling member 204 is for retaining the respective unit flow path members 202a, 202b, and 202c in the multi-step state and has a structure body 221 of a shape in which block bodies 221a and 221b sandwich a block body 221c therebetween. FIG. 24 is a diagram showing the side, where coupling portions are formed, of the coupling member 204, and FIG. 25 is a sectional view of the coupling member shown in FIG. 24, wherein FIG. 25A is a sectional view taken along line II-II and FIG. 25B is a sectional view taken along line III-III. As shown in FIGS. 24 and 25, on one side of the block bodies 221a and 221b, there are provided a plurality of coupling portions 222 for tightly retaining the respective unit flow path members 202a, 202b, and 202c at the projecting portions 210a and 210b of the joined bodies 210 where the inlets 203a and the outlets 203b are located. Further, a feed material inlet 223 is provided on the other side of the block body 221a, while a gas outlet 224 is provided on the other side of the block body 221b.

The coupling portions 222 provided in the block body 221a comprise an introduction coupling portion 222a connected to the feed material inlet 223 via an internal flow path 226, and a pair of step shift coupling portions 222d and 222e connected to each other via an internal communication path 225a, which are arrayed in a row. On the other hand, the coupling portions 222 provided in the block body 221b comprise a pair of step shift coupling portions 222b and 222c connected to each other via an internal communication path 225b, and a discharge coupling portion 222f connected to the gas outlet 224 via an internal flow path 227, which are arrayed in a row. Further, in each of the coupling portions 222 (222a, 222b, 222c, 222d, 222e, 222f), a packing 228 is disposed for tightly retaining in a gastight and liquid tight state the projecting portion 210a, 210b of the joined body 210 forming each of the unit flow path members 202a, 202b, and 202c. The dimensions of each coupling portion 222 are suitably set corresponding to the shape of the projecting portion 210a, 210b of the unit flow path member to be coupled and retained.

In the foregoing coupling member 204, the projecting portion 210a and the projecting portion 210b of the first-step unit flow path member 202a are inserted into the introduction coupling portion 222a and the step shift coupling portion 222b, respectively, so as to be tightly retained, the projecting portion 210b and the projecting portion 210a of the second-step unit flow path member (unit microreactor) 202b are inserted into the step shift coupling portions 222c and 222d, respectively, so as to be tightly retained, and the projecting portion 210a and the projecting portion 210b of the third-step unit flow path member (unit microreactor) 202c are inserted into the step shift coupling portion 222e and the discharge coupling portion 222f, respectively, so as to be tightly retained. The foregoing packing 228 is for making more reliable the tight retention of each unit flow path member 202a, 202b, 202c by the coupling member 204, and may be, for example, an O-ring or made of a material having elasticity such as silicon rubber. For making more reliable the tight retention of the unit flow path members 202a, 202b, and 202c by the coupling member 204, auxiliary members of silicon rubber or the like having elasticity may also be provided around the projecting portions 210a and the projecting portions 210b, respectively.

The fixing member 206 is for fixing the other end portions of the unit flow path members 202a, 202b, and 202c retained in the multi-step state by the foregoing coupling member 204, and comprises a frame body 231 and partition members 232a and 232b for partitioning the inside of the frame body 231 into three steps. By disposing the end portions of the respective unit flow path members 202a, 202b, and 202c so as to be inserted in accommodating spaces 233a, 233b, and 233c defined by the partition members 232a and 232b, the fixing member 206 can fixedly retain them in the multi-step state.

In the foregoing microreactor 201, feed materials introduced from the feed material inlet 223 of the coupling member 204 pass through the internal flow path 226 and reach the inlet 203a of the first-step unit flow path member 202a from the introduction coupling portion 222a. Then, desired mixing of the feed materials is carried out in the flow path 215 of the unit flow path member 202a, and then, via the outlet 203b, the step shift coupling portion 222b, the internal communication path 225b, and the step shift coupling portion 222c, the mixture reaches the inlet 203a of the second-step unit flow path member (unit microreactor) 202b. Then, after passing through the inside of the flow path 215, where the catalyst C1 is applied, of the unit microreactor 202b, it is sent, via the outlet 203b, the step shift coupling portion 222d, and the internal communication path 225a, to the step shift coupling portion 222e and reaches the inlet 203a of the third-step unit flow path member (unit microreactor) 202c. Then, after passing through the inside of the fluid path 215, where the catalyst C2 is applied, of the unit microreactor 202c, it passes through the outlet 203b, the discharge coupling portion 222f, and the internal flow path 227 to reach the gas outlet 224.

In the foregoing microreactor 201, the heaters 217 are respectively arranged in the unit flow path members 202a, 202b, and 202c, and the gaps 207 exist between the respective unit flow path members, and therefore, unnecessary heat conduction between the respective unit flow path members is prevented to thereby enable optimum temperature setting in the unit microreactors 202b and 202c, respectively.

Figure 26:
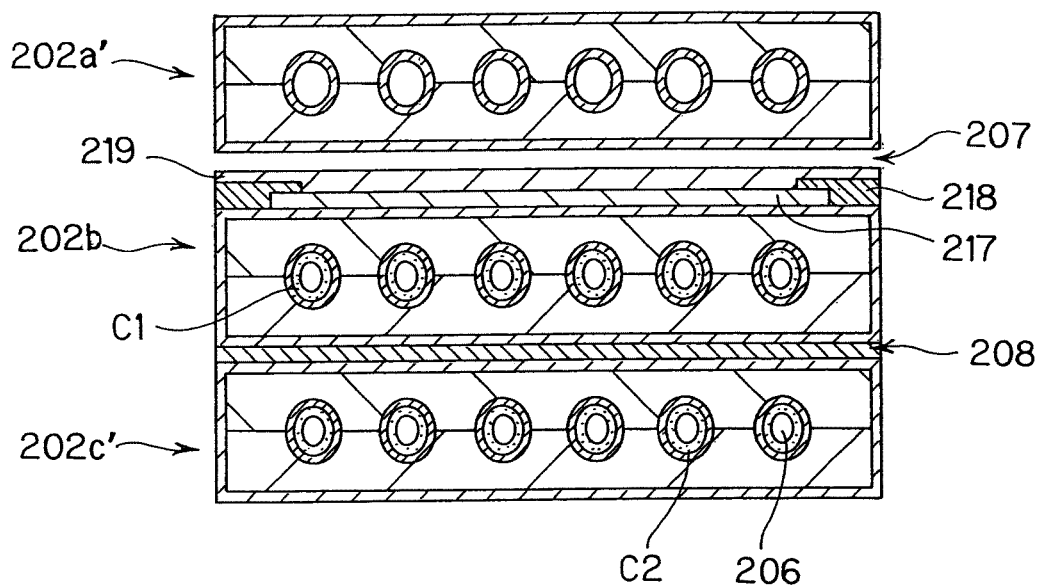
FIG. 26 is a longitudinal sectional view, corresponding to FIG. 21, for describing another example of a microreactor of the present invention.

Further, in the present invention, as shown in FIG. 26, for example, it may also be configured such that a unit microreactor having a heater 217 is only a second-step unit flow path member (unit microreactor) 202b, and a first-step unit flow path member 202a' and a third-step unit flow path member (unit microreactor) 202c' are not provided with the heater 217. Then, a gap 207 for thermal insulation may be provided between the first-step unit flow path member 202a' and the second-step unit flow path member (unit microreactor) 202b, and a heat insulating material 208 may be interposed between the second-step unit flow path member (unit microreactor) 202b and the third-step unit flow path member (unit microreactor) 202c'. As the heat insulating material 208, it is possible to use, for example, glass wool, a ceramic substrate, or the like.

Further, the positional relationship between the feed material inlet 223 and the gas outlet 224 of the coupling member 204 is not limited to the illustrated example. For example, the feed material inlet 223 and the gas outlet 224 may be disposed at the same level by forming the internal flow path 227 in a bent fashion.

The foregoing microreactor 201 has the three-step structure wherein two of the three unit flow path members are the unit microreactors. In the present invention, however, the number of unit flow path members may be two or no less than four, and there is no particular limitation to the number of unit microreactors in unit flow path members. Then, depending on the number of steps of the unit flow path members, the number of step shift coupling portions of the coupling member 4 is set. Specifically, in the present invention, when n (n is an integer no less than two) unit flow path members exist, there can be provided (n−1) pairs of step shift coupling portions connected to each other by an internal communication path, among the coupling portions of the coupling member. With respect to the first-step unit flow path member, an inlet is coupled to and retained by an introduction coupling portion and an outlet is coupled to and retained by a step shift coupling portion. With respect to the second-step to $(n-1)^{th}$-step unit flow path members, an inlet is coupled to and retained by a step shift coupling portion connected to a prior-step step shift coupling portion by an internal communication path and an outlet is coupled to and retained by a step shift coupling portion of another pair. With respect to the $n^{th}$-step unit flow path member, an inlet is coupled to and retained by a step shift coupling portion connected to a prior-step step shift coupling portion by an internal communication path and an outlet is coupled to and retained by a discharge coupling portion. Thereby, the microreactor of the present invention can be formed.

Here, description will be made of the respective members forming the foregoing microreactor 201.

First, the members forming the unit flow path member 202a, 202b, 202c will be described. For the metal substrate 211, 213 forming the joined body 210, there can be used such metal that can form the metal oxide film (insulating film) 216 by anodic oxidation. As such metal, there can be cited, for example, Al, Si, Ta, Nb, V, Bi, Y, W, Mo, Zr, Hf, or the like. Among these metals, particularly Al is preferably used in terms of processing suitability, properties such as a heat capacity and a thermal conductivity, and a unit price. On the other hand, for the metal substrate 211, 213 forming the joined body 210, it is also possible to use a material that can form the metal oxide film 216 through a boehmite treatment of Cu, stainless, Fe, Al, or the like. In this case, the metal oxide film 216 existing around the metal substrate 211, 213 may be formed likewise by the boehmite treatment, or polyimide, ceramic ($Al_2O_3$, $SiO_2$), or the like may be formed by the printing method such as screen printing using a paste containing an insulating material, or the vacuum film forming method such as sputtering or vacuum deposition.

The thickness of the metal substrate 211, 213 can be suitably set taking into account the size of the unit flow path member 202a, 202b, 202c, properties such as a heat capacity and a thermal conductivity of metal to be used, the size of the microchannel portion 212, 214 to be formed, and so forth. For example, it can be set within a range of about 400 to 1000 μm.

The microchannel portion 212, 214 formed on the metal substrate 211, 213 is not limited to the illustrated shape, but can be formed into a desirable shape like one wherein an amount of the catalyst applied to the microchannel portion 212, 214 increases and the flow path length in which a feed material contacts with the catalyst is prolonged. For example, the depth of the microchannel portion 212, 214 can be set within a range of about 100 to 1000 μm, the width thereof can be set within a range of about 100 to 1000 μm, and the flow path length thereof can fall within a range of about 30 to 300 mm.

In this embodiment, since the metal oxide film 216 is formed on the inner wall surface of each flow path 215, an applying amount of the catalyst C1, C2 is increased to enable stable catalyst applying due to a surface structure of the metal oxide film having microholes.

As the catalysts C1 and C2, it is possible to use known catalysts that have conventionally been employed for hydrogen production. For example, when mixing of feed materials and vaporization thereof are carried out in the first-step unit flow path member 202a, reforming of mixture gas is carried out in the second-step unit flow path member (unit microreactor) 202b, and removal of impurities from reformed gas is carried out in the third-step unit flow path member (unit microreactor) 202c, it is possible to use Cu—ZnO/$Al_2O_3$ or the like as the catalyst C1, and Pt/$Al_2O_3$ or the like as the catalyst C2.

The heater 217 is for supplying heat required in each unit flow path member (unit microreactor), and it is possible to use therefor a material such as carbon paste, nichrome (Ni—Cr alloy), W (tungsten), or Mo (molybdenum). The heater 217 can have a shape that is obtained by, for example, drawing around a fine line having a width of about 10 to 200 μm over the whole of a region on the joined body 210 corresponding to a region where the microchannel portion is formed.

Such a heater 217 is formed with the electrodes 218 and 218 for energization. The electrodes 218 and 218 for energization can be formed using a conductive material such as Au, Ag, Pd, or Pd—Ag.

The heater protective layer 219 exposes portions of the foregoing electrodes 218 and 218 and is disposed so as to cover the heater 217. The heater protective layer 219 can be formed of, for example, photosensitive polyimide, polyimide varnish, or the like. The thickness of the heater protective layer 219 can be suitably set taking into account a material to be used and so forth. For example, it can be set within a range of about 2 to 25 μm.

A material of the coupling member 204 may be stainless, Al, Fe, Cu, or the like, and can be formed into a desired structure body shape using mechanical processing and diffusion bonding, brazing or the like. For example, as shown in FIGS. 25A and 25B, the structure body 221 forming the coupling member 4 can be composed of six members defined by five chain lines L1 to L5. Then, grooves and through holes are formed in advance on either surfaces of the six members for constituting the coupling portions 222, the internal communication paths 225a and 225b, the internal flow paths 226 and 227, and the like. Then, the coupling member 204 can be formed by diffusion bonding these six members in a predetermined order to unify them.

For the packing 228, it is possible to use an O-ring made of any of various conventionally known materials, silicon rubber, or the like.

As a material of the fixing member 206, there can be cited the same material of the coupling member 204.

The foregoing embodiments of the microreactors are only examples, and the present invention is not limited thereto.

Figure 27A:
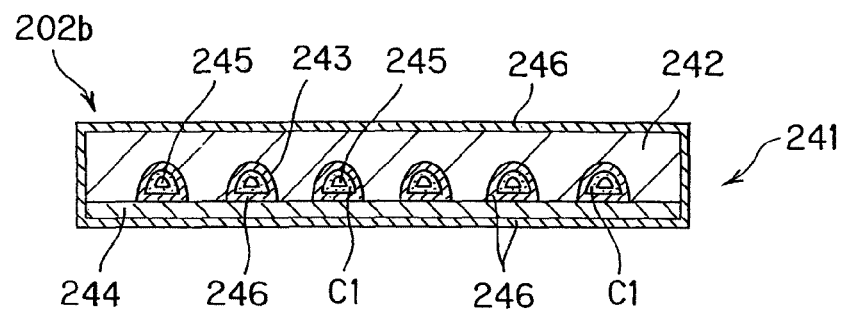
FIG. 27 is a longitudinal sectional view showing other examples of a unit flow path member (unit microreactor) forming the microreactor of the present invention.
Figure 27B:
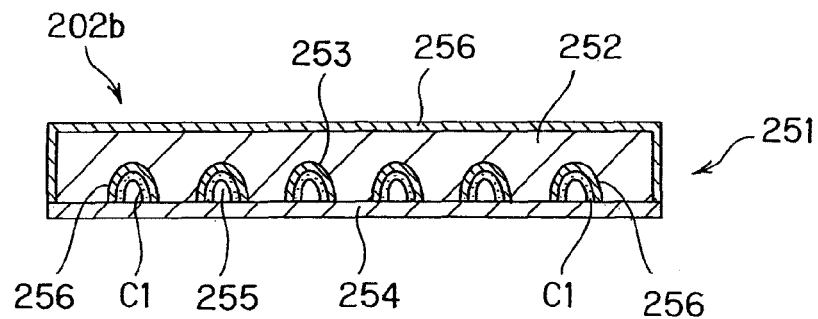

For example, there is no particular limitation about the structures of the unit flow path members 202a, 202b, and 202c as long as there is a flow path inside which is capable of carrying a catalyst, and this flow path has one end portion forming an inlet and the other end portion forming an outlet. Therefore, as shown in FIG. 27A, a unit flow path member (unit microreactor) 202b may have a joined body 241 comprising a metal substrate 242 formed with a microchannel portion 243 on one surface thereof, a metal cover member 244 joined to the metal substrate 242 so as to cover the microchannel portion 243, and a metal oxide film 246 therearound. Inside the joined body 241, there is formed a flow path 245 composed of the microchannel portion 243 and the metal cover member 244, and a catalyst C1 is supported on the whole inner wall surface of the flow path 245 via the metal oxide film 246. On the other hand, as shown in FIG. 27B, a unit flow path member (unit microreactor) 202b may have a joined body 251 comprising a metal substrate 252 formed on one surface thereof with a microchannel portion 253 carrying a catalyst C1 via a metal oxide film 256, and a metal cover member 254 joined to the metal substrate 252 so as to cover the microchannel portion 253. Inside the joined body 251, there is formed a flow path 255 composed of the microchannel portion 253 and the metal cover member 254, and the metal oxide film (insulating film) 256 is formed around the metal substrate 252.

Now, using as an example the unit flow path member (unit microreactor) 202b comprising the foregoing joined body 210, a production method thereof will be described referring to FIG. 28.

Figure 28A:
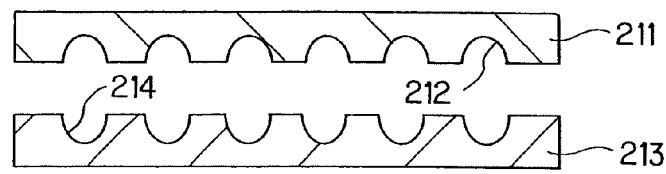
FIG. 28 is a process diagram showing one example of a production method of a unit microreactor.

In FIG. 28, a microchannel portion 212 is formed on one surface of a metal substrate 211, and a microchannel portion 214 is formed on one surface of a metal substrate 213 (FIG. 28A). The microchannel portion 212, 214 can be formed by forming a resist having a predetermined pattern on the metal substrate 211, 213 and performing wet etching using the resist as a mask, which can make processing by a micromachine unnecessary.

Figure 28B:
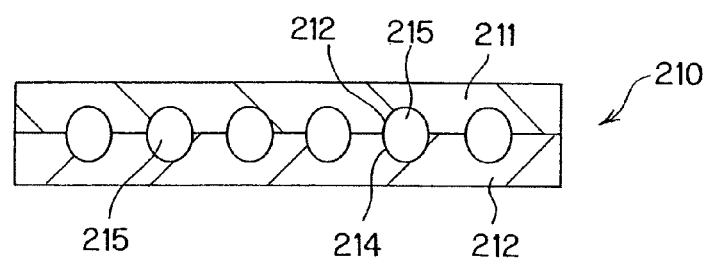

Then, the metal substrates 211 and 213 are joined together such that the microchannel portion 212 and the microchannel portion 214 confront each other, to thereby form a joined body 210 (FIG. 28B). Thereby, the microchannel portion 212 and the microchannel portion 214 confront each other to form a flow path 215. The foregoing joining between the metal substrates 211 and 213 can be carried out by, for example, diffusion bonding, brazing, or the like.

Figure 28C:
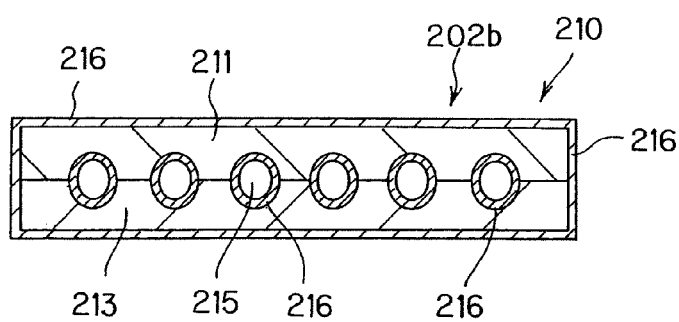

Then, the joined body 210 is anodically oxidized to form a metal oxide film (insulating layer) 216 on the whole surfaces including an inner wall surface of the flow path 215, thereby obtaining a unit flow path member 202b (FIG. 28C). The formation of the metal oxide film (insulating film) 216 can be implemented by, in the state where the joined body 210 is connected to an anode as an external electrode, immersing the joined body 210 in an anode oxidizing solution so as to confront a cathode and energizing it. Incidentally, if use is made of a metal material disabling anodic oxidation but enabling a boehmite treatment for the metal substrates 211 and 213, the metal oxide film 216 is formed by the boehmite treatment.

Figure 28D:
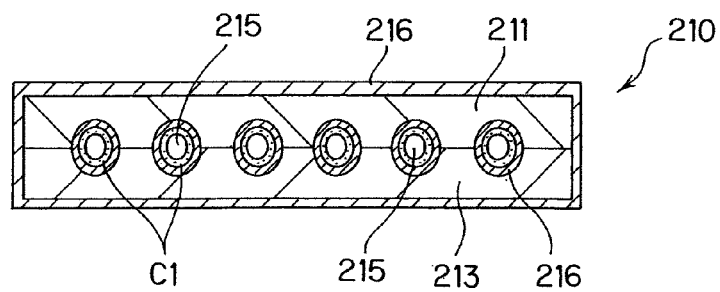

Then, a catalyst C1 is applied to the whole inner wall surface of the flow path 215 of the unit flow path member 202b via the metal oxide film (insulating film) 216, thereby obtaining a unit microreactor 202b (FIG. 28D). The applying of the catalyst C1 to the metal oxide film (insulating film) 216 can be carried out by, for example, pouring a catalyst suspension into the flow path 215 of the joined body 210 to fill it, or immersing the joined body 210 in the catalyst suspension, and thereafter, removing the catalyst suspension from the flow path 215, and drying the joined body 210.

Incidentally, it may also be arranged that, after forming the microchannel portions 212 and 214 on the metal substrates 211 and 213, the metal substrates 211 and 213 are anodically oxidized to form metal oxide films, then, after polishing to remove the metal oxide films existing on surfaces that will serve as joining surfaces, the metal substrates 211 and 213 are joined together, and then, the catalyst C1 is applied to the metal oxide film.

Then, by providing a heater on the metal oxide film (insulating film) 216 on the side of the metal substrate 211, and further, by forming electrodes for energization and forming a heater protective layer on the heater, a unit microreactor 202b can be obtained.

As a method of forming the heater, there can be cited a method of forming it by screen printing using a paste containing the foregoing material, a method of forming an applied film using a paste containing the foregoing material, then patterning it by etching or the like, a method of forming a thin film by the vacuum deposition method using the foregoing material, then patterning it by etching or the like, or another. Further, the electrodes for energization can be formed by, for example, screen printing using a paste containing the foregoing conductive material. Further, the heater protective layer can be formed in a predetermined pattern by, for example, screen printing using a paste containing the foregoing material.

As described above, by applying the catalyst C1 after the formation of the joined body 210 having the flow path 215 to obtain the unit microreactor 202b, there is no possibility of deactivation of the catalyst due to heat in the joining process so that the selection width of the catalyst is broadened. Further, by preparing a plurality of unit flow path members each having been completed up to the forming process of the metal oxide film (insulating film) 216, it is possible to obtain a unit microreactor having a required function only by applying a desired catalyst.

Incidentally, the unit flow path member (unit microreactor) 202b having the foregoing joined body 241 can be produced likewise by joining the metal cover member 244, instead of the metal substrate 213, to the metal substrate 211 in the foregoing production example.

Now, using as an example the unit flow path member (unit microreactor) 202b comprising the foregoing joined body 251, a production method thereof will be described referring to FIG. 29.

Figure 29A:
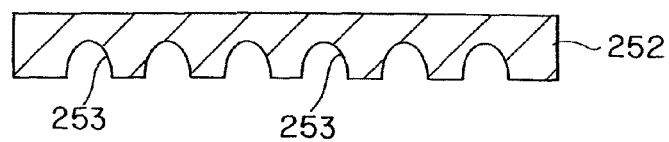
FIG. 29 is a process diagram showing another example of a production method of a unit microreactor.

In FIG. 29, a microchannel portion 253 is first formed on one surface of a metal substrate 252 (FIG. 29A). The formation of the microchannel portion 53 can be implemented like the formation of the foregoing microchannel portion 212, 214.

Figure 29B:
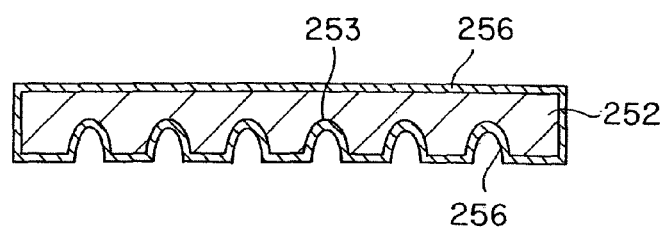

Then, the metal substrate 252 is anodically oxidized to form a metal oxide film 256 on the whole surfaces including the inside of the microchannel portion 253 (FIG. 29B). Incidentally, if use is made of a metal material disabling anodic oxidation but enabling a boehmite treatment for the metal substrate 252, the metal oxide film 256 is formed by the boehmite treatment.

Figure 29C:
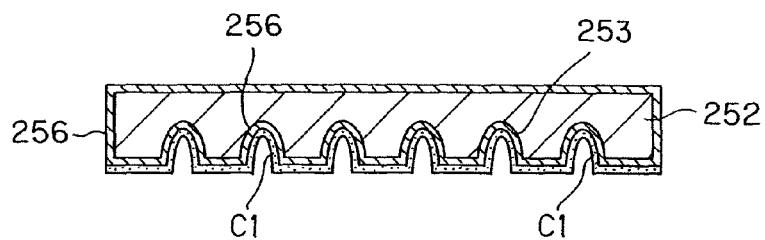

Then, a catalyst C1 is applied to the microchannel portion 253 (FIG. 29C). This catalyst applying can be implemented by immersing a surface, where the microchannel portion 253 is formed, of the metal substrate 252 in a desired catalyst suspension and drying it.

Figure 29D:
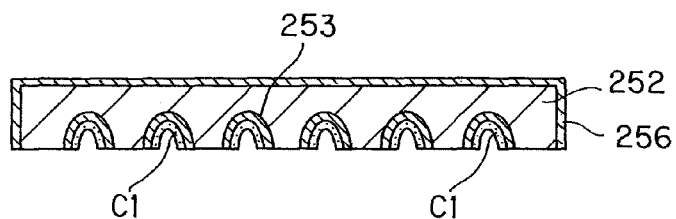
Figure 29E:
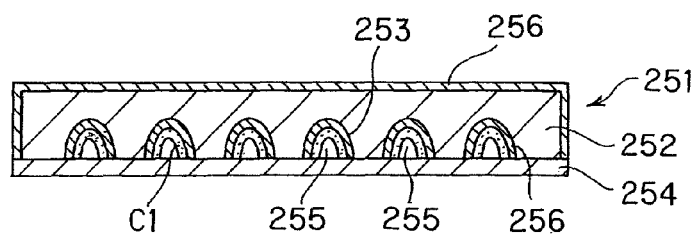

Then, the side, where the microchannel portion 253 is formed, of the metal substrate 252 is subjected to polishing to expose the surface that will serve as a joining surface with a metal cover member 254 (FIG. 29D). Thereafter, the metal substrate 252 and the metal cover member 254 are joined together to form a joined body 251 (FIG. 29E). By this joining, a flow path 255 is formed within the joined body 251.

Then, by providing a heater on the metal oxide film (insulating film) 256 of the metal substrate 252, and further, by forming electrodes for energization and forming a heater protective layer on the heater, a unit flow path member (unit microreactor) 202b can be obtained.

The foregoing embodiments of the microreactors are only examples, and the present invention is not limited thereto.

[Production Method of Microreactor]

Now, description will be made of a microreactor producing method of the present invention.

First Embodiment of Production Method

FIGS. 30 and 31 are process diagrams for describing one embodiment of the microreactor producing method of the present invention.

In FIGS. 30 and 31, description will be made using the foregoing microreactor 1 as an example. In the production method of the present invention, a microchannel portion 3 is first formed on one surface 2a of a metal substrate 2 (FIG. 30A). This microchannel portion 3 can be formed by forming a resist having a predetermined opening pattern on the surface 2a of the metal substrate 2, and etching the metal substrate 2 to leave comb-shaped ribs 2A and 2B by wet etching using the resist as a mask, which can make processing by a micromachine unnecessary. As a material of the metal substrate 2 that is used, there can be cited Al, Si, Ta, Nb, V, Bi, Y, W, Mo, Zr, Hf, or the like which enables anodic oxidation in the next anodic oxidation process.

Figure 30A:
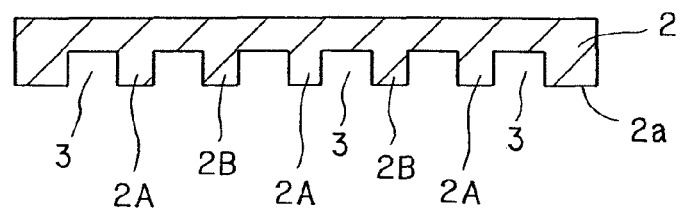
FIGS. 30A to 30D are process diagrams for describing one embodiment of a microreactor producing method of the present invention.
Figure 30B:
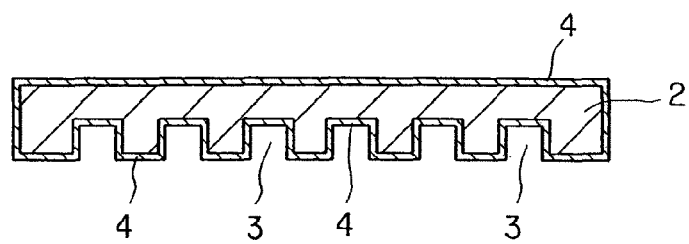

Then, the metal substrate 2 formed with the microchannel portion 3 is anodically oxidized to form a metal oxide film (insulating film 4) on the whole surfaces including the inside of the microchannel portion 3 (FIG. 30B). The formation of this metal oxide film (insulating film 4) can be implemented by, in the state where the metal substrate 2 is connected to an anode as an external electrode, immersing the metal substrate 2 in an anode oxidizing solution so as to confront a cathode and energizing it.

Figure 30C:
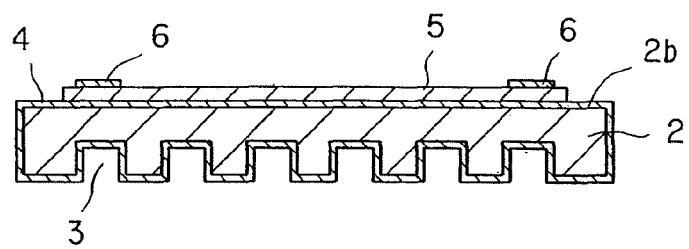

Then, a heater 5 is provided on the metal oxide film (insulating film 4) of a surface 2b, where the microchannel portion 3 is not formed, of the metal substrate 2, and further, electrodes 6 and 6 for energization are formed (FIG. 30C). The heater 5 can be formed using a material such as carbon paste, nichrome (Ni—Cr alloy), W, or Mo. As a method of forming the heater 5, there can be cited a method of forming it by screen printing using a paste containing the foregoing material, a method of forming an applied film using a paste containing the foregoing material, then patterning it by etching or the like, a method of forming a thin film by the vacuum deposition method using the forgoing material, then patterning it by etching or the like, or another.

On the other hand, the electrodes 6 and 6 for energization can be formed using a conductive material such as Au, Ag, Pd, or Pd—Ag. For example, they can be formed by screen printing using a paste containing the foregoing conductive material.

Figure 30D:
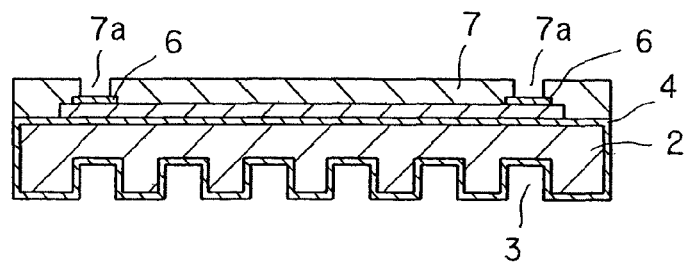

Then, a heater protective layer 7 is formed on the heater 5 so as to expose the electrodes 6 and 6 (FIG. 30D). The heater protective layer 7 can be formed using a material such as polyimide or ceramic ($Al_2O_3$, $SiO_2$). For example, it can be formed in a pattern having electrode opening portions 7a and 7a by screen printing using a paste containing the foregoing material.

Figure 31A:
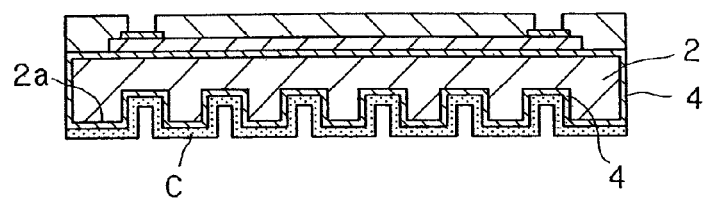
FIGS. 31A to 31C are process diagrams for describing one embodiment of a microreactor producing method of the present invention.
Figure 31B:
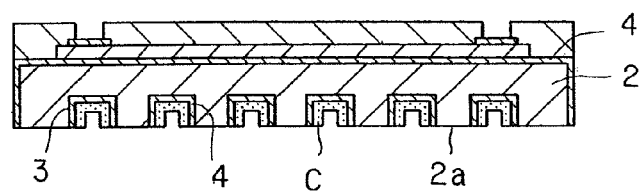

Then, a catalyst C is applied to the microchannel portion 3 (FIG. 31A). This catalyst applying can be implemented by immersing the surface 2a, where the microchannel portion 3 is formed, of the metal substrate 2 in a desired catalyst solution.

Figure 31C:
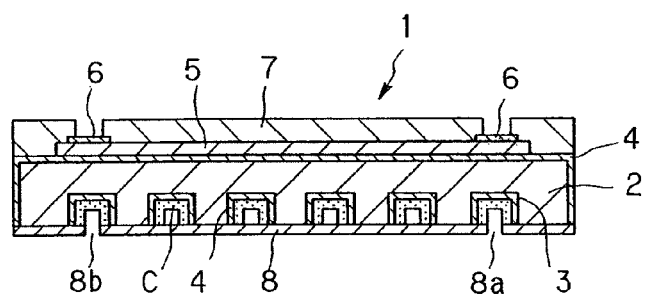

Then, the metal substrate 2 is polished to expose the surface 2a thereof (FIG. 31B), thereafter, a cover member 8 is joined to the metal substrate surface 2a to thereby obtain the microreactor 1 of the present invention (FIG. 31C). For the cover member 8, an Al alloy, a Cu alloy, a stainless material, or the like can be used. The joining of the cover member 8 to the metal substrate surface 2a can be carried out by, for example, diffusion bonding, brazing, or the like. Upon the joining, positioning is carried out so that a feed material inlet 8a and a gas outlet 8b provided in the cover member 8 coincide with both end portions of a flow path of the microchannel portion 3 formed on the metal substrate 2.

In the production method of the present invention, the formation of the heater 5, the electrodes 6 and 6, and the heater protective layer 7 may be implemented after the joining between the metal substrate 2 and the cover member 8.

Second Embodiment of Production Method

FIGS. 32 and 33 are process diagrams for describing another embodiment of the microreactor producing method of the present invention.

In FIGS. 32 and 33, description will be made using the foregoing microreactor 1' as an example. In the production method of the present invention, a microchannel portion 3 is first formed on one surface 2'a of a metal substrate 2' (FIG. 32A). As the metal substrate 2', it is possible to use any of an Al substrate, a Cu substrate, a stainless substrate, or the like. The formation of the microchannel portion 3 can be implemented like the foregoing formation of the microchannel portion 3 onto the metal substrate 2.

Figure 32A:
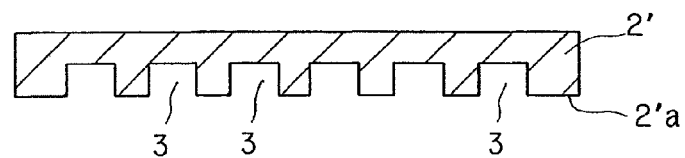
FIGS. 32A to 32D are process diagrams for describing another embodiment of a microreactor producing method of the present invention.
Figure 32B:
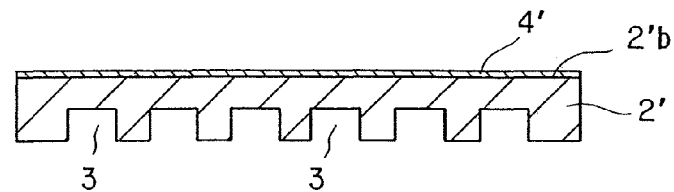

Then, an insulating film 4' is formed on a surface 2'b, where the microchannel portion 3 is not formed, of the metal substrate 2' (FIG. 32B). The insulating film 4' can be formed using, for example, polyimide, ceramic ($Al_2O_3$, $SiO_2$), or the like. The formation of the insulating film 4' can be implemented, for example, by the printing method such as screen printing using a paste containing the foregoing insulating material, or by forming a thin film by the vacuum film forming method such as sputtering or vacuum deposition using the foregoing insulating material and curing it.

Figure 32C:
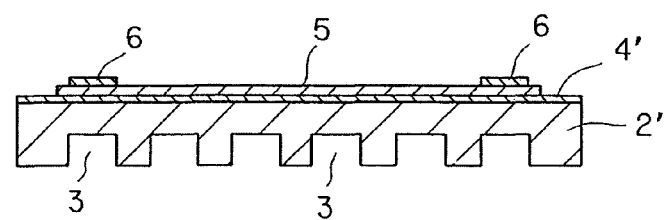

Then, a heater 5 is provided on the insulating film 4', and further, electrodes 6 and 6 for energization are formed (FIG. 32C). The formation of such a heater 5 and electrodes 6 and 6 can be implemented like that in the foregoing production method of the microreactor 1.

Figure 32D:
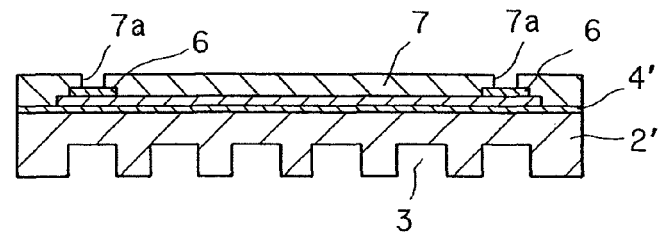

Then, a heater protective layer 7 is formed on the heater 5 so as to expose the electrodes 6 and 6 (FIG. 32D). The formation of this heater protective layer 7 can be implemented like that in the foregoing production method of the microreactor 1.

Figure 33A:
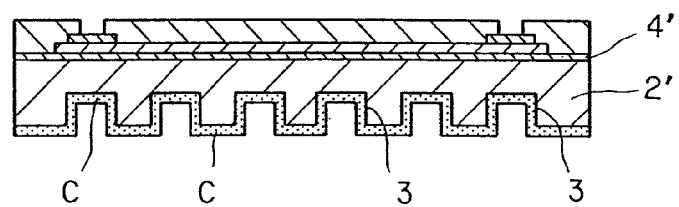
FIGS. 33A to 33C are process diagrams for describing another embodiment of a microreactor producing method of the present invention.
Figure 33B:
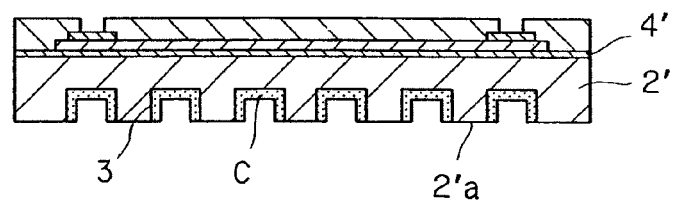

Then, a catalyst C is applied to the microchannel portion 3 (FIG. 33A). This catalyst applying can be implemented by immersing the surface 2'a, where the microchannel portion 3 is formed, of the metal substrate 2' in a desired catalyst solution.

Figure 33C:
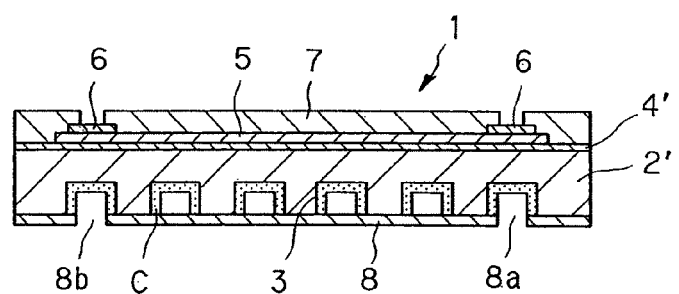

Then, the metal substrate 2' is polished to expose the metal substrate surface 2'a (FIG. 33B), thereafter, a cover member 8 is joined to the metal substrate surface 2'a to thereby obtain the microreactor 1' of the present invention (FIG. 33C). The joining of the cover member 8 can be carried out like that in the foregoing production method of the microreactor 1.

In the microreactor producing method of the present invention as described above, since the metal substrate is used, the formation of the microchannel portion does not require the micromachine processing, but can be easily implemented by a low-priced processing method such as etching to thereby enable reduction in production cost of the microreactor.

In the production method of the present invention, the formation of the insulating film 4', the heater 5, the electrodes 6 and 6, and the heater protective layer 7 may be implemented after the joining between the metal substrate 2' and the cover member 8.

Third Embodiment of Production Method

FIGS. 34 to 38 are process diagrams for describing one embodiment of the microreactor producing method of the present invention, using the foregoing microreactor 11 as an example. Each of the diagrams is shown in section at a position corresponding to FIG. 6 or 7.

Figure 34A:
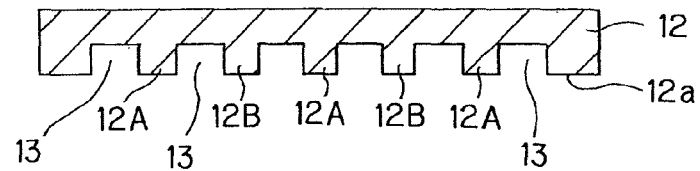
FIGS. 34A to 34D are process diagrams for describing one embodiment of a microreactor producing method of the present invention.
Figure 34B:
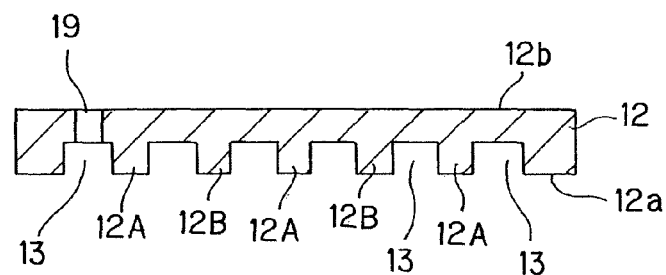

In the production method of the present invention, at the outset, a microchannel portion 3 is formed on one surface 12a of a metal substrate 12 and a through hole 19 is formed (FIGS. 34A, 34B). A resist having a predetermined opening pattern corresponding to the microchannel portion 13 is formed on the surface 12a of the metal substrate 12, while a resist having an opening pattern for forming the through hole 19 is formed on a surface 12b of the metal substrate 12. Then, the microchannel portion 13 is formed by half-etching the metal substrate 12 from the side of the surface 12a so as to leave comb-shaped ribs 12A and 12B by wet etching using the resist as a mask and, simultaneously, the through hole 19 can be formed by double-sided etching. Therefore, the processing by the micromachine is not required. As a material of the metal substrate 12 that is used, there can be cited Al, Si, Ta, Nb, V, Bi, Y, W, Mo, Zr, Hf, or the like which enables anodic oxidation in the next anodic oxidation process.

Figure 34C:
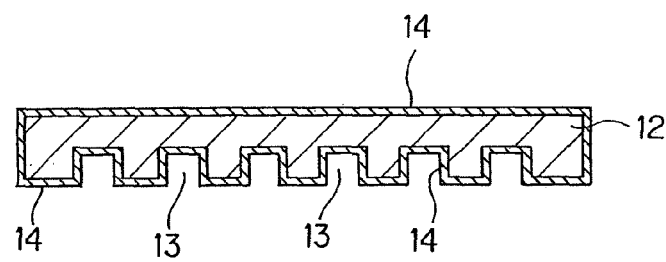
Figure 34D:
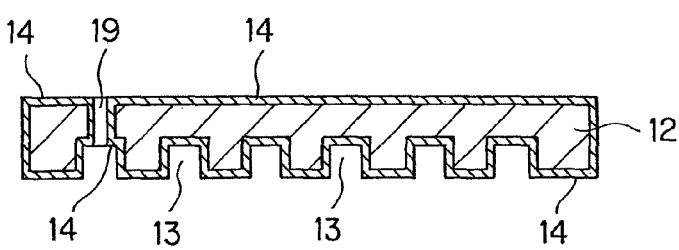

Then, the metal substrate 12 formed with the microchannel portion 13 and the through hole 19 is anodically oxidized to form a metal oxide film (insulating film 14) on the whole surfaces including the inside of the microchannel portion 13 and the inside of the through hole 19 (FIGS. 34C, 34D). The formation of this metal oxide film (insulating film 14) can be implemented by, in the state where the metal substrate 12 is connected to an anode as an external electrode, immersing the metal substrate 12 in an anode oxidizing solution so as to confront a cathode and energizing it.

Figure 35A:
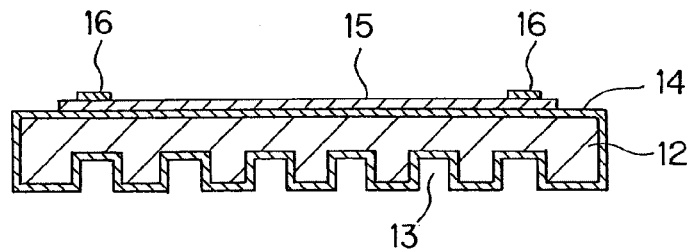
FIGS. 35A to 35D are process diagrams for describing one embodiment of a microreactor producing method of the present invention.
Figure 35B:
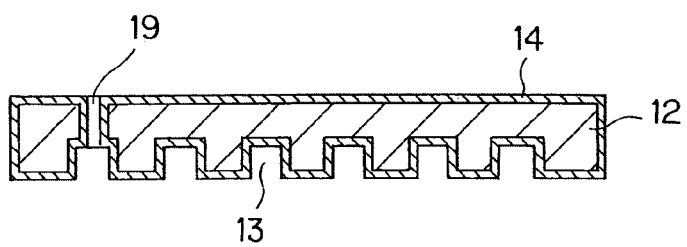

Then, a heater 15 is provided on the metal oxide film (insulating film 14) of the surface 12b, where the microchannel portion 13 is not formed, of the metal substrate 12 so as not to close the through hole 19, and further, electrodes 16 and 16 for energization are formed (FIGS. 35A, 35B). The heater 15 can be formed using a material such as carbon paste, nichrome (Ni—Cr alloy), W, or Mo. As a method of forming the heater 15, there can be cited a method of forming it by screen printing using a paste containing the foregoing material, a method of forming an applied film using a paste containing the foregoing material, then patterning it by etching or the like, a method of forming a thin film by the vacuum deposition method using the forgoing material, then patterning it by etching or the like, or another.

On the other hand, the electrodes 16 and 16 for energization can be formed using a conductive material such as Au, Ag, Pd, or Pd—Ag. For example, they can be formed by screen printing using a paste containing the foregoing conductive material.

Figure 35C:
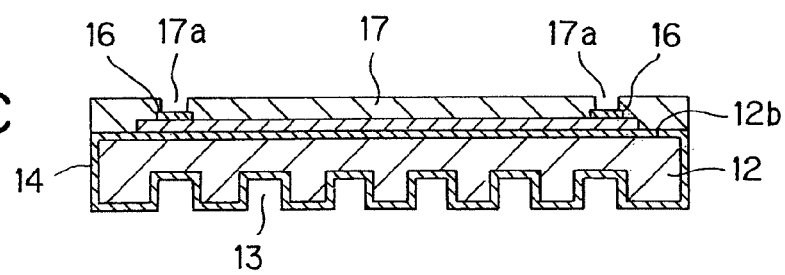
Figure 35D:
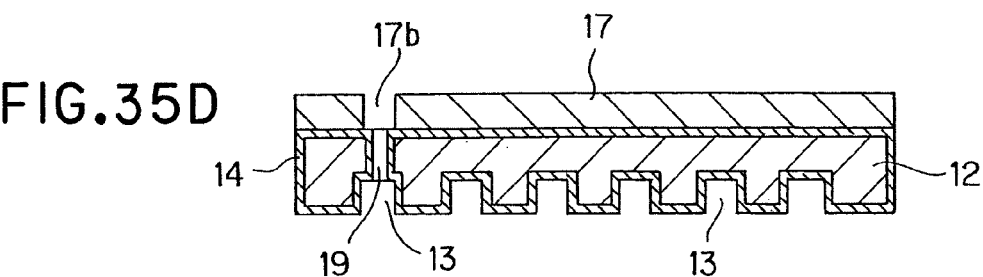

Then, a heater protective layer 17 is formed on the heater 15 so as to expose the electrodes 16 and 16 and the through hole 19 (FIGS. 35C, 35D). The heater protective layer 17 can be formed using a material such as polyimide or ceramic ($Al_2O_3$, $SiO_2$). For example, it can be formed in a pattern having electrode opening portions 17a and 17a and an opening portion 17b by screen printing using a paste containing the foregoing material.

Figure 36A:
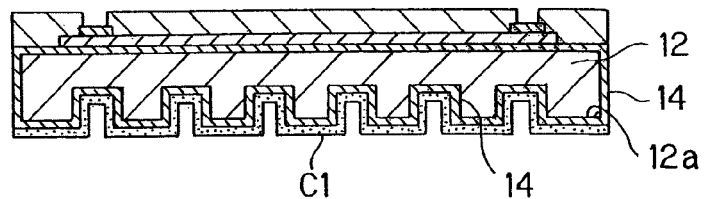
FIGS. 36A to 36D are process diagrams for describing one embodiment of a microreactor producing method of the present invention.
Figure 36B:
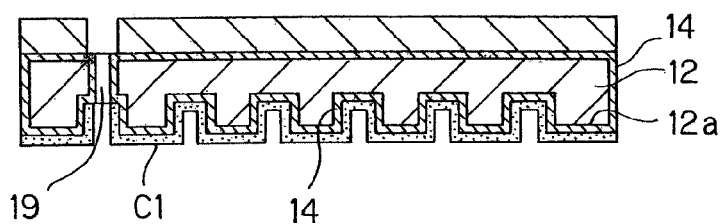

Then, a catalyst C1 is applied to the microchannel portion 13 (FIGS. 36A, 36B). This catalyst applying can be implemented by immersing the surface 12a, where the microchannel portion 13 is formed, of the metal substrate 12 in a desired catalyst solution.

Figure 36C:
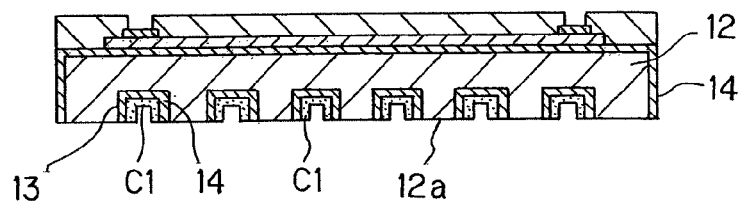
Figure 36D:
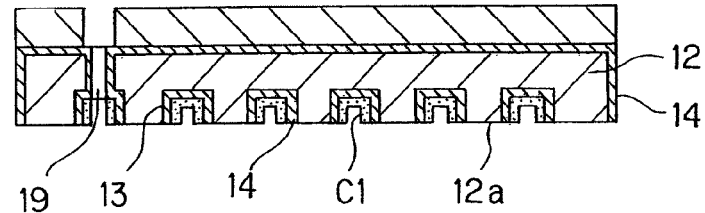

Then, the metal substrate 12 is polished to expose the surface 12a thereof that will serve as a joining surface with a metal substrate 22 (FIGS. 36C, 36D).

Figure 37A:
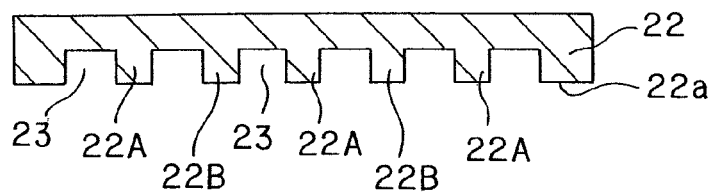
FIGS. 37A to 37D are process diagrams for describing one embodiment of a microreactor producing method of the present invention.
Figure 37B:
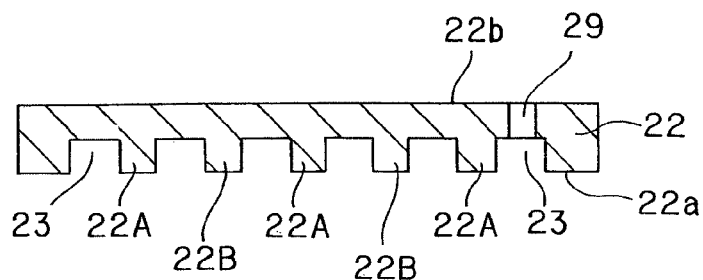
Figure 37C:
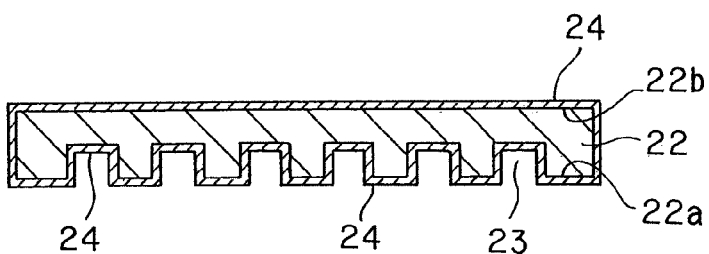
Figure 37D:
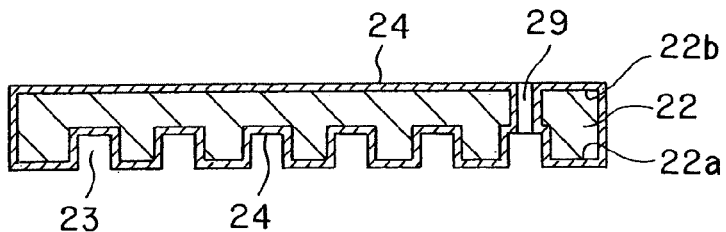

On the other hand, like the foregoing metal substrate 12, a microchannel portion 23 is formed on one surface 22a of the metal substrate 22 and a through hole 29 is formed (FIGS. 37A, 37B). Then, the metal substrate 22 formed with the microchannel portion 23 and the through hole 29 is anodically oxidized to form a metal oxide film (insulating film 24) on the whole surfaces including the inside of the microchannel portion 23 and the inside of the through hole 29 (FIGS. 37C, 37D).

Figure 38A:
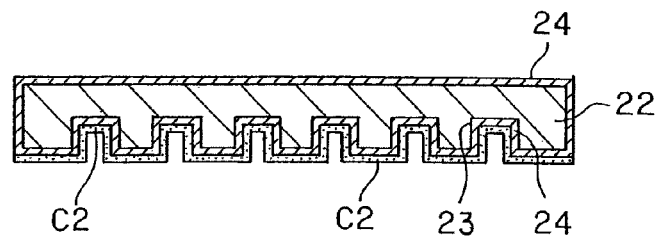
FIGS. 38A to 38D are process diagrams for describing one embodiment of a microreactor producing method of the present invention.
Figure 38B:
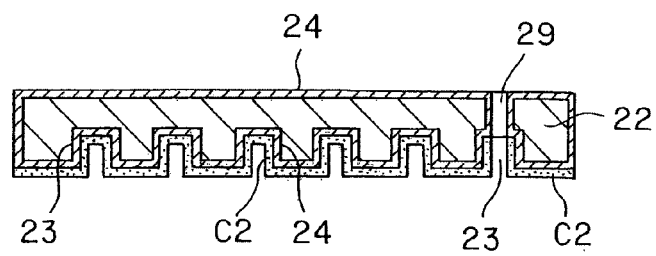

Then, a catalyst C2 is applied to the microchannel portion 23 (FIGS. 38A, 38B). This catalyst applying can be implemented by immersing the surface 22a, where the microchannel portion 23 is formed, of the metal substrate 22 in a desired catalyst solution.

Figure 38C:
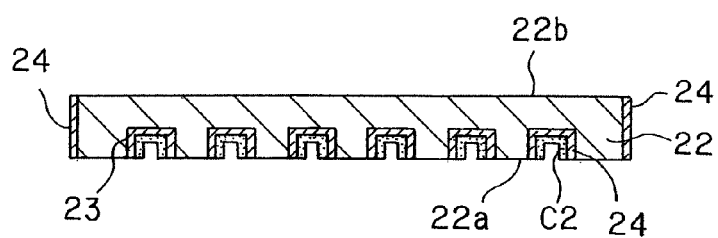
Figure 38D:
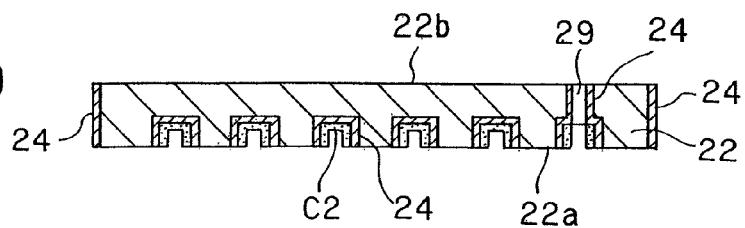

Then, the metal substrate 22 is polished on both sides thereof to expose the surface 22a thereof that will serve as a joining surface with a cover member 28 and a surface 22b of the metal substrate 22 that will serve as a joining surface with the metal substrate 12 (FIGS. 38C, 38D).

Then, the surface 12a of the foregoing metal substrate 12 and the surface 22b of the metal substrate 22 are joined together, and further, the cover member 28 is joined to the metal substrate surface 22a to thereby obtain the microreactor 11 of the present invention. For the cover member 28, it is possible to use an Al alloy, a Cu alloy, a stainless material, or the like. The joining between the metal substrate 12 and the metal substrate 22 and the joining between the metal substrate 22 and the cover member 28 can be carried out by, for example, diffusion bonding, brazing, or the like. Upon the joining, positioning is carried out so that the through hole 29 of the metal substrate 22 coincides with an end portion 13b of a flow path of the microchannel portion 13 formed on the metal substrate 12, and a gas outlet 28a provided in the cover member 28 coincides with an end portion 23b of a flow path of the microchannel portion 23 formed on the metal substrate 22.

In the production method of the present invention, the following processes may be employed. First, joining between the foregoing metal substrate 12, metal substrate 22, and cover member 28 is carried out. Thereafter, the heater 15, the electrodes 16 and 16, and the heater protective layer 17 may be formed on the metal oxide film (insulating film) 14 on the surface 12b of the metal substrate 12.

Fourth Embodiment of Production Method

FIGS. 39 and 40 are process diagrams for describing another embodiment of the microreactor producing method of the present invention, using the foregoing microreactor 11' as an example.

Figure 39A:
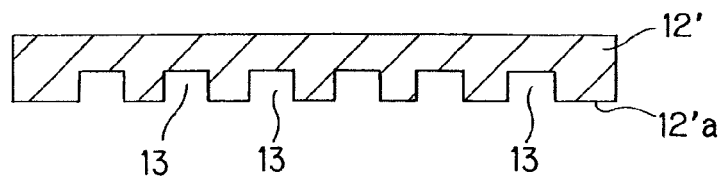
FIGS. 39A to 39D are process diagrams for describing another embodiment of a microreactor producing method of the present invention.

In FIGS. 39 and 40, in the production method of the present invention, at the outset, a microchannel portion 13 and a through hole 19 (not illustrated) are formed on one surface 12'a of a metal substrate 12' (FIG. 39A). As the metal substrate 12', it is possible to use any of an Al substrate, a Cu substrate, a stainless substrate, or the like. The formation of the microchannel portion 13 and the through hole 19 can be implemented like the foregoing formation of the microchannel portion 13 and the through hole 19 onto the metal substrate 12.

Figure 39B:
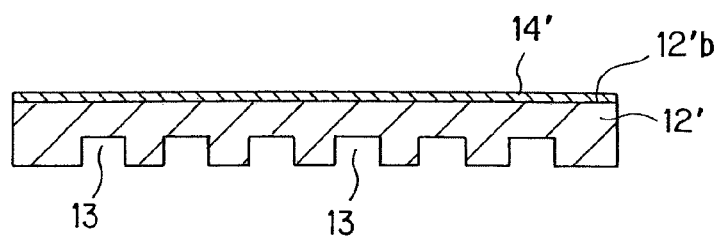

Then, an insulating film 14' is formed on a surface 12'b, where the microchannel portion 13 is not formed, of the metal substrate 12' so as not to close the through hole 19 (not illustrated) (FIG. 39B). The insulating film 14' can be formed using, for example, polyimide, ceramic ($Al_2O_3$, $SiO_2$), or the like. The formation of the insulating film 14' can be implemented, for example, by the printing method such as screen printing using a paste containing the foregoing insulating material, or by forming a thin film by the vacuum film forming method such as sputtering or vacuum deposition using the foregoing insulating material and curing it.

Figure 39C:
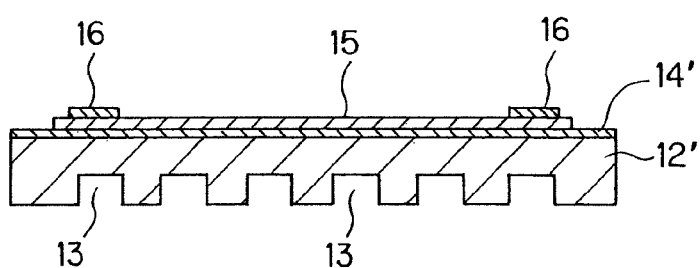

Then, a heater 15 is provided on the insulating film 14', and further, electrodes 16 and 16 for energization are formed (FIG. 39C). The formation of such a heater 15 and electrodes 16 and 16 can be implemented like that in the foregoing production method of the microreactor 11.

Figure 39D:
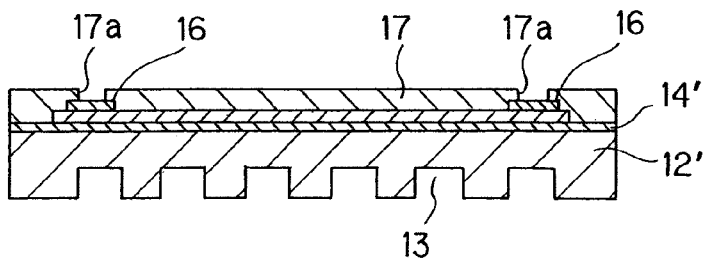

Then, a heater protective layer 17 is formed on the heater 15 so as to expose the electrodes 16 and 16 and the through hole 19 (not illustrated) (FIG. 39D). The formation of this heater protective layer 17 can be implemented like that in the foregoing production method of the microreactor 11.

Figure 40A:
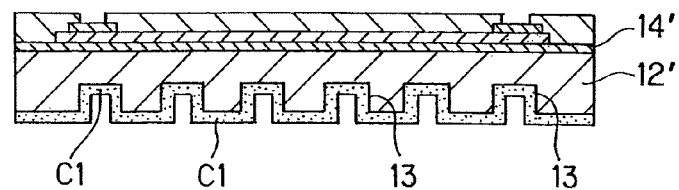
FIGS. 40A to 40D are process diagrams for describing another embodiment of a microreactor producing method of the present invention.

Then, a catalyst C1 is applied to the microchannel portion 13 (FIG. 40A). This catalyst applying can be implemented by immersing the surface 12'a, where the microchannel portion 13 is formed, of the metal substrate 12' in a desired catalyst solution.

Figure 40B:
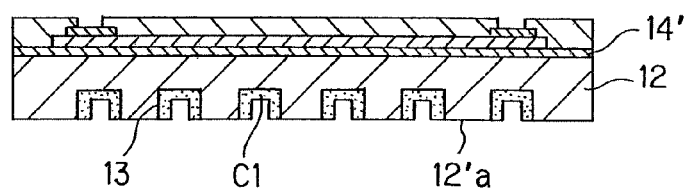

Then, the metal substrate 12' is polished to expose the metal substrate surface 12'a that will be joined to a metal substrate 22' (FIG. 40B).

Figure 40C:
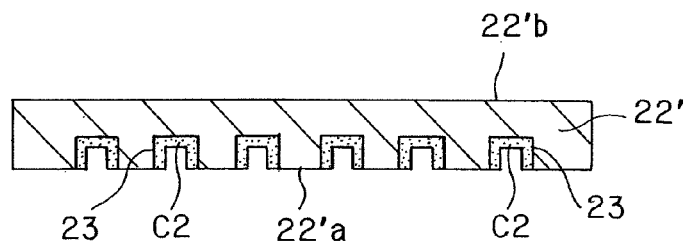

On the other hand, like the foregoing metal substrate 12', a microchannel portion 23 is formed on one surface 22'a of the metal substrate 22' and a through hole 29 (not illustrated) is formed, then a catalyst C2 is applied to the microchannel portion 23, and the metal substrate 22' is polished to expose the surface 22'a of the metal substrate 22' that will serve as a joining surface with a cover member 28, and a surface 22'b of the metal substrate 22' that will serve as a joining surface with the metal substrate 12' (FIG. 40C).

Figure 40D:
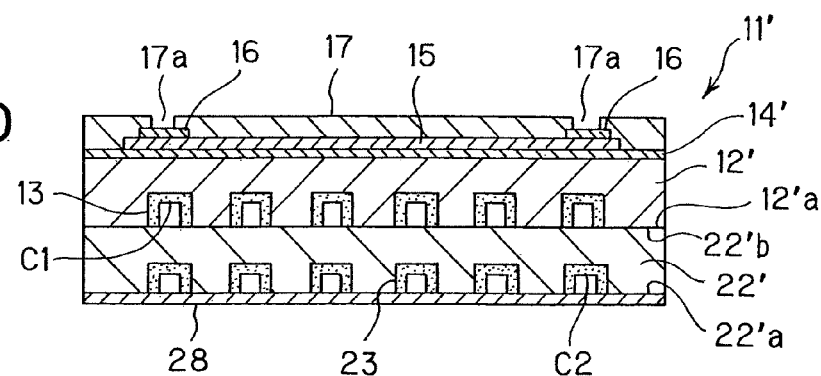

Then, the surface 12'a of the foregoing metal substrate 12' and the surface 22'b of the metal substrate 22' are joined together, and further, the cover member 28 is joined to the metal substrate surface 22'a to thereby obtain the microreactor 11' of the present invention (FIG. 40D). The joining between the metal substrate 12' and the metal substrate 22' and the joining between the metal substrate 22' and the cover member 28 can be carried out like those in the foregoing production method of the microreactor 11.

In the microreactor producing method of the present invention as described above, since the metal substrates are used, the formation of the microchannel portions does not require the micromachine processing, but can be easily implemented by a low-priced processing method such as etching to thereby enable reduction in production cost of the microreactor.

In the production method of the present invention, the formation of the heater 15, the electrodes 16 and 16, and the heater protective layer 17 onto the insulating film 14' may be implemented after the joining between the metal substrate 12', the metal substrate 22', and the cover member 28.

Fifth Embodiment of Production Method

FIGS. 41 and 42 are process diagrams for describing one embodiment of the microreactor producing method of the present invention.

In FIGS. 41 and 42, description will be made using the foregoing microreactor 101 as an example.

Figure 41A:
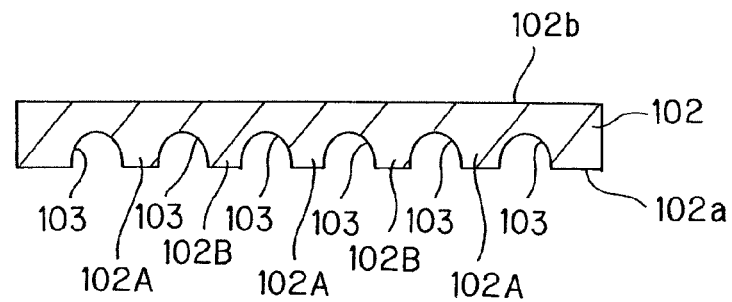
FIGS. 41A to 41C are process diagrams for describing one embodiment of a microreactor producing method of the present invention.

In the production method of the present invention, at the outset, in a channel portion forming process, a microchannel portion 103 is formed on one surface 102a of a metal substrate 102 (FIG. 41A). This microchannel portion 103 can be formed by forming a resist having a predetermined opening pattern on the surface 102a of the metal substrate 102, and etching the metal substrate 102 to leave comb-shaped ribs 102A and 102B by wet etching using the resist as a mask, which can make processing by a micromachine unnecessary. The microchannel portion 103 that is formed preferably has a circular arc shape, a semicircular shape, or a U-shape in section, and preferably has no angular portion on the wall surface along the fluid flow direction. With such a shape, it is possible to prevent a catalyst from being accumulated at angular portions in a later catalyst applying process so that uniform catalyst applying is enabled. As a material of the metal substrate 102 that is used, there can be cited Al, Si, Ta, Nb, V, Bi, Y, W, Mo, Zr, Hf, or the like which enables formation of a metal oxide film by anodic oxidation in a subsequent surface treatment process.

Figure 41B:
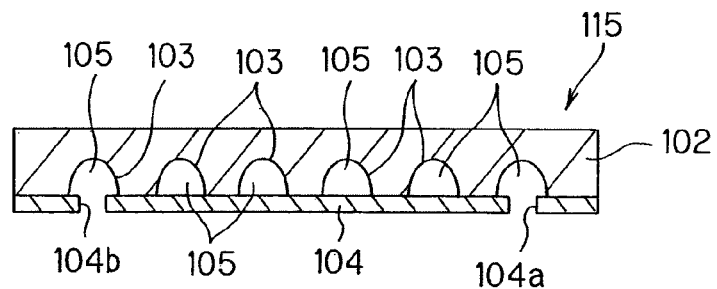

Then, in a joining process, a metal cover member 4 is joined to the metal substrate surface 102a to form a joined body 115 (FIG. 41B). As a material of the metal cover member 104, it is also possible to use Al, Si, Ta, Nb, V, Bi, Y, W, Mo, Zr, Hf, or the like which enables formation of a metal oxide film by anodic oxidation in the next surface treatment process. The joining of the metal cover member 104 to the metal substrate surface 102a can be implemented by, for example, diffusion bonding, brazing, or the like. Upon the joining, positioning is carried out so that a feed material inlet 104a and a gas outlet 104b provided in the cover member 104 coincide with both end portions of a flow path of the microchannel portion 103 formed on the metal substrate 102. In the joined body 115 thus formed, the microchannel portion 103 is covered with the metal cover member 104 to form a flow path 105.

Figure 41C:
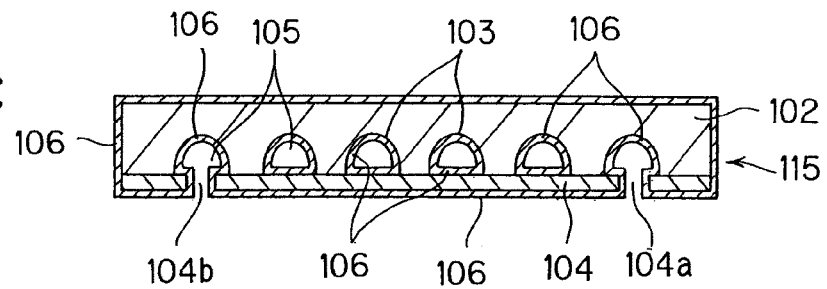

Then, in the surface treatment process, the joined body 115 is anodically oxidized to form a metal oxide film (insulating film) 106 on the whole surfaces including an inner wall surface of the flow path 105 (FIG. 41C). The formation of this metal oxide film (insulating film) 106 can be implemented by, in the state where the joined body 115 is connected to an anode as an external electrode, immersing the joined body 115 in an anode oxidizing solution so as to confront a cathode and energizing it.

Figure 42A:
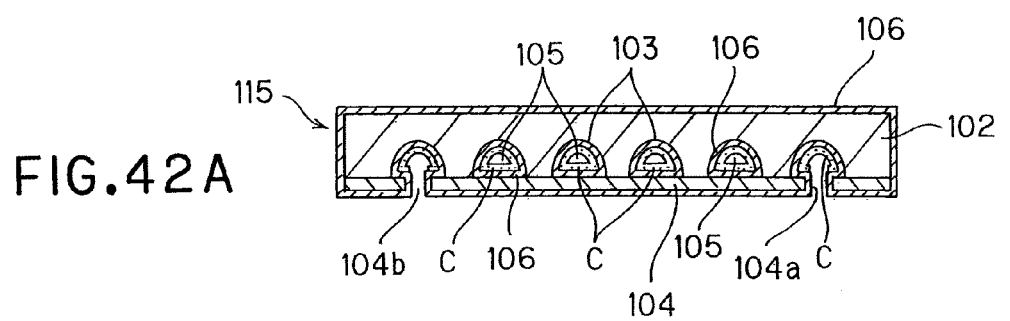
FIGS. 42A to 42C are process diagrams for describing one embodiment of a microreactor producing method of the present invention.

Then, in the catalyst applying process, a catalyst C is applied to the whole inner wall surface of the flow path 105 via the metal oxide film (insulating film) 106 (FIG. 42A). The applying of the catalyst C onto the metal oxide film (insulating film) 106 can be carried out by, for example, pouring a catalyst suspension into the flow path 105 of the joined body 115 to fill it, or immersing the joined body 115 in the catalyst suspension, and thereafter, removing the catalyst suspension from the flow path 105, and drying the joined body 115. In this catalyst applying process, as described above, when the sectional shape of the microchannel portion 3 is a circular arc shape, a semicircular shape, or a U-shape and no angular portion exists on the wall surface along the fluid flow direction, there exist hardly any angular portions, where the catalyst tends to be accumulated, within the flow path 105 so that uniform catalyst applying is enabled. Incidentally, by giving vibration or rotation to the joined body 115 upon the foregoing drying, more uniform catalyst applying is made possible.

Figure 42B:
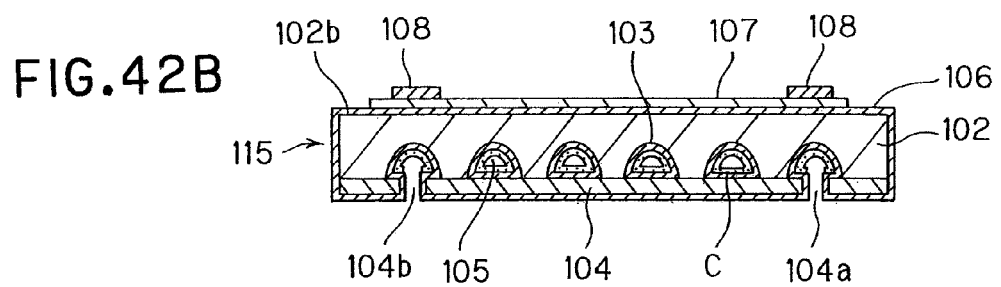

Then, a heater 107 is provided on the metal oxide film (insulating film) 106 on the side of a surface 102b of the metal substrate 102, and further, electrodes 108 and 108 for energization are formed (FIG. 42B). The heater 107 can be formed using a material such as carbon paste, nichrome (Ni—Cr alloy), W, or Mo. As a method of forming the heater 107, there can be cited a method of forming it by screen printing using a paste containing the foregoing material, a method of forming an applied film using a paste containing the foregoing material, then patterning it by etching or the like, a method of forming a thin film by the vacuum deposition method using the forgoing material, then patterning it by etching or the like, or another.

On the other hand, the electrodes 108 and 108 for energization can be formed using a conductive material such as Au, Ag, Pd, or Pd—Ag. For example, they can be formed by screen printing using a paste containing the foregoing conductive material.

Figure 42C:
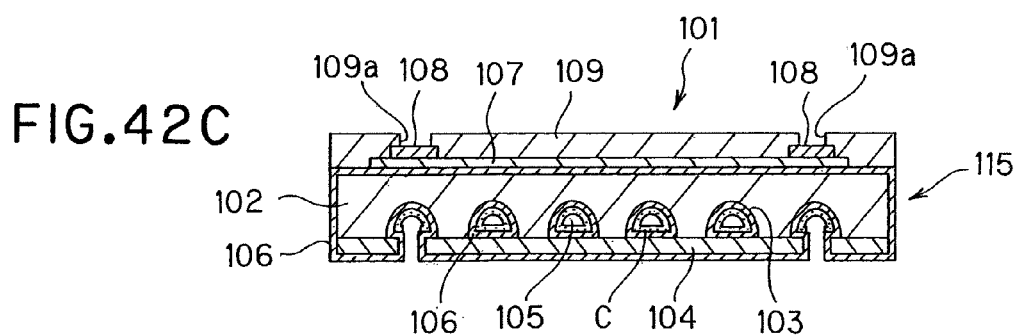

Then, a heater protective layer 109 is formed on the heater 107 so as to expose the electrodes 108 and 108 (FIG. 42C). The heater protective layer 109 can be formed using a material such as polyimide or ceramic ($Al_2O_3$, $SiO_2$). For example, it can be formed in a pattern having electrode opening portions 109a and 109a by screen printing using a paste containing the foregoing material.

In the production method of the present invention, the following processes may be employed. First, the metal substrate 102 formed with the microchannel portion 103 is anodically oxidized to form the metal oxide film (insulating film) 106 on the whole surfaces. Then, the metal oxide film 106 existing on the surface 102a that will serve as the joining surface is polished to be removed, and then the metal substrate 102 and the cover member 104 are joined together. Thereafter, the catalyst C is applied to the metal oxide film 106 serving as the inner wall surface of the flow path 105.

Sixth Embodiment of Production Method

Figure 43A:
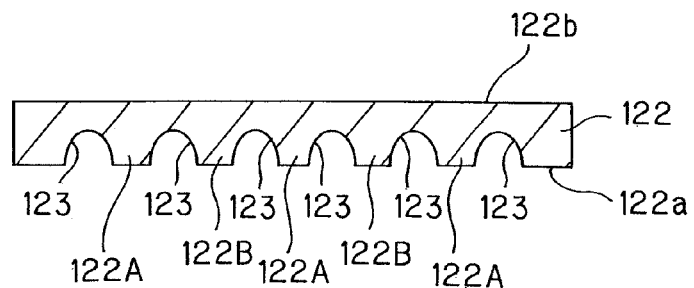
FIGS. 43A to 43C are process diagrams for describing another embodiment of a microreactor producing method of the present invention.
Figure 43B:
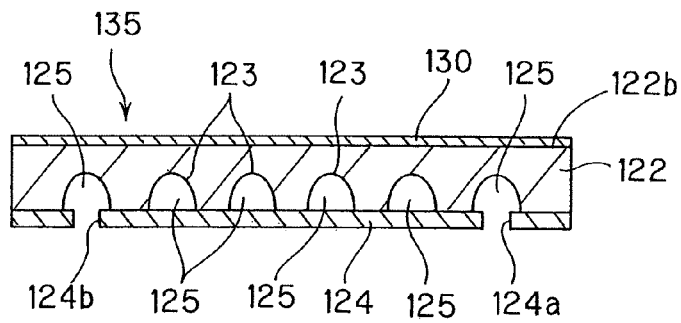
Figure 43C:
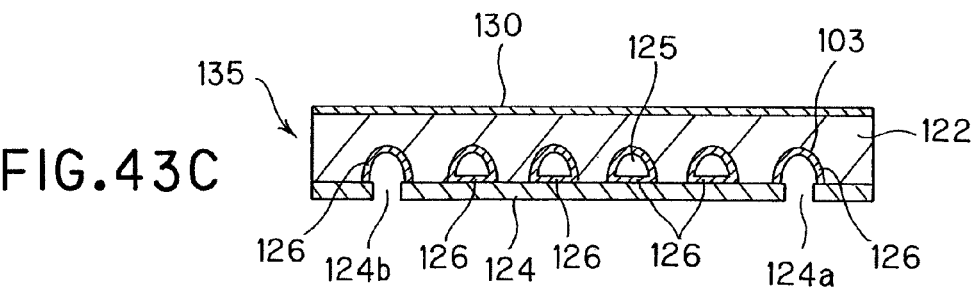
Figure 44A:
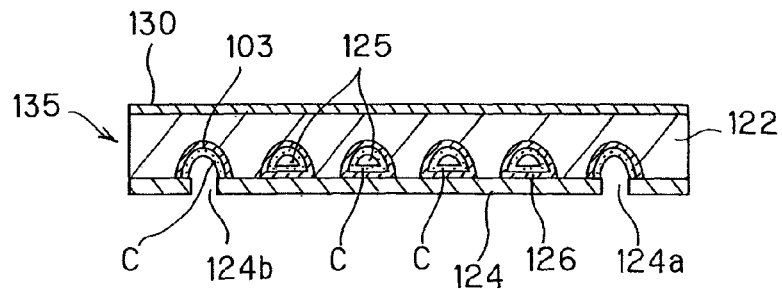
FIGS. 44A to 44C are process diagrams for describing another embodiment of a microreactor producing method of the present invention.
Figure 44B:
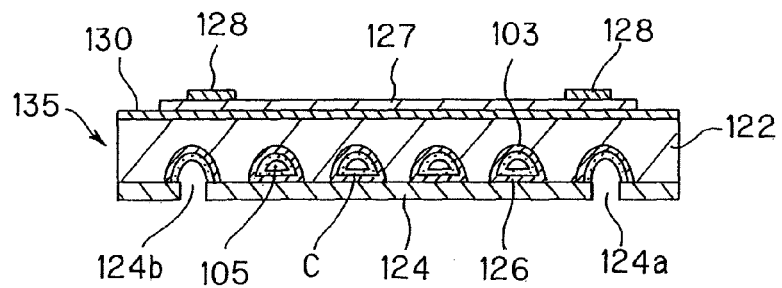
Figure 44C:
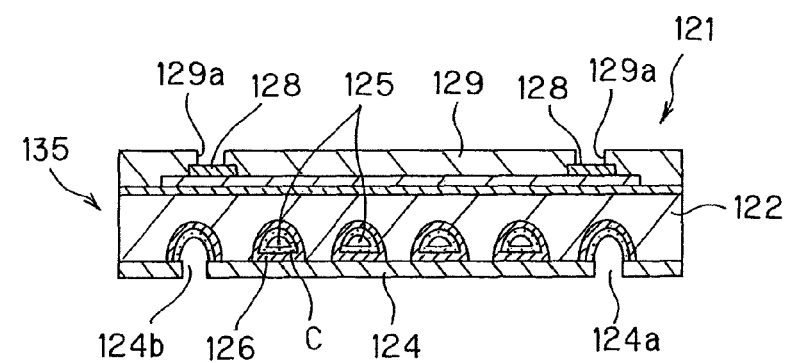

FIGS. 43 and 44 are process diagrams for describing another embodiment of the microreactor producing method of the present invention.

In FIGS. 43 and 44, description will be made using the foregoing microreactor 121 as an example.

In the production method of the present invention, at the outset, in a channel portion forming process, a microchannel portion 123 is formed on one surface 122a of a metal substrate 122 (FIG. 43A). For the metal substrate 122 that is used, it is possible to use a material such as Cu, stainless, Fe, or Al which enables formation of a metal oxide film by a boehmite treatment in a later surface treatment process. The formation of the microchannel portion 123 can be implemented like the formation of the microchannel portion 103 on the metal plate 102 in the foregoing embodiment.

Then, in a joining process, after forming an insulating film 130 on a surface 122b, where the microchannel portion 123 is not formed, of the metal substrate 122, a metal cover member 124 is joined to the metal substrate surface 122a where the microchannel portion 123 is formed, to thereby form a joined body 135 (FIG. 43B).

The insulating film 130 can be formed using, for example, polyimide, ceramic ($Al_2O_3$, $SiO_2$), or the like. The formation of the insulating film 130 can be implemented, for example, by the printing method such as screen printing using a paste containing the foregoing insulating material, or by forming a thin film by the vacuum film forming method such as sputtering or vacuum deposition using the foregoing insulating material and curing it. Incidentally, the formation of the insulating film 130 may be carried out after the joining between the metal substrate 122 and the metal cover member 124.

As a material of the metal cover member 124, it is possible to use a material such as Cu, stainless, Fe, or Al which enables formation of a metal oxide film by a boehmite treatment in the next surface treatment process. The joining of the metal cover member 124 to the metal substrate surface 122a can be implemented by, for example, diffusion bonding, brazing, or the like. Upon the joining, positioning is carried out so that a feed material inlet 124a and a gas outlet 124b provided in the metal cover member 124 coincide with both end portions of a flow path of the microchannel portion 123 formed on the metal substrate 122. In the joined body 135 thus formed, the microchannel portion 123 is covered with the metal cover member 124 to form a flow path 125.

Then, in the surface treatment process, a metal oxide film 126 is formed on an inner wall surface of the flow path 125 of the joined body 135 (FIG. 43C). The formation of the metal oxide film 126 can be implemented by the boehmite treatment. For example, it can be implemented by using a suspension with boehmite alumina such as alumina sol being dispersed therein, and pouring the suspension with a fully lowered viscosity into the flow path 125, thereafter, drying it to fix a boehmite coating on the inner surface of the flow path (washcoat process).

Then, in a catalyst applying process, a catalyst C is applied to the whole inner wall surface of the flow path 125 via the metal oxide film 126 (FIG. 44A). The applying of the catalyst C onto the metal oxide film 126 can be carried out like the catalyst applying process in the foregoing embodiment. Also in this embodiment, when the sectional shape of the microchannel portion 123 is a circular arc shape, a semicircular shape, or a U-shape and no angular portion exists on the wall surface along the fluid flow direction, there exist hardly any angular portions, where the catalyst tends to be accumulated, within the flow path 125 so that uniform catalyst applying is enabled. Incidentally, by giving vibration or rotation to the joined body 135 upon drying, more uniform catalyst applying is made possible.

Then, a heater 127 is provided on the insulating film 130 on the side of a surface 122b of the metal substrate 122, and further, electrodes 128 and 128 for energization are formed (FIG. 44B). Thereafter, a heater protective layer 129 is formed on the heater 127 so as to expose the electrodes 128 and 128 (FIG. 42C). Materials and forming methods of the heater 127, the electrodes 128 and 128, and the heater protective layer 129 can be the same as in the foregoing embodiment.

In the production method of the present invention, the following processes may be employed. First, the metal substrate 122 formed with the microchannel portion 123 is anodically oxidized to form the metal oxide film (insulating film) 126 on the whole surfaces. Then, the metal oxide film 126 existing on the surface 122a that will serve as the joining surface is polished to be removed. Thereafter, the metal substrate 122 and the cover member 124 are joined together. Then, the catalyst C is applied to the metal oxide film 126 serving as the inner wall surface of the flow path 125. Then, the insulating film 130 is formed on the surface 122b of the metal substrate 122 and, on this insulating film 130, the heater 127, the electrodes 128 and 128, and the heater protective layer 129 are formed.

Seventh Embodiment of Production Method

FIGS. 45 and 46 are process diagrams for describing another embodiment of the microreactor producing method of the present invention.

In FIGS. 45 and 46, description will be made using the foregoing microreactor 141 as an example.

Figure 45A:
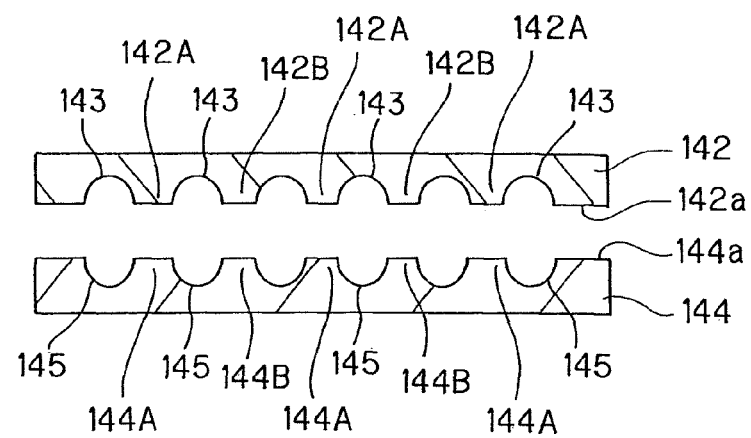
FIGS. 45A to 45C are process diagrams for describing another embodiment of a microreactor producing method of the present invention.

In the production method of the present invention, at the outset, in a channel portion forming process, a microchannel portion 143 is formed on one surface 142a of a metal substrate 142, and a microchannel portion 145 is formed on one surface 144a of a metal substrate 144 (FIG. 45A). The microchannel portion 143, 145 can be formed by forming a resist having a predetermined opening pattern on the surface 142a, 144a of the metal substrate 142, 144 and etching the metal substrate 142, 144 to leave comb-shaped ribs 142A and 142B, 144A and 144B by wet etching using the resist as a mask, which can make processing by a micromachine unnecessary.

The metal substrates 142 and 144 form a pair of metal substrates wherein pattern shapes of the microchannel portion 143 and the microchannel portion 145 that are formed have a symmetrical relationship with respect to a joining plane (142a, 144a) between the metal substrates 142 and 144. Further, the microchannel portion 143, 145 preferably has a circular arc shape, a semicircular shape, or a U-shape in section, and preferably has no angular portion on the wall surface along the fluid flow direction (a turnback portion at each of tip portions of the comb-shaped ribs 142A and 142B, 144A and 144B is rounded with no angular portion). With such a shape, it is possible to prevent a catalyst from being accumulated at angular portions in a later catalyst applying process so that uniform catalyst applying is enabled. As a material of the metal substrate 142, 144 that is used, there can be cited Al, Si, Ta, Nb, V, Bi, Y, W, Mo, Zr, Hf, or the like which enables formation of a metal oxide film by anodic oxidation in a subsequent surface treatment process.

Figure 45B:
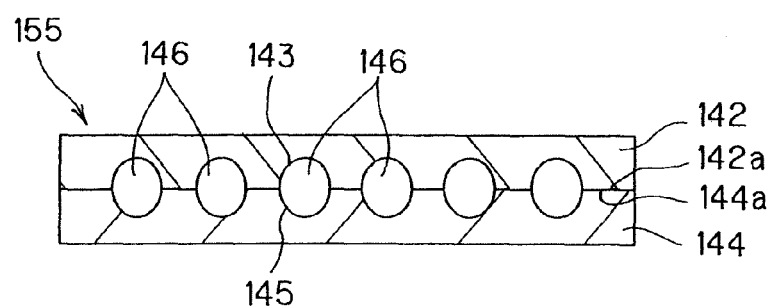

Then, in a joining process, the pair of metal substrates 142 and 144 are joined together at the surfaces 142a and 144a such that the microchannel portion 143 and the microchannel portion 145 confront each other, thereby to form a joined body 155 (FIG. 45B).

As described above, the microchannel portion 143 and the microchannel portion 145 have the pattern shapes that are in a symmetrical relationship with respect to the joining plane (142a, 144a) between the metal substrates 142 and 144. Therefore, by the joining between the metal substrates 142 and 144, the microchannel portion 143 and the microchannel portion 145 completely confront each other to form a flow path 146. The shape of an inner wall surface of the flow path 146 is generally circular in a section perpendicular to a fluid flow direction of the flow path 146. The foregoing joining between the metal substrates 142 and 144 can be carried out by, for example, diffusion bonding, brazing, or the like.

Figure 45C:
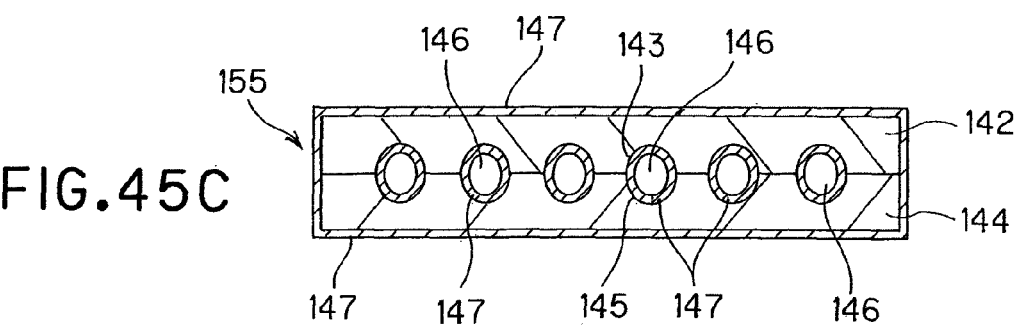

Then, in the surface treatment process, the joined body 155 is anodically oxidized to form a metal oxide film (insulating film) 147 on the whole surfaces including the inner wall surface of the flow path 146 (FIG. 45C). The formation of this metal oxide film (insulating film) 147 can be implemented by, in the state where the joined body 155 is connected to an anode as an external electrode, immersing the joined body 155 in an anode oxidizing solution so as to confront a cathode and energizing it.

Figure 46A:
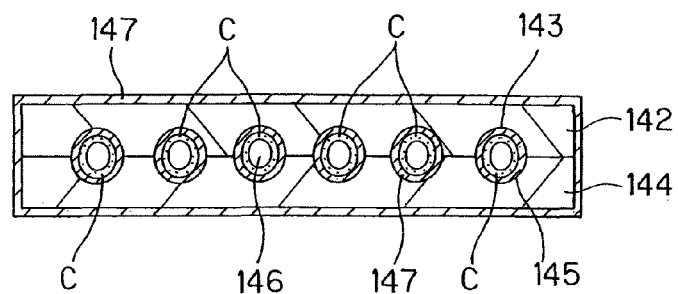
FIGS. 46A to 46C are process diagrams for describing another embodiment of a microreactor producing method of the present invention.

Then, in the catalyst applying process, a catalyst C is applied to the whole inner wall surface of the flow path 146 via the metal oxide film (insulating film) 147 (FIG. 46A). The applying of the catalyst C to the metal oxide film (insulating film) 147 can be carried out by, for example, pouring a catalyst suspension into the flow path 146 of the joined body 155 to fill it, or immersing the joined body 155 in the catalyst suspension, and thereafter, removing the catalyst suspension from the flow path 146, and drying the joined body 155. In this catalyst applying process, as described above, when the sectional shape of the microchannel portion 143, 145 is a circular arc shape, a semicircular shape, or a U-shape and no angular portion exists on the wall surface along the fluid flow direction, there exist hardly any angular portions, where the catalyst tends to be accumulated, within the flow path 146 so that uniform catalyst applying is enabled. Incidentally, by giving vibration or rotation to the joined body 155 upon the foregoing drying, more uniform catalyst applying is made possible.

Figure 46B:
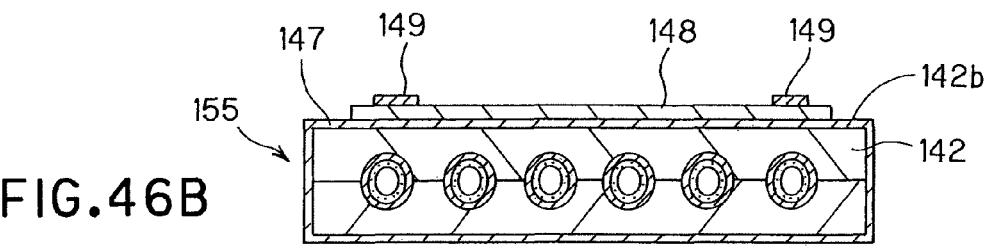

Then, a heater 148 is provided on the metal oxide film (insulating film) 147 on the side of a surface 142b of the metal substrate 142, and further, electrodes 149 and 149 for energization are formed (FIG. 46B). The heater 148 can be formed using a material such as carbon paste, nichrome (Ni—Cr alloy), W, or Mo. As a method of forming the heater 148, there can be cited a method of forming it by screen printing using a paste containing the foregoing material, a method of forming an applied film using a paste containing the foregoing material, then patterning it by etching or the like, a method of forming a thin film by the vacuum deposition method using the forgoing material, then patterning it by etching or the like, or another.

On the other hand, the electrodes 149 and 149 for energization can be formed using a conductive material such as Au, Ag, Pd, or Pd—Ag. For example, they can be formed by screen printing using a paste containing the foregoing conductive material.

Figure 46C:
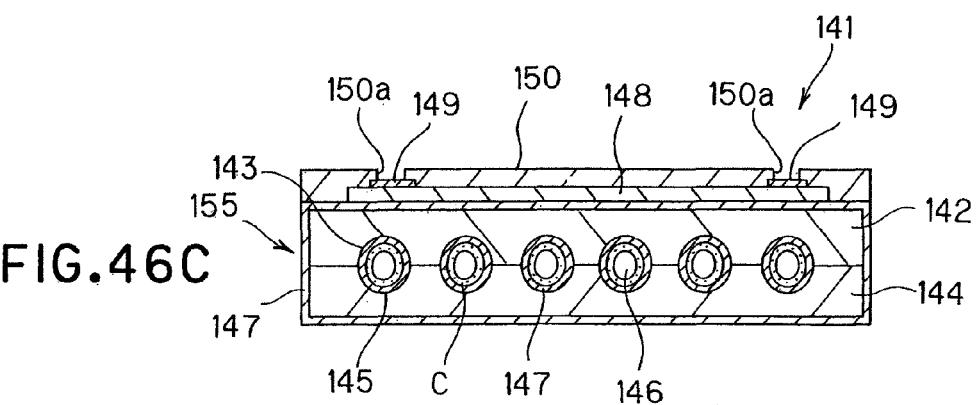

Then, a heater protective layer 150 is formed on the heater 148 so as to expose the electrodes 149 and 149 (FIG. 46C). The heater protective layer 150 can be formed using a material such as polyimide or ceramic ($Al_2O_3$, $SiO_2$). For example, it can be formed in a pattern having electrode opening portions 150a and 150a by screen printing using a paste containing the foregoing material.

In the production method of the present invention, the following processes may be employed. First, the metal substrate 142, 144 formed with the microchannel portion 143, 145 is anodically oxidized to form the metal oxide film (insulating film) 147 on the whole surfaces. Then, the metal oxide film 147 existing on the surface 142a, 144a that will serve as the joining surface is polished to be removed. Thereafter, the metal substrate 142 and the metal substrate 144 are joined together. Then, the catalyst C is applied to the metal oxide film 147 serving as the inner wall surface of the flow path 146.

Eighth Embodiment of Production Method

FIGS. 47 and 48 are process diagrams for describing another embodiment of the microreactor producing method of the present invention.

In FIGS. 47 and 48, description will be made using the foregoing microreactor 161 as an example.

Figure 47A:
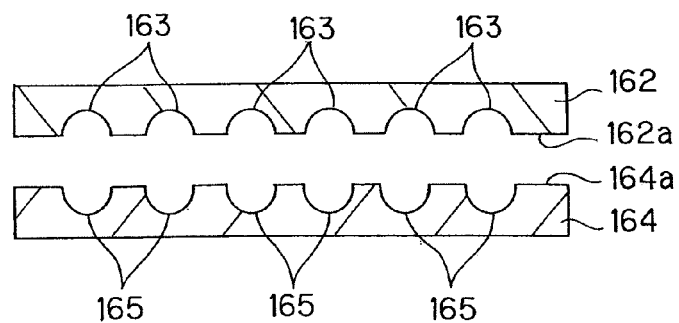
FIGS. 47A to 47C are process diagrams for describing another embodiment of a microreactor producing method of the present invention.

In the production method of the present invention, at the outset, in a channel portion forming process, a microchannel portion 163 is formed on one surface 162a of a metal substrate 162, and a microchannel portion 165 is formed on one surface 164a of a metal substrate 164 (FIG. 47A). The formation of the microchannel portion 163, 165 can be implemented like the formation of the microchannel portion 143, 145 on the metal substrate 142, 144 in the foregoing third embodiment. For the metal substrate 162, 164 that is used, it is possible to use a material such as Cu, stainless, Fe, or Al which enables formation of a metal oxide film by a boehmite treatment in a later surface treatment process.

Figure 47B:
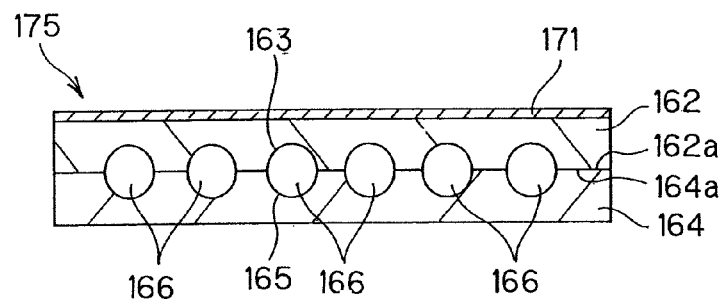

Then, in a joining process, after forming an insulating film 171 on a surface 162b, where the microchannel portion 163 is not formed, of the metal substrate 162, the pair of metal substrates 162 and 164 are joined together at the surfaces 162a and 164a such that the microchannel portion 163 and the microchannel portion 165 confront each other, thereby to form a joined body 175 (FIG. 47B).

The insulating film 171 can be formed using, for example, polyimide, ceramic ($Al_2O_3$, $SiO_2$), or the like. The formation of the insulating film 171 can be implemented, for example, by the printing method such as screen printing using a paste containing the foregoing insulating material, or by forming a thin film by the vacuum film forming method such as sputtering or vacuum deposition using the foregoing insulating material and curing it. Incidentally, the formation of the insulating film 171 may be carried out after the joining between the metal substrates 162 and 164.

The joining of the foregoing metal substrates 162 and 164 can be implemented by, for example, diffusion bonding, brazing, or the like. In this joining, since the microchannel portion 163 and the microchannel portion 165 have pattern shapes that are in a symmetrical relationship with respect to a joining plane (162a, 164a) between the metal substrates 162 and 164, the microchannel portion 163 and the microchannel portion 165 completely confront each other to form a flow path 166. The shape of an inner wall surface of the flow path 166 is generally circular in a section perpendicular to a fluid flow direction of the flow path 166.

Figure 47C:
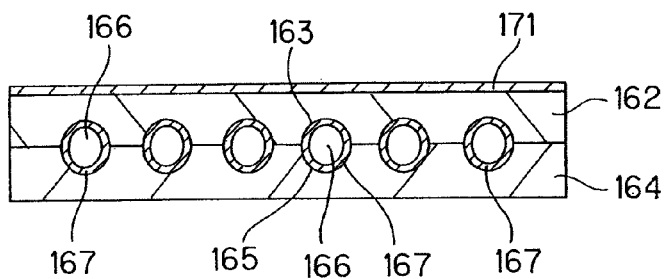

Then, in the surface treatment process, a metal oxide film 167 is formed on an inner wall surface of the flow path 166 of the joined body 175 (FIG. 47C). The formation of the metal oxide film 167 can be implemented by the boehmite treatment. For example, it can be implemented by using a suspension with boehmite alumina such as alumina sol being dispersed therein, and pouring the suspension with a fully lowered viscosity into the flow path 166, thereafter, drying it to fix a boehmite coating on the inner surface of the flow path (washcoat process).

Figure 48A:
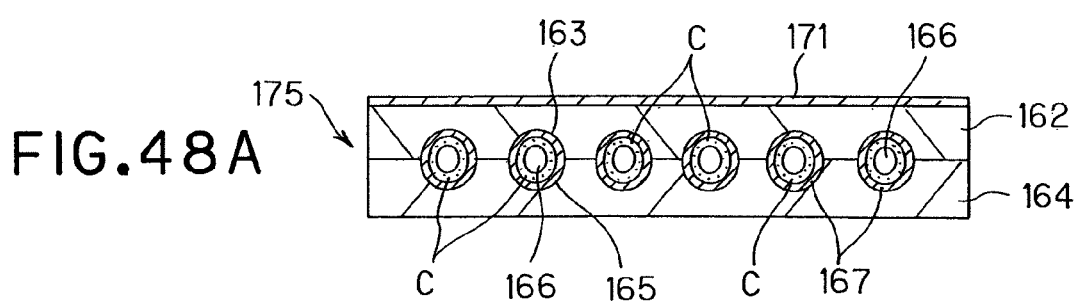
FIGS. 48A to 48C are process diagrams for describing another embodiment of a microreactor producing method of the present invention.

Then, in a catalyst applying process, a catalyst C is applied to the whole inner wall surface of the flow path 166 via the metal oxide film 167 (FIG. 48A). The applying of the catalyst C to the metal oxide film 167 can be carried out like the catalyst applying process in the foregoing third embodiment. Also in this embodiment, when the sectional shape of the microchannel portion 163, 165 is a circular arc shape, a semicircular shape, or a U-shape and no angular portion exists on the wall surface along the fluid flow direction, an angular portion, where the catalyst tends to be accumulated, does not exist within the flow path 166 so that uniform catalyst applying is enabled. Incidentally, by giving vibration or rotation to the joined body 175 upon drying, more uniform catalyst applying is made possible.

Figure 48B:
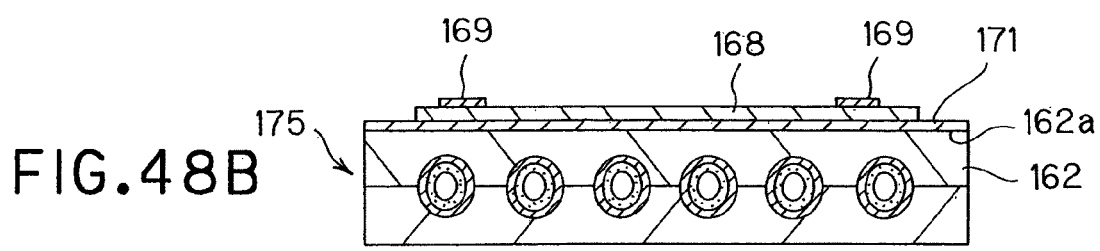
Figure 48C:
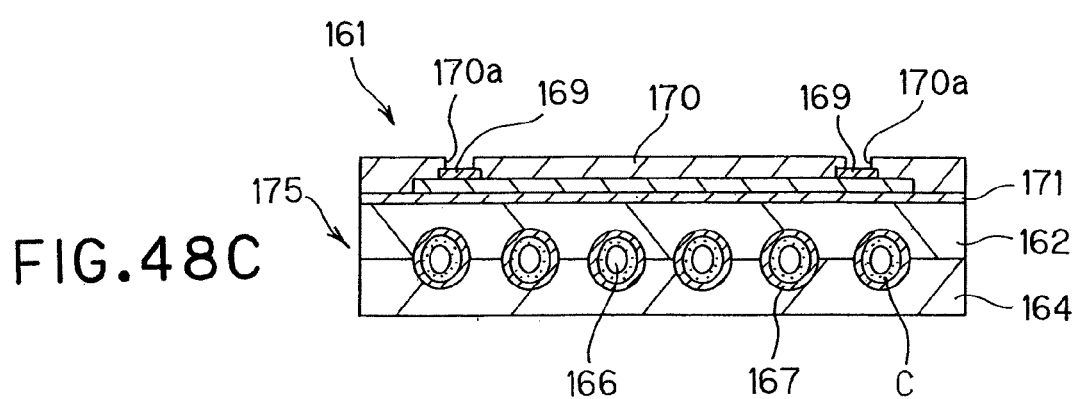

Then, a heater 168 is provided on the insulating film 171 on the side of a surface 162b of the metal substrate 162, and further, electrodes 169 and 169 for energization are formed (FIG. 48B). Thereafter, a heater protective layer 170 is formed on the heater 168 so as to expose the electrodes 169 and 169 (FIG. 48C). Materials and forming methods of the heater 168, the electrodes 169 and 169, and the heater protective layer 170 can be the same as in the foregoing third embodiment.

In the production method of the present invention, the following processes may be employed. First, the metal substrate 162, 164 formed with the microchannel portion 163, 165 is anodically oxidized to form the metal oxide film (insulating film) 167 on the whole surfaces. Then, the metal oxide film 167 existing on the surface 162a, 164a that will serve as the joining surface is polished to be removed. Thereafter, the metal substrate 162 and the metal substrate 164 are joined together. Then, the catalyst C is applied to the metal oxide film 167 serving as the inner wall surface of the flow path 166.

In the microreactor producing method of the present invention as described above, since the catalyst is applied after the joined body having the flow path therein is formed in the joining process, there is no possibility of deactivation of the catalyst due to heat in the joining process so that the selection width of the catalyst is broadened. Further, by preparing a plurality of joined bodies through completion up to the joining process and applying desired catalysts in these joined bodies, it is possible to produce microreactors to be used in different reactions, for example, microreactors for reforming methanol and for oxidation of carbon monoxide, and therefore, simplification of the production processes is made possible. Further, since the metal substrate is used, the formation of the microchannel portion does not require the micromachine processing, but can be easily implemented by a low-priced processing method such as etching, and further, the polishing process is also unnecessary, so that reduction in production cost of the microreactor can be achieved. Further, if it is configured such that no angular portion exists on the inner wall surface of the flow path, dispersion of the applying amount in the catalyst applying process is suppressed so that the catalyst can be uniformly applied.

The foregoing embodiments of the microreactor producing methods are only examples, and the present invention is not limited thereto.

Now, the present invention will be described in further detail showing more specific examples.

Example 1

An Al substrate (250 mm×250 mm) having a thickness of 1000 μm was prepared as a base member, and a photosensitive resist material (OFPR produced by Tokyo Ohka Kogyo Co., Ltd.) was applied (film thickness 7 μm (dried)) to both surfaces of the Al substrate by the dip method. Then, on the resist film on the side, where a microchannel portion was to be formed, of the Al substrate, there was disposed a photomask having a shape in which stripe-shaped light-shielding portions each having a width of 1500 μm projected (projecting length 30 mm) alternately from right and left at pitches of 2000 μm. Then, the resist film was exposed via the photomask and developed using a sodium bicarbonate solution. As a result, on one surface of the Al substrate, there was formed a resist pattern in which stripe-shaped opening portions each having a width of 500 μm were arrayed at pitches of 2000 μm, and the adjacent stripe-shaped opening portions were alternately continuous with each other at their end portions.

Then, using the foregoing resist pattern as a mask, the Al substrate was subjected to etching under the following condition. This etching was for forming a microchannel portion by half etching from the one surface of the Al substrate, and a time required for the etching was three minutes.

(Etching Condition)
Temperature: 20° C.
Etching Liquid (HCl) Concentration: 200 g/L (one liter containing pure water and 200 g of 35% HCl dissolved therein)

After the foregoing etching process was finished, the resist pattern was removed using a sodium hydroxide solution and washing was carried out. As a result, on the one surface of the Al substrate, there was formed a microchannel portion (flow path length 300 mm) wherein stripe-shaped microchannels each having a width of 1000 μm, a depth of 650 μm, and a length of 30 mm were formed at pitches of 2000 μm so as to be alternately continuous with each other at end portions of the adjacent microchannels (as shown in FIG. 3).

Then, the foregoing Al substrate was connected to an anode as an external electrode, immersed in an anode oxidizing solution (4% oxalic acid solution) so as to confront a cathode, and energized under the following condition, to thereby obtain an aluminum oxide thin film formed as an insulating film. The thickness of the formed aluminum oxide thin film was measured by an ellipsometer, and the result was about 30 μm.

(Anodic Oxidation Condition)
Bath Temperature: 25° C.
Voltage: 25V (DC)
Current Density: 100 A/m$^2$ Then, on the aluminum oxide thin film, where the microchannel portion was not formed, of the Al substrate, a paste for heater having the following composition was printed by screen printing, then cured at 200° C. to form a heater. The formed heater had a shape in which a fine line having a width of 100 μm was drawn around on the Al substrate at line intervals of 100 μm so as to cover the whole of a region (35 mm×25 mm) corresponding to a region where the microchannel portion was formed.

(Composition of Paste for Heater)

| | |
|---|---|
| Carbon Powder | 20 weight parts |
| Fine Powder Silica | 25 weight parts |
| Xylene Phenol Resin | 36 weight parts |
| Butyl Carbitol | 19 weight parts |

Further, using a paste for electrode having the following composition, electrodes (0.5 mm×0.5 mm) were formed at predetermined two portions of the heater by screen printing.

(Composition of Paste for Electrode)

| Silver-plated Copper Powder | 90 weight parts |
|---|---|
| Phenol Resin | 6.5 weight parts |
| Butyl Carbitol | 3.5 weight parts |

Then, using a paste for protective layer having the following composition, a heater protective layer (thickness 20 μm) was formed on the heater by screen printing so as to expose the two electrodes formed on the heater.

(Composition of Paste for Protective Layer)

| Resin Concentration | 30 weight parts |
|---|---|
| Silica Filler | 10 weight parts |
| Lactone Solvent (penta-1,4-lactone) | 60 weight parts |

Then, the side, where the microchannel portion was formed, of the Al substrate was immersed (10 minutes) in a catalyst aqueous solution having the following composition, then was subjected to a dry/reduction treatment at 250° C. for six hours, thereby applying a catalyst in the microchannel portion.

(Composition of Catalyst Aqueous Solution)

| Al | 41.2 weight % |
|---|---|
| Cu | 2.6 weight % |
| Zn | 2.8 weight % |

Then, the side, where the microchannel portion was formed, of the Al substrate was polished by alumina powder to thereby expose the Al surface. Then, as a cover member, an Al plate having a thickness of 100 μm was diffusion bonded to the Al substrate surface under the following condition. This Al plate was provided with two opening portions (a feed material inlet and a gas outlet: size of each opening portion 0.6 mm×0.6 mm), and positioning was carried out so that the opening portions coincided with both end portions of a flow path of the microchannel portion formed on the Al substrate.

(Diffusion Bonding Condition)
Atmosphere: Under Vacuum
Bonding Temperature: 300° C.
Bonding Time: 8 Hours Consequently, a microreactor of the present invention was obtained.

Example 2

Production of First-Step Metal Substrate

A stainless substrate (SUS304, 250 mm×250 mm) having a thickness of 1000 μm was prepared as a base member, and a photosensitive resist material (OFPR produced by Tokyo Ohka Kogyo Co., Ltd.) was applied (film thickness 7 μm (dried)) to both surfaces of the stainless substrate by the dip method. Then, on the resist film on the side, where a microchannel portion was to be formed, of the stainless substrate, there was disposed a photomask having a shape in which stripe-shaped light-shielding portions each having a width of 1500 μm projected (projecting length 30 mm) alternately from right and left at pitches of 2000 μm. Further, a photomask having a circular opening with an opening diameter of 800 μm was disposed on the other resist film. Then, the resist films were exposed via those photomasks and developed using a sodium bicarbonate solution. As a result, on one surface of the stainless substrate, there was formed a resist pattern in which stripe-shaped opening portions each having a width of 500 μm were arrayed at pitches of 2000 μm, and the adjacent stripe-shaped opening portions were alternately continuous with each other at their end portions. On the other surface of the stainless substrate, there was formed a resist pattern having a circular opening with an opening diameter of 800 μm. This circular opening was located at a position corresponding to a predetermined position of the stripe-shaped opening portion on the opposite surface.

Then, using the foregoing resist patterns as masks, the stainless substrate was subjected to etching under the following condition. This etching was for forming a microchannel portion by half etching from the one surface of the stainless substrate, and for forming a through hole by etching from the other surface. A time required for the etching was 25 minutes.

(Etching Condition)
Temperature: 80° C.
Etching Liquid (ferric chloride solution)
Specific Weight: 45 (° B'e)

After the foregoing etching process was finished, the resist patterns were removed using a sodium hydroxide solution and washing was carried out. As a result, on the one surface of the stainless substrate, there was formed a microchannel portion (flow path length 300 mm) wherein stripe-shaped microchannels each having a width of 1000 μm, a depth of 650 μm, and a length of 30 mm were formed at pitches of 2000 μm so as to be alternately continuous with each other at end portions of the adjacent microchannels (as shown in FIG. 9). Further, as shown in FIG. 9, an opening of the formed through hole was located at an end portion of the continuous microchannel portion.

Then, on the stainless substrate surface where the microchannel portion was not formed, a polyimide precursor solution (Photoneece produced by Toray Industries, Inc.) as an application liquid for insulating film was printed by screen printing so as not to close the foregoing through hole, then cured at 350° C. to thereby form an insulating film having a thickness of 20 μm.

Then, a paste for heater having the following composition was printed by screen printing on the insulating film of the stainless substrate, then cured at 200° C. to form a heater. The formed heater had a shape in which a fine line having a width of 100 μm was drawn around on the insulating film at line intervals of 100 μm so as to cover the whole of a region (35 mm×25 mm) corresponding to a region where the microchannel portion was formed, and so as not to close the through hole.

(Composition of Paste for Heater)

| Carbon Powder | 20 weight parts |
|---|---|
| Fine Powder Silica | 25 weight parts |
| Xylene Phenol Resin | 36 weight parts |
| Butyl Carbitol | 19 weight parts |

Further, using a paste for electrode having the following composition, electrodes (0.5 mm×0.5 mm) were formed at predetermined two portions of the heater by screen printing.

(Composition of Paste for Electrode)

| Silver-plated Copper Powder | 90 weight parts |
|---|---|
| Phenol Resin | 6.5 weight parts |
| Butyl Carbitol | 3.5 weight parts |

Then, using a paste for protective layer having the following composition, a heater protective layer (thickness 20 μm) was formed on the heater by screen printing so as to expose the two electrodes formed on the heater and the opening of the through hole.

(Composition of Paste for Protective Layer)

| Resin Concentration | 30 weight parts |
|---|---|
| Silica Filler | 10 weight parts |
| Lactone Solvent (penta-1,4-lactone) | 60 weight parts |

Then, the side, where the microchannel portion was formed, of the stainless substrate was immersed (10 minutes) in a catalyst aqueous solution having the following composition, then was subjected to a dry/reduction treatment at 250° C. for six hours, thereby applying a catalyst in the microchannel portion.

(Composition of Catalyst Aqueous Solution)

| Al | 41.2 weight % |
|---|---|
| Cu | 2.6 weight % |
| Zn | 2.8 weight % |

Then, the side, where the microchannel portion was formed, of the stainless substrate was polished by alumina powder to thereby expose the stainless substrate surface. Consequently, the first-step metal substrate was prepared.

[Production of Second-Step Metal Substrate]

On the other hand, the same stainless substrate as described above was prepared, and photosensitive resist films were formed on both surfaces of the stainless substrate in the same manner as described above. Then, on the resist film on the side, where a microchannel portion was to be formed, of the stainless substrate, there was disposed a photomask having a shape in which stripe-shaped light-shielding portions each having a width of 1500 μm projected (projecting length 30 mm) alternately from right and left at pitches of 2000 μm. Further, a photomask having a circular opening with an opening diameter of 800 μm was disposed on the other resist film. Then, the resist films were exposed via those photomasks and developed using a sodium bicarbonate solution. As a result, on one surface of the stainless substrate, there was formed a resist pattern in which stripe-shaped opening portions each having a width of 500 μm were arrayed at pitches of 2000 μm, and the adjacent stripe-shaped opening portions were alternately continuous with each other at their end portions. On the other surface of the stainless substrate, there was formed a resist pattern having a circular opening with an opening diameter of 800 μm. This circular opening was located at a position corresponding to a predetermined position of the stripe-shaped opening portion on the opposite surface.

Then, using the foregoing resist patterns as masks, the stainless substrate was subjected to etching under the same condition as described above. This etching was for forming a microchannel portion by half etching from the one surface of the stainless substrate, and for forming a through hole by etching from the other surface. A time required for the etching was 25 minutes.

After the foregoing etching process was finished, the resist patterns were removed using a sodium hydroxide solution and washing was carried out. As a result, on the one surface of the stainless substrate, there was formed a microchannel portion (flow path length 300 mm) wherein stripe-shaped microchannels each having a width of 1000 μm, a depth of 650 μm, and a length of 30 mm were formed at pitches of 2000 μm so as to be alternately continuous with each other at end portions of the adjacent microchannels (as shown in FIG. 10). Further, as shown in FIG. 10, an opening of the formed through hole was located at an end portion of the continuous microchannel portion.

Then, the side, where the microchannel portion was formed, of the stainless substrate was immersed (10 minutes) in a catalyst aqueous solution having the following composition, then was subjected to a dry/reduction treatment at 500° C. for one hour, thereby applying a catalyst to the microchannel portion.

(Composition of Catalyst Aqueous Solution)

| Pt | 0.4 weight % |
|---|---|
| Fe | 0.2 weight % |
| Mordenite [$Na_8(Al_8Si_{40}O_{96}) \cdot 24H_2O$] | 9.4 weight % |

Then, the side, where the microchannel portion was formed, of the stainless substrate was polished by alumina powder to thereby expose the stainless substrate surface. Consequently, the second-step metal substrate was prepared.

[Joining Process]

The surface, where the microchannel portion was formed, of the foregoing first-step metal substrate, and the surface, opposite to the surface where the microchannel portion was formed, of the second-step metal substrate were diffusion bonded together under the following condition. Upon this bonding, positioning was carried out so that the through hole of the second-step metal substrate coincides with the end portion of the flow path of the microchannel portion formed on the first-step metal substrate (the end portion different from the end portion where the through hole of the first-step metal substrate was formed).

(Diffusion Bonding Condition)
Atmosphere: Under Vacuum
Bonding Temperature: 1000° C.
Bonding Time: 12 Hours Then, as a cover member, a stainless plate having a thickness of 0.3 μm was diffusion bonded to the surface, where the microchannel portion was formed, of the second-step metal substrate under the following condition. This stainless plate was provided with one opening portion (a gas outlet: size of the opening portion 0.6 mm×0.6 mm), and positioning was carried out so that the opening portion coincided with the end portion of the flow path of the microchannel portion formed on the second-step metal substrate (the end portion different from the end portion where the through hole of the second-step metal substrate was formed).

(Diffusion Bonding Condition)
Atmosphere: Under Vacuum
Bonding Temperature: 1000° C.
Bonding Time: 12 Hours Consequently, a microreactor of the present invention was obtained.

Example 3

An Al substrate (250 mm×250 mm) having a thickness of 1000 μm was prepared as a metal substrate, and a photosensitive resist material (OFPR produced by Tokyo Ohka Kogyo Co., Ltd.) was applied (film thickness 7 μm (dried)) to both surfaces of the Al substrate by the dip method. Then, on the resist film on the side, where a microchannel portion was to be formed, of the Al substrate, there was disposed a photomask having a shape in which stripe-shaped light-shielding portions each having a width of 1500 μm projected (projecting length 30 mm) alternately from right and left at pitches of 2000 μm. In this photomask, a portion where each of the foregoing stripe-shaped light-shielding portions projected from a base portion did not form an angle of 90°, but formed an R-shape with a radius of 1750 μm. Then, the resist film was exposed via the photomask and developed using a sodium bicarbonate solution. As a result, on one surface of the Al substrate, there was formed a resist pattern in which stripe-shaped opening portions each having a width of 500 μm were arrayed at pitches of 2000 μm, and the adjacent stripe-shaped opening portions were alternately continuous with each other at their end portions.

Then, using the foregoing resist pattern as a mask, the Al substrate was subjected to etching (3 minutes) under the following condition.

(Etching Condition)
Temperature: 20° C.
Etching Liquid (HCl) Concentration: 200 g/L (one liter containing pure water and 200 g of 35% HCl dissolved therein)

After the foregoing etching process was finished, the resist pattern was removed using a sodium hydroxide solution and washing was carried out. As a result, on the one surface of the Al substrate, there was formed a microchannel portion (flow path length 300 mm) having a shape wherein stripe-shaped microchannels each having a width of 1000 μm, a depth of 650 μm, and a length of 30 mm were formed at pitches of 2000 μm so as to be alternately continuous with each other at end portions of the adjacent microchannels (the shape continuously meandering while turning back by 180 degrees, as shown in FIG. 14). Turnback portions of the microchannel portion each had roundness with no angular portion, and no angular portion existed on an inner wall surface along a fluid flow direction. Further, the shape of the inner wall surface of the microchannel portion was generally semicircular in a section perpendicular to the fluid flow direction.

Then, an Al plate having a thickness of 100 μm was prepared as a metal cover member. This Al plate was diffusion bonded to the Al substrate formed with the microchannel portion as described above so as to cover the microchannel portion under the following condition, to thereby produce a joined body. This Al plate was provided with two opening portions (a feed material inlet and a gas outlet: size of each opening portion 0.6 mm×0.6 mm), and positioning was carried out so that the opening portions coincided with both end portions of a flow path of the microchannel portion formed on the Al substrate. Consequently, the flow path connecting between the feed material inlet and the gas outlet was formed within the joined body.

(Diffusion Bonding Condition)
Atmosphere: Under Vacuum
Bonding Temperature: 300° C.
Bonding Time: 8 Hours Then, the foregoing joined body was connected to an anode as an external electrode, immersed in an anode oxidizing solution (4% oxalic acid solution) so as to confront a cathode, and energized under the following condition, to thereby form an aluminum oxide thin film, serving as an insulating film, on the surfaces of the joined body including the inside of the flow path. The thickness of the formed aluminum oxide thin film was measured by an ellipsometer, and the result was about 30 μm.

(Anodic Oxidation Condition)
Bath Temperature: 25° C.
Voltage: 25V (DC)
Current Density: 100 A/m²

Then, a catalyst suspension having the following composition was filled into the flow path of the joined body and left standing (15 minutes). Then, the catalyst suspension was removed, and a dry/reduction treatment was carried out at 120° C. for three hours to thereby apply a catalyst over the whole surface within the flow path.

(Composition of Catalyst Suspension)

| | |
|---|---|
| Al | 41.2 weight % |
| Cu | 2.6 weight % |
| Zn | 2.8 weight % |

Then, on the aluminum oxide thin film, where the microchannel portion was not formed, of the Al substrate, a paste for heater having the following composition was printed by screen printing, then cured at 200° C. to form a heater. The formed heater had a shape in which a fine line having a width of 100 μm was drawn around on the Al substrate at line intervals of 100 μm so as to cover the whole of a region (35 mm×25 mm) corresponding to a region where the microchannel portion was formed.

(Composition of Paste for Heater)

| | |
|---|---|
| Carbon Powder | 20 weight parts |
| Fine Powder Silica | 25 weight parts |
| Xylene Phenol Resin | 36 weight parts |
| Butyl Carbitol | 19 weight parts |

Further, using a paste for electrode having the following composition, electrodes (0.5 mm×0.5 mm) were formed at predetermined two portions of the heater by screen printing.

(Composition of Paste for Electrode)

| | |
|---|---|
| Silver-plated Copper Powder | 90 weight parts |
| Phenol Resin | 6.5 weight parts |
| Butyl Carbitol | 3.5 weight parts |

Then, using a paste for protective layer having the following composition, a heater protective layer (thickness 20 μm) was formed on the heater by screen printing so as to expose the two electrodes formed on the heater.

(Composition of Paste for Protective Layer)

| | |
|---|---|
| Resin Concentration | 30 weight parts |
| Silica Filler | 10 weight parts |
| Lactone Solvent (penta-1,4-lactone) | 60 weight parts |

Consequently, a microreactor of the present invention was obtained.

Example 4

An Al substrate (250 mm×250 mm) having a thickness of 1000 μm was prepared as a metal substrate, and a photosensitive resist material (OFPR produced by Tokyo Ohka Kogyo Co., Ltd.) was applied (film thickness 7 μm (dried)) to both surfaces of the Al substrate by the dip method. Then, on the resist film on the side, where a microchannel portion was to be formed, of the Al substrate, there was disposed a photomask having a shape in which stripe-shaped light-shielding portions each having a width of 1500 μm projected (projecting length 30 mm) alternately from right and left at pitches of 2000 μm. In this photomask, a portion where each of the foregoing stripe-shaped light-shielding portions projected from a base portion did not form an angle of 90°, but formed an R-shape with a radius of 1750 μm. The same Al substrate as described above was prepared, the photosensitive resist material was applied in the same manner, and a photomask was disposed on the resist film on the side, where a microchannel portion was to be formed, of the Al substrate. This photomask was configured to be plane-symmetrical with the foregoing photomask with respect to the Al substrate surface.

Then, with respect to the foregoing pair of metal substrates, the resist films were exposed via the photomasks, respectively, and developed using a sodium bicarbonate solution. As a result, on one surface of each Al substrate, there was formed a resist pattern in which stripe-shaped opening portions each having a width of 500 μm were arrayed at pitches of 2000 μm, and the adjacent stripe-shaped opening portions were alternately continuous with each other at their end portions.

Then, using the foregoing resist pattern as a mask, the Al substrate was subjected to etching (3 minutes) under the following condition.

(Etching Condition)
Temperature: 20° C.
Etching Liquid (HCl) Concentration: 200 g/L (one liter containing pure water and 200 g of 35% HCl dissolved therein)

After the foregoing etching process was finished, the resist pattern was removed using a sodium hydroxide solution and washing was carried out. As a result, on the one surface of each of the pair of Al substrates, there was formed a microchannel portion (flow path length 300 mm) having a shape wherein stripe-shaped microchannels each having a width of 1000 μm, a depth of 650 μm, and a length of 30 mm were formed at pitches of 2000 μm so as to be alternately continuous with each other at end portions of the adjacent microchannels (the shape continuously meandering while turning back by 180 degrees, as shown in FIG. 18). Turnback portions of the microchannel portion each had roundness with no angular portion, and no angular portion existed on an inner wall surface along a fluid flow direction. Further, the shape of the inner wall surface of the microchannel portion was generally semicircular in a section perpendicular to the fluid flow direction.

Then, the foregoing pair of Al substrates were diffusion bonded together under the following condition so that the mutual microchannel portions confront each other, thereby producing a joined body. Upon this bonding, positioning was carried out so that the microchannel portions of the pair of Al substrates completely confront each other. Consequently, within the joined body, there was formed a flow path having a feed material inlet and a gas outlet that are located at one end surface of the joined body.

(Diffusion Bonding Condition)
Atmosphere: Under Vacuum
Bonding Temperature: 300° C.
Bonding Time: 8 Hours Then, the foregoing joined body was connected to an anode as an external electrode, immersed in an anode oxidizing solution (4% oxalic acid solution) so as to confront a cathode, and energized under the following condition, to thereby form an aluminum oxide thin film, serving as an insulating film, on the surfaces of the joined body including the inside of the flow path. The thickness of the formed aluminum oxide thin film was measured by an ellipsometer, and the result was about 30 μm.

(Anodic Oxidation Condition)
Bath Temperature: 25° C.
Voltage: 25V (DC)
Current Density: 100 A/m$^2$ Then, a catalyst suspension having the following composition was filled into the flow path of the joined body and left standing (15 minutes). Then, the catalyst suspension was removed, and a dry/reduction treatment was carried out at 120° C. for three hours to thereby apply a catalyst over the whole surface within the flow path.

(Composition of Catalyst Suspension)

| | |
|---|---|
| Al | 41.2 weight % |
| Cu | 2.6 weight % |
| Zn | 2.8 weight % |

Then, a heater, electrodes, and a heater protective layer were formed, like in Example 3, on the aluminum oxide thin film of one of the Al substrates.

Consequently, a microreactor of the present invention was obtained.

Example 5

A SUS304 substrate (250 mm×250 mm) having a thickness of 1000 μm was prepared as a metal substrate, and a photosensitive resist material (OFPR produced by Tokyo Ohka Kogyo Co., Ltd.) was applied (film thickness 7 μm (dried)) to both surfaces of the SUS304 substrate by the dip method. Then, on the resist film on the side, where a microchannel portion was to be formed, of the SUS304 substrate, there was disposed a photomask having a shape in which stripe-shaped light-shielding portions each having a width of 1500 μm projected (projecting length 30 mm) alternately from right and left at pitches of 2000 μm. In this photomask, a portion where each of the foregoing stripe-shaped light-shielding portions projected from a base portion did not form an angle of 90°, but formed an R-shape with a radius of 1750 μm. The same SUS304 substrate as described above was prepared, the photosensitive resist material was applied in the same manner, and a photomask was disposed on the resist film on the side, where a microchannel portion was to be formed, of the SUS304 substrate. This photomask was configured to be plane-symmetrical with the foregoing photomask with respect to the SUS304 substrate surface.

Then, with respect to the foregoing pair of metal substrates (SUS304 substrates), the resist films were exposed via the photomasks, respectively, and developed using a sodium bicarbonate solution. As a result, on one surface of each SUS304 substrate, there was formed a resist pattern in which stripe-shaped opening portions each having a width of 500 μm were arrayed at pitches of 2000 μm, and the adjacent stripe-shaped opening portions were alternately continuous with each other at their end portions.

Then, using the foregoing resist pattern as a mask, the SUS304 substrate was subjected to etching (3 minutes) under the following condition.

(Etching Condition)
Temperature: 80° C.
Etching Liquid (ferric chloride solution)
Specific Weight Concentration: 45 (° B'e)

After the foregoing etching process was finished, the resist pattern was removed using a sodium hydroxide solution and washing was carried out. As a result, on the one surface of each of the pair of SUS304 substrates, there was formed a microchannel portion (flow path length 300 mm) having a shape wherein stripe-shaped microchannels each having a width of 1000 µm, a depth of 650 µm, and a length of 30 mm were formed at pitches of 2000 µm so as to be alternately continuous with each other at end portions of the adjacent microchannels (the shape continuously meandering while turning back by 180 degrees, as shown in FIG. 18). Turnback portions of the microchannel portion each had roundness with no angular portion, and no angular portion existed on an inner wall surface along a fluid flow direction. Further, the shape of the inner wall surface of the microchannel portion was generally semicircular in a section perpendicular to the fluid flow direction.

Then, the pair of SUS304 substrates comprising this SUS304 substrate and the other SUS304 substrate were diffusion bonded together under the following condition so that the mutual microchannel portions confront each other, thereby producing a joined body. Upon this bonding, positioning was carried out so that the microchannel portions of the pair of SUS304 substrates completely confront each other. Consequently, within the joined body, there was formed a flow path having a feed material inlet and a gas outlet that are located at one end surface of the joined body.

(Diffusion Bonding Condition)
Atmosphere: Under Vacuum
Bonding Temperature: 1000° C.
Bonding Time: 12 Hours Then, on the surface, where the microchannel portion was not formed, of one of the SUS304 substrates forming the foregoing joined body, a polyimide precursor solution (Photoneece produced by Toray Industries, Inc.) as an application liquid for insulating film was printed by screen printing, then cured at 350° C. to thereby form an insulating film having a thickness of 20 µm.

Then, a boehmite treatment was applied to the inner wall surface of the flow path of the foregoing joined body under the following condition to form an aluminum oxide thin film. The thickness of the formed aluminum oxide thin film was measured by an ellipsometer, and the result was about 5 µm.

(Condition of Boehmite Treatment)
Aluminasol 520 (produced by Nissan Chemical Industries, Ltd.) was used to prepare an alumina sol suspension with a viscosity of 15 to 20 mPa·s. Then, this alumina sol suspension was poured into the flow path of the joined body, and drying was carried out at 120° C. for three hours to thereby fix a boehmite film inside the flow path.

Then, a catalyst was applied over the whole surface in the flow path of the joined body like in Example 4. Thereafter, a heater, electrodes, and a heater protective layer were formed, like in Example 3, on the insulating film formed on one of the SUS304 substrates.

Consequently, a microreactor of the present invention was obtained.

Example 6

Production of Joined Body

An Al substrate (250 mm×250 mm) having a thickness of 1000 µm was prepared as a metal substrate, and a photosensitive resist material (OFPR produced by Tokyo Ohka Kogyo Co., Ltd.) was applied (film thickness 7 µm (dried)) to both surfaces of the Al substrate by the dip method. Then, on the resist film on the side, where a microchannel portion was to be formed, of the Al substrate, there was disposed a photomask having a shape in which stripe-shaped light-shielding portions each having a width of 1500 µm extended (length 30 mm) alternately from right and left at pitches of 2000 µm. Then, the resist film was exposed via the photomask and developed using a sodium bicarbonate solution. As a result, on one surface of the Al substrate, there was formed a resist pattern in which stripe-shaped opening portions each having a width of 500 µm were arrayed at pitches of 2000 µm and the adjacent stripe-shaped opening portions were alternately continuous with each other at their end portions to thereby provide a zigzag pattern, and further, both end portions are oriented in the same direction and are longer than the other stripe-shaped opening portions by 5 mm.

Then, using the foregoing resist pattern as a mask, the Al substrate was subjected to etching (3 minutes) under the following condition.

(Etching Condition)
Temperature: 20° C.
Etching Liquid (HCl) Concentration: 200 g/L (one liter containing pure water and 200 g of 35% HCl dissolved therein)

After the foregoing etching process was finished, the resist pattern was removed using a sodium hydroxide solution and washing was carried out. As a result, on the one surface of the Al substrate, there was formed a microchannel portion (flow path length 300 mm) having a shape wherein stripe-shaped microchannels each having a width of 1000 µm, a depth of 650 µm, and a length of 30 mm were formed at pitches of 2000 µm so as to be alternately continuous with each other at end portions of the adjacent microchannels (the shape continuously meandering while turning back by 180 degrees, as shown in FIG. 23).

Then, an Al plate having a thickness of 100 µm was prepared as a metal cover member. This Al plate was diffusion bonded to the Al substrate formed with the microchannel portion as described above so as to cover the microchannel portion under the following condition.

(Diffusion Bonding Condition)
Atmosphere: Under Vacuum
Bonding Temperature: 300° C.
Bonding Time: 8 Hours Consequently, there was formed a joined body having an external shape as shown in FIG. 22. This joined body had a size of 25 mm×35 mm and a thickness of 1.4 mm, and had two projecting portions (length 5 mm, width 5 mm) in the same direction which were apart from each other by a distance of 15 mm. An inlet and an outlet of a flow path were located at the tips of the projecting portions.

Three such joined bodies were produced. Each of the joined bodies was connected to an anode as an external electrode, immersed in an anode oxidizing solution (4% oxalic acid solution) so as to confront a cathode, and energized under the following condition, to thereby obtain a unit flow path member formed with an aluminum oxide thin film (insulating film) on the surfaces of the joined body including the inside of the flow path. The thickness of the formed aluminum oxide thin film was measured by an ellipsometer, and the result was about 30 µm.

(Anodic Oxidation Condition)
Bath Temperature: 25° C.
Voltage: 25V (DC)
Current Density: 100 A/m$^2$

[First-Step Unit Flow Path Member]

On the aluminum oxide thin film of one unit flow path member, a paste for heater having the following composition was printed by screen printing, then cured at 200° C. to form a heater. The formed heater had a shape in which a fine line having a width of 100 μm was drawn around on the Al substrate at line intervals of 100 μm so as to cover the whole of a region (35 mm×25 mm) corresponding to a region where the microchannel portion was formed.

(Composition of Paste for Heater)

| | |
|---|---|
| Carbon Powder | 20 weight parts |
| Fine Powder Silica | 25 weight parts |
| Xylene Phenol Resin | 36 weight parts |
| Butyl Carbitol | 19 weight parts |

Further, using a paste for electrode having the following composition, electrodes were formed at predetermined two portions of the heater by screen printing so as to reach side surfaces of the joined body.

(Composition of Paste for Electrode)

| | |
|---|---|
| Silver-plated Copper Powder | 90 weight parts |
| Phenol Resin | 6.5 weight parts |
| Butyl Carbitol | 3.5 weight parts |

Then, using a paste for protective layer having the following composition, a heater protective layer (thickness 20 μm) was formed on the heater by screen printing so as to expose end portions of the two electrodes formed on the heater.

(Composition of Paste for Protective Layer)

| | |
|---|---|
| Resin Concentration | 30 weight parts |
| Silica Filler | 10 weight parts |
| Lactone Solvent (penta-1,4-lactone) | 60 weight parts |

Consequently, a first-step unit flow path member was obtained.

[Second-Step Unit Flow Path Member (Unit Microreactor)]

A catalyst suspension having the following composition was filled into the flow path of another unit flow path member and left standing (15 minutes). Then, the catalyst suspension was removed, and a dry/reduction treatment was carried out at 120° C. for three hours to thereby apply a catalyst C1 over the whole surface within the flow path.

(Composition of Catalyst Suspension)

| | |
|---|---|
| Al | 41.2 weight % |
| Cu | 2.6 weight % |
| Zn | 2.8 weight % |

Then, like the foregoing first-step unit flow path member, a heater, electrodes, and a heater protective layer were formed on the aluminum oxide thin film of the Al substrate to produce a second-step unit flow path member (unit microreactor).

[Third-Step Unit Flow Path Member (Unit Microreactor)]

A catalyst suspension having the following composition was filled into the flow path of another unit flow path member and left standing (15 minutes). Then, the catalyst suspension was removed, and a dry/reduction treatment was carried out at 120° C. for three hours to thereby apply a catalyst C2 over the whole surface within the flow path.

(Composition of Catalyst Suspension)

| | |
|---|---|
| Pt | 0.4 weight % |
| Fe | 0.2 weight % |
| Mordenite ($Na_8(Al_8Si_{40}O_{96}) \cdot 24H_2O$) | 9.4 weight % |

Then, like the foregoing first-step unit flow path member, a heater, electrodes, and a heater protective layer were formed on the aluminum oxide thin film of the Al substrate to produce a third-step unit flow path member (unit microreactor).

[Production of Coupling Member]

Six stainless plates having flat surfaces (30 mm×20 mm) were prepared. Predetermined grooves and through holes for constituting coupling portions, internal communication paths, internal flow paths, and the like were formed on either flat surfaces of the respective stainless plates by mechanical processing. By diffusion bonding these six stainless plates in a predetermined stacking order to unify them, a coupling member of 30 mm×20 mm×12 mm was produced. This coupling member had a structure as shown in FIGS. 24 and 25 (the external shape of the structure body was a rectangular parallelepiped and thus different from FIGS. 24 and 25), wherein six coupling portions (width 5.1 mm, height 1.41 mm, depth 5 mm) were provided on the surface of 30 mm×12 mm, a feed material inlet and a gas outlet were provided on the surface opposite thereto, and the internal communication paths and the internal flow paths were provided inside. In this coupling member, the pitch of the three coupling portions arrayed in a row (corresponding to the pitch of the multi-steps of the unit flow path members) was 2 mm, and the distance between the array rows (corresponding to the distance between an inlet and an outlet of the unit flow path member) was 20 mm. Incidentally, a packing made of silicon rubber was mounted in each of the coupling portions.

[Production of Fixing Member]

Using stainless members, there was produced a fixing member having accommodation spaces each with a frontage of 25 mm×1.41 mm in three steps at pitches of 2 mm.

[Production of Microreactor]

Projecting portions of the respective unit flow path members (the second and third steps were unit microreactors) were inserted into and coupled to the coupling member produced as described above, in proper order from the first step to the third step, and end portions of the respective unit flow path members opposite to their coupled end portions were fixed by the fixing member.

Consequently, a microreactor of the present invention was obtained.

Example 7

Like in Example 1, a microchannel portion was formed on the Al substrate.

Then, like in Example 1, an aluminum oxide thin film was formed on the Al substrate by anodic oxidation.

Then, the side, where the microchannel portion was formed, of the Al substrate was immersed (2 hours) in a catalyst aqueous solution having the following composition, then was subjected to a dry/reduction treatment at 350° C. for one hour, thereby applying a catalyst to the microchannel portion.

(Composition of Catalyst Aqueous Solution)

| | |
|---|---|
| Al | 41.2 weight % |
| Cu | 2.6 weight % |
| Zn | 2.8 weight % |

Then, the side, where the microchannel portion was formed, of the Al substrate was polished by alumina powder to thereby expose the Al surface. Then, as a cover member, an Al plate having a thickness of 100 μm was joined to the Al substrate surface by brazing under the following condition. This Al plate was provided with two opening portions (a feed material inlet and a gas outlet: size of each opening portion 0.6 mm×0.6 mm), and positioning was carried out so that the opening portions coincided with both end portions of a flow path of the microchannel portion formed on the Al substrate.

(Brazing Condition)

Brazing Material: Alumi 4004 (produced by Furukawa-Sky Aluminum Corp.)
Atmosphere: Under Vacuum
Brazing Temperature: 600° C.
Brazing Time: 3 Minutes Then, a heater, electrodes, and a heater protective layer were formed, like in Example 1, on the aluminum oxide thin film of the joined Al substrate.

Consequently, a microreactor of the present invention was obtained.

Example 8

Production of First-Step Metal Substrate

Like in [Production of First-Step Metal Substrate] of Example 2, on one surface of a stainless substrate was formed a microchannel portion (flow path length 300 mm) wherein stripe-shaped microchannels each having a width of 1000 μm, a depth of 650 m, and a length of 30 mm were formed at pitches of 2000 μm so as to be alternately continuous with each other at end portions of the adjacent microchannels (as shown in FIG. 9). Further, as shown in FIG. 9, an opening of a formed through hole was located at an end portion of the continuous microchannel portion.

Then, the side, where the microchannel portion was formed, of the stainless substrate was immersed (2 hours) in a catalyst aqueous solution having the following composition, then was subjected to a dry/reduction treatment at 350° C. for one hour, thereby applying a catalyst to the microchannel portion.

(Composition of Catalyst Aqueous Solution)

| | |
|---|---|
| Al | 41.2 weight % |
| Cu | 2.6 weight % |
| Zn | 2.8 weight % |

Then, the side, where the microchannel portion was formed, of the stainless substrate was polished by alumina powder to thereby expose the stainless substrate surface. Consequently, a first-step metal substrate was prepared.

[Production of Second-Step Metal Substrate]

Like in [Production of Second-Step Metal Substrate] of Example 2, on one surface of a stainless substrate was formed a microchannel portion (flow path length 300 mm) wherein stripe-shaped microchannels each having a width of 1000 μm, a depth of 650 μm, and a length of 30 mm were formed at pitches of 2000 μm so as to be alternately continuous with each other at end portions of the adjacent microchannels (as shown in FIG. 10). Further, as shown in FIG. 10, an opening of a formed through hole was located at an end portion of the continuous microchannel portion.

Then, the side, where the microchannel portion was formed, of the stainless substrate was immersed (10 minutes) in a catalyst aqueous solution having the following composition, then was subjected to a dry/reduction treatment at 500° C. for one hour, thereby applying a catalyst to the microchannel portion.

(Composition of Catalyst Aqueous Solution)

| | |
|---|---|
| Pt | 0.4 weight % |
| Fe | 0.2 weight % |
| Mordenite [$Na_8(Al_8Si_{40}O_{96}) \cdot 24H_2O$] | 9.4 weight % |

Then, the side, where the microchannel portion was formed, of the stainless substrate was polished by alumina powder to thereby expose the stainless substrate surface. Consequently, a second-step metal substrate was prepared.

[Joining Process]

The surface, where the microchannel portion was formed, of the foregoing first-step metal substrate, and the surface, opposite to the surface where the microchannel portion was formed, of the second-step metal substrate were diffusion bonded together under the same condition as in Example 2.

Then, as a cover member, a stainless plate having a thickness of 0.3 μm was diffusion bonded to the surface, where the microchannel portion was formed, of the second-step metal substrate under the same condition as in Example 2. This stainless plate was provided with one opening portion (a gas outlet: size of the opening portion 0.6 mm×0.6 mm), and positioning was carried out so that the opening portion coincided with an end portion of a flow path of the microchannel portion formed on the second-step metal substrate (an end portion different from an end portion where a through hole of the second-step metal substrate was formed).

Then, an insulating film, a heater, electrodes, and a heater protective layer were formed, like in Example 2, on the first-step metal substrate surface.

Consequently, a microreactor of the present invention was obtained.

Example 9

First, like in Example 3, on one surface of an Al substrate was formed a microchannel portion (flow path length 300 mm) having a shape wherein stripe-shaped microchannels each having a width of 1000 μm, a depth of 650 μm, and a length of 30 mm were formed at pitches of 2000 μm so as to be alternately continuous with each other at end portions of the adjacent microchannels (the shape continuously meandering while turning back by 180 degrees, as shown in FIG. 14).

Then, the foregoing Al substrate was connected to an anode as an external electrode and, under the same condition as in Example 3, an aluminum oxide thin film was formed on the Al substrate surfaces including the microchannel portion to serve as an insulating film. Then, the joining side (the side where the microchannel portion was formed) of the Al substrate was polished by alumina powder to remove the aluminum oxide thin film, thereby to expose the Al substrate.

Then, an Al plate having a thickness of 100 µm was prepared as a metal cover member. This Al plate was brazed to the Al substrate formed with the aluminum oxide thin film in the microchannel portion as described above so as to cover the microchannel portion, to thereby produce a joined body. This Al plate was provided with two opening portions (a feed material inlet and a gas outlet: size of each opening portion 0.6 mm×0.6 mm), and positioning was carried out so that the opening portions coincided with both end portions of a flow path of the microchannel portion formed on the Al substrate. Consequently, the flow path connecting between the feed material inlet and the gas outlet was formed within the joined body. The brazing condition was the same as that in Example 7.

Then, a catalyst suspension having the same composition as in Example 3 was filled in the flow path of the joined body to thereby apply a catalyst over the whole surface in the flow path under the same condition as in Example 3.

Then, a heater, electrodes, and a heater protective layer were formed, like in Example 3, on the aluminum oxide thin film of the Al substrate where the microchannel portion was not formed.

Consequently, a microreactor of the present invention was obtained.

Example 10

First, like in Example 4, there were produced a pair of Al substrates having microchannel portions that are plane-symmetrical with each other.

Then, each of the foregoing Al substrates was connected to an anode as an external electrode and, under the same condition as in Example 4, an aluminum oxide thin film was formed on the Al substrate surfaces including the microchannel portion to serve as an insulating film. Then, the aluminum oxide thin film existing on the joining surface of each Al substrate was polished by alumina powder to be removed, thereby to expose the Al substrate.

Then, the foregoing pair of Al substrates were joined by brazing so that the mutual microchannel portions confront each other, thereby producing a joined body. Upon this joining, positioning was carried out so that the microchannel portions of the pair of Al substrates completely confront each other. Consequently, within the joined body, there was formed a flow path having a feed material inlet and a gas outlet that are located at one end surface of the joined body. The brazing condition was the same as that in Example 7.

Then, a catalyst suspension having the same composition as in Example 4 was filled in the flow path of the joined body to thereby apply a catalyst over the whole surface in the flow path under the same condition as in Example 4.

Then, a heater, electrodes, and a heater protective layer were formed, like in Example 3, on the aluminum oxide thin film of one of the Al substrates.

Consequently, a microreactor of the present invention was obtained.

Example 11

First, like in Example 5, there were produced a pair of SUS304 substrates having microchannel portions that are plane-symmetrical with each other.

Then, a boehmite treatment was applied to the surface, where the microchannel portion was formed, of each of the foregoing SUS304 substrates under the same condition as in Example 5, to thereby form an aluminum oxide thin film. Then, the aluminum oxide thin film existing on the joining surface of each SUS304 substrate was polished by alumina powder to be removed, thereby to expose the SUS304 substrate.

Then, this pair of SUS304 substrates were diffusion bonded together under the same condition as in Example 5 so that the mutual microchannel portions confront each other, thereby producing a joined body. Upon this bonding, positioning was carried out so that the microchannel portions of the pair of SUS304 substrates completely confront each other. Consequently, within the joined body, there was formed a flow path having a feed material inlet and a gas outlet that are located at one end surface of the joined body.

Then, a catalyst was applied over the whole surface in the flow path of the joined body like in Example 4. Thereafter, an insulating film was formed, like in Example 5, on one of the SUS304 substrates. On this insulating film, a heater, electrodes, and a heater protective layer were formed like in Example 3.

Consequently, a microreactor of the present invention was obtained.

Example 12

Production of Joined Body

First, like in [Production of Joined Body] of Example 6, there was produced an Al substrate in which stripe-shaped microchannels each having a width of 1000 µm, a depth of 650 µm, and a length of 30 mm were formed at pitches of 2000 µm.

Then, this Al substrate was connected to an anode as an external electrode, and subjected to anodic oxidation under the same condition as in Example 6 to thereby form an aluminum oxide thin film (insulating film) on the Al substrate surfaces including the microchannel portion. Then, the surface where the microchannel portion was formed was polished by alumina powder to remove the aluminum oxide thin film, thereby exposing the Al substrate surface (joining surface).

Then, an Al plate having a thickness of 100 µm was prepared as a metal cover member. This Al plate was brazed, under the same condition as in Example 6, to the Al substrate formed with the microchannel portion as described above so as to cover the microchannel portion. Consequently, three joined bodies each having an external shape as shown in FIG. 22 were produced to serve as unit flow path members. This joined body had a size of 25 mm×35 mm and a thickness of 1.4 mm, and had two projecting portions (length 5 mm, width 5 mm) in the same direction which were apart from each other by a distance of 15 mm. An inlet and an outlet of a flow path were located at the tips of the projecting portions.

Using the foregoing three unit flow path members, a first-step unit flow path member, a second-step unit flow path member, and a third-step unit flow path member were produced, thereby producing a microreactor of the present invention.

INDUSTRIAL APPLICABILITY

The present invention can be utilized for hydrogen production achieved from reactions such as reforming of methanol and oxidation of carbon monoxide.

The invention claimed is:

1. A microreactor for obtaining hydrogen gas by reforming a feed material, comprising:
   a first metal substrate including a first surface that includes a first single continuous microchannel portion to carry a catalyst and a second surface, opposite to the first surface, that does not include a microchannel portion, and a first through hole extends through the second surface directly into a first end of the first single continuous microchannel portion;

a second metal substrate including a first surface that includes a second single continuous microchannel portion to carry a catalyst and a second surface, opposite to the first surface, that does not include a microchannel portion, the first and second metal substrates being stacked in multi-steps so that the first surfaces where said microchannel portions are formed are oriented in a same direction, and said second metal substrate is provided with a second through hole that extends from a location on the second surface of the second metal substrate that faces a second end of the first single continuous microchannel portion into a first end of the second single continuous microchannel portion for communication between said microchannel portions of the metal substrates in the respective steps;

a heater that is disposed, via an insulating film, on the second surface of the first metal substrate where said microchannel portion is not formed; and a cover member having a gas outlet, the cover member being joined to said second metal substrate located at an outermost position of the multi-steps and exposing said second single continuous microchannel portion.

2. A microreactor according to claim 1, wherein said first metal substrate is one of an Al substrate, a Cu substrate, and a stainless substrate.

3. A microreactor according to claim 1, wherein said insulating film is a metal oxide film formed by anodically oxidizing said first metal substrate.

4. A microreactor according to claim 3, wherein said metal oxide film is also provided in said first and second single continuous microchannel portions.

5. A microreactor according to claim 4, wherein said first and second metal substrates are an Al substrate.

6. A microreactor according to claim 1, wherein said heater is provided on the first metal substrate located at an outermost position of the multi-steps, and a heater protective layer is provided so as to cover said heater while exposing electrodes of said heater and an opening of the first through hole of said first metal substrate.

7. A microreactor according to claim 1, wherein said metal substrates are in a two-step stacked structure with the two metal substrates, and wherein the first metal substrate includes a first catalyst in the first single microchannel portion to carry out mixing of feed materials, vaporization of a mixed feed material, and reforming of mixture gas, and the second metal substrate includes a second catalyst in the second single microchannel portion to carry out removal of impurities from reformed gas.

8. A microreactor according to claim 1, wherein the first through hole extends through the second surface of the first metal substrate directly into the first end of the first single continuous microchannel portion in a direction that is perpendicular to a longitudinal direction of the first single continuous microchannel portion.

9. A microreactor according to claim 1, wherein the second through hole extends through the second surface of the second metal substrate directly into the first end of the second single continuous microchannel portion in a direction that is perpendicular to a longitudinal direction of the second single continuous microchannel portion and parallel to the first through hole.

10. A microreactor according to claim 1, wherein the gas outlet exposes a second end of said second single continuous microchannel portion.

* * * * *